(12) United States Patent
Hubbard

(10) Patent No.: US 11,729,202 B2
(45) Date of Patent: Aug. 15, 2023

(54) REDUCING PROJECT FAILURE PROBABILITY THROUGH GENERATION, EVALUATION, AND/OR DEPENDENCY STRUCTURING OF A CRITICAL EVENT OBJECT

(71) Applicant: Butchershop Creative, LLC, San Francisco, CA (US)

(72) Inventor: Trevor Hubbard, Fairfax, CA (US)

(73) Assignee: Butchershop Creative, LLC, San Francisco, CA (US)

( * ) Notice: Subject to any disclaimer, the term of this patent is extended or adjusted under 35 U.S.C. 154(b) by 299 days.

(21) Appl. No.: 17/213,631

(22) Filed: Mar. 26, 2021

(65) Prior Publication Data
US 2022/0303301 A1    Sep. 22, 2022

Related U.S. Application Data

(60) Provisional application No. 63/162,423, filed on Mar. 17, 2021.

(51) Int. Cl.
*H04L 29/00*    (2006.01)
*H04L 9/40*    (2022.01)
*H04L 67/142*    (2022.01)

(52) U.S. Cl.
CPC ........ *H04L 63/1433* (2013.01); *H04L 63/102* (2013.01); *H04L 63/1408* (2013.01);
(Continued)

(58) Field of Classification Search
CPC ............... H04L 63/1433; H04L 63/102; H04L 63/1408; H04L 63/1441; H04L 63/20;
(Continued)

(56) References Cited

U.S. PATENT DOCUMENTS 6,154,849 A * 11/2000 Xia .................. H04L 43/50
714/4.3
8,661,539 B2 * 2/2014 Hodges ............. H04L 67/306
713/168
(Continued)

OTHER PUBLICATIONS

T. Zimmermann and N. Nagappan, "Predicting Subsystem Failures using Dependency Graph Complexities," The 18th IEEE International Symposium on Software Reliability (ISSRE '07), Trollhattan, Sweden, 2007, pp. 227-236, doi: 10.1109/ISSRE.2007.19 . (Year: 2007).*

*Primary Examiner* — Don G Zhao
(74) *Attorney, Agent, or Firm* — Peter Jensen-Haxel

(57) ABSTRACT

Disclosed is a method, a device, a system and/or a manufacture of reducing project failure probability through generation, evaluation, and/or dependency structuring of a critical event object. In one embodiment, a system for building a failure dependency hierarchy includes an orchestration server and a network. The orchestration server initiates a session and provisions computing resources. An object generation routine receives a failure event criterion. An object initiation routine then generates a failure event object associated with the failure event criterion. A risk assessment routine generates a risk value by inputting a probability data and an impact data into a risk assessment function. A dependency routine stores in a referential attribute a unique identifier of a second failure event object to define a failure dependency. A user assignment routine associates the unique identifier of a user profile with the failure event object to assign responsibility for preventing the failure event.

20 Claims, 20 Drawing Sheets

(52) U.S. Cl.
CPC .......... *H04L 63/1441* (2013.01); *H04L 63/20* (2013.01); *H04L 67/142* (2013.01)

(58) Field of Classification Search
CPC ... H04L 67/142; H04L 67/141; H04L 67/146; H04L 67/306
See application file for complete search history.

(56) References Cited

U.S. PATENT DOCUMENTS

| | | | |
|---|---|---|---|
| 11,356,527 B1* | 6/2022 | Kudrin | H04L 67/562 |
| 2006/0277022 A1* | 12/2006 | Pulfer | G05B 17/02 |
| | | | 703/22 |
| 2012/0254293 A1* | 10/2012 | Winter | H04M 3/42161 |
| | | | 709/203 |
| 2015/0206264 A1* | 7/2015 | Carrato | G06Q 10/067 |
| | | | 705/348 |
| 2021/0157312 A1* | 5/2021 | Cella | G05B 19/4184 |
| 2021/0165760 A1* | 6/2021 | De Schrijver | G06F 16/1734 |
| 2021/0165767 A1* | 6/2021 | D'Halluin | G06F 16/2322 |
| 2022/0103417 A1* | 3/2022 | Grammel | H04L 41/145 |
| 2022/0108262 A1* | 4/2022 | Cella | G06Q 10/063118 |

\* cited by examiner

Critical Event Assessment Network 190

*FIG. 8*  Critical Event Evaluation Process Flow 850

Session Initiation Process Flow 950

Object Initiation Process Flow 1050

Object Initiation Process Flow 1150

Object Assembly Process Flow 1250

Object Assembly Process Flow 1350

*FIG. 14*  Machine Learning Predictive Model Process Flow 1450

FIG. 15  Machine Learning Predictive Model Process Flow 1550

Critical Event Detection
Process Flow 1650

REDUCING PROJECT FAILURE PROBABILITY THROUGH GENERATION, EVALUATION, AND/OR DEPENDENCY STRUCTURING OF A CRITICAL EVENT OBJECT

CLAIM FOR PRIORITY

This patent application claims priority from, and hereby incorporates by reference: U.S. provisional patent application No. 63/162,423, titled 'REDUCING PROJECT FAILURE PROBABILITY THROUGH GENERATION, EVALUATION, AND/OR DEPENDENCY STRUCTURING OF A CRITICAL EVENT OBJECT', filed Mar. 17, 2021.

FIELD OF TECHNOLOGY

This disclosure relates generally to data structuring and data processing devices and, more particularly, to a method, a device, and/or a system of reducing project failure probability through generation, evaluation, and/or dependency structuring of a critical event object.

BACKGROUND

An organization may wish to track, evaluate, and/or predict aspects of a project. For example, the organization may be a corporation, non-profit organization, government agency, or a collection of users with a shared goal or interest. The organization may also be a smaller subset of a larger organization, for example a business division, a working group, or a software development team. The project can be a collection of activities leading toward a goal, for example a strategic initiative, the building of a software application, a successful marketing campaign, a construction project, a non-profit initiative, or the drafting of a piece of legislation.

The project may involve sub-projects or the project may be a sub-project of a larger project and/or strategic priority of the organization. The project may also involve one or more users who relate to the project, for example users that are responsible for administering the project, and/or one or more users working on aspects of achieving the goal.

The project may be complex, potentially having competing priorities, limited resources, and difficult-to-assess risks. It may be difficult to understand and evaluate priorities, opportunity costs, risks, and dependencies. Despite numerous tools and software applications that may have been designed to address some aspects of this complexity, some projects may continue to have a high probability of failure. The project failure in some cases is due to the occurrence of one or a few critical criteria.

Numerous challenges may exist with reducing the incidence of project failure. In some cases, it may be difficult for the team working on the project, or other stakeholders, to have insight into the project's likelihood of success during the project, that is, prior to its actual success or failure. For example, some critical component may have insufficient resources, while less important components may be over-subscribed with human, material, and/or financial resources. Second, what may seem to be obvious risks in retrospect may be difficult to store, communicate, and evaluate up front. For example, these risks may be identified when a "post-mortem" analysis process determines how, when, and why the failure occurred. It may only be at these stages where critical criteria for the project, and the appropriate allocation of resources to address the criteria, are identified.

Another challenge may be passing information about failure between users, projects, and even organizations. For example, in some organizations lack of communication and the technology to support it may cause these failures, or types of failures, to reoccur. In other cases, lack of communication and supporting technology may prevent the users of one project from learning from the failures of a similar project.

A higher probability of project failure may have a detrimental economic impact on the organization. For example, failure of a revenue-generating project can lead to lost profits, loss of market share, and ultimately failure of a business. In possibly the worst case, the core purpose of the organization may be undermined by one or more project failures and cause the organization to dissolve or fall into bankruptcy.

SUMMARY

Disclosed are a method, a device, and/or a system of reducing project failure probability through generation, evaluation, and/or dependency structuring of a critical event object. In one embodiment, a system for building a failure dependency hierarchy in a computer memory includes an orchestration server and a network communicatively coupled to the orchestration server. The orchestration server includes a processor of the orchestration server and a memory of the orchestration server. The orchestration server includes a session initiation routine that includes computer readable instructions that when executed on the processor of the orchestration server initiate a session, the initiation comprising generating a session UID and provisioning computing resources that include a computing memory and a processing power. The session initiation routine also includes computer readable instructions that when executed generate a user addition request to associate a unique identifier of a first user profile with the session UID.

The orchestration server further includes an object generation engine including computer readable instructions that when executed on the processor of the orchestration server receive a failure criterion data comprising an alphanumeric string specifying a failure event. Also included on the orchestration server is an object initiation routine that includes computer readable instructions that when executed on the processor of the orchestration server generate a failure event object in the computing memory and store the failure event object in an evaluation queue. The failure event object includes the failure criterion data and optionally a unique identifier of the failure event object.

The orchestration server includes a categorization subroutine that includes computer readable instructions that when executed on the processor of the orchestration server associate a category value with the failure event object. A factor retrieval routine of the orchestration server includes computer readable instructions that when executed on the processor of the orchestration server receive a probability data and receive an impact data.

The orchestration server includes a risk assessment routine that includes computer readable instructions that when executed on the processor of the orchestration server generate a risk value by inputting the probability data and the impact data into a risk assessment function, and store the probability data, the impact data, and/or the risk value in association with the failure event object. A dependency routine includes computer readable instructions that when executed on the processor of the orchestration server store in a referential attribute of the failure event object a unique identifier of a second failure event object to define a failure dependency of the failure dependency hierarchy.

The orchestration server further includes a user assignment routine comprising computer readable instructions that when executed on the processor of the orchestration server receive a selection of the unique identifier of the first user profile, and also associate the unique identifier of the first user profile with the unique identifier of the failure event object to assign responsibility to a first user of the first user profile for preventing the failure event.

The system may also include an object server that includes a processor of the object server and a memory of the object server. The orchestration server includes a critical hierarchy generation engine that includes computer readable instructions that when executed on the processor of the orchestration server: (i) query the session UID as a root of the failure dependency hierarchy; (ii) determine a set of failure event objects directly and/or indirectly connected to the root through one or more failure dependency references of a data structure, and (iii) assemble a failure dependency hierarchy data in the computer memory.

The orchestration server may further include a hierarchy analysis routine that includes computer readable instructions that when executed on the processor of the object server determine that each of a subset of the set of failure event objects within the failure dependency hierarchy data include a data value in common. The hierarchy analysis routine when executed may return to a client device associated with a second user profile registered with an administrative privilege with respect to the session a set of session unique identifiers of the subset of the set of failure event objects. The data value in common may include: (i) the unique identifier of the first user profile of the first user; (ii) a word of the alphanumeric string; (iii) the risk value; (iv) a failure averted value; (v) an event status value; and/or (vi) the unique identifier of the second failure event object specified in the referential attribute.

The orchestration server may further include a critical event log routine that includes computer readable instructions that when executed on the processor of the orchestration server store a failure averted value in an occurrence status attribute of the failure event object and generate a critical event log. The critical event log routine when executing may also designate the critical event log for reporting to the first user profile and/or a second user profile registered with administrative privilege with respect to the session.

The factor retrieval routine may further include computer readable instructions that when executed on the processor of the orchestration server: query a probability data source, receive the probability data, query an impact data source, and receive the impact data. The probability data source may include a first database that includes a first plurality of failure event objects from a plurality of sessions associated with one or more accounts. The impact data source may include a second database that includes failure event objects from the plurality of sessions associated with one or more accounts.

The orchestration server may further include a session spawning subroutine. The session spawning subroutine may include computer readable instructions that when executed generate a new session based on the failure event object. The session spawning subroutine when executing may also determine that the first user profile is associated with the failure event object, and generate a call to register the first user profile associated with the failure event object with administrative privileges with respect to the new session.

The system may also include a machine learning server that includes a processor of the machine learning server and a memory of the machine learning server. The machine learning server may include a first risk model engine that includes computer readable instructions that when executed on the processor of the machine learning server input values of at least two data attributes of each of a second plurality of failure event objects into a first machine learning algorithm. The input values may be independent variables of the first machine learning algorithm. The first risk model engine when executing may also input a value of an occurrence status of each of the second plurality of failure event objects into the first machine learning algorithm. The value of the occurrence status may be a first dependent variable of the first machine learning algorithm. The first risk model engine when executing may then generate a first predictive model outputting a second risk value based on inputting the at least two data attributes of the second plurality of failure event objects.

The machine learning server may include a second risk model engine that includes computer readable instructions that when executed on the processor of the machine learning server input values of at least two data attributes of a plurality of session files into a second machine learning algorithm as independent variables of the second machine learning algorithm. The second machine learning algorithm when executing may input a session status value of each of the plurality of session files into the second machine learning algorithm as a second dependent variable of the second machine learning algorithm, and may then further generate a second predictive model. The second predictive model may output a probability for success and/or a probability for failure of the session based on inputting the values of at least the at least two data attributes of the plurality of session files.

The machine learning server may also include a critical criteria recommendation engine that includes computer readable instructions that when executed on the processor of the machine learning server parse the failure criterion data to result in one or more words of the alphanumeric string and input one or more of the one or more words into a third predictive model. The third predictive model may be built with a third machine learning algorithm and trained with a set of failure criterion data extracted from each of a third plurality of failure event objects across two or more sessions. The critical criteria recommendation engine when executing may output a second failure criterion data most likely to be associated with the failure criterion data across the two or more sessions to increase a likelihood for consideration of critical events related to the session. The critical criteria recommendation engine when executing may then generate the failure event object from the second failure criterion data and add the failure event object to the evaluation queue.

The orchestration server may include an authentication system that includes computer readable instructions that when executed on the processor of the orchestration server authenticate the first user and/or a device of the first user. A timer subroutine of the orchestration server may include computer readable instructions that when executed on the processor of the orchestration server initiate a timer for receipt of the failure criterion data and determine expiration of the timer. A realtime communication module of the orchestration server may include computer readable instructions that when executed on the processor of the orchestration server initiate a realtime communication channel. A grouping subroutine includes computer readable instructions that when executed on the processor of the orchestration server associate a first failure event object with a different failure event object through a grouping reference.

The orchestration server may also include an object sorting subroutine that includes computer readable instructions that when executed on the processor of the orchestration server sort a fourth plurality of failure event objects based on a risk value of each failure event object within the fourth plurality of failure event objects. The probability data and the impact data may be received from the first user. A factor adjustment subroutine may include computer readable instructions that when executed on the processor of the orchestration server generate an adjusted probability data that is an averaged probability data and/or a weighted probability data generated from a first probability data and a second probability data. The factor adjustment subroutine when executed may generate an adjusted impact data that is an averaged impact data and/or a weighted impact data generated from a first impact data and a second impact data. The first probability data and the first impact data may be received from the first user and the second probability data and the second impact data received may be received from a second user. The weighted impact data may be based on a first weight factor associated with the first user profile of the first user and may be further based on a second weight factor that may be associated with the second user profile of the second user. The factor adjustment subroutine when executed may then generate the risk value by inputting the adjusted probability data and/or the adjusted impact data into the risk assessment function. The orchestration server may also include a project object creation module that includes computer readable instructions that when executed on the processor of the orchestration server generate a project data object from the failure event object.

The system may include a templating module that includes computer readable instructions that when executed select a template data for the session and determine one or more failure criterion data associated with the template data. The template data may include one or more category values. The templating module when executed may also generate one or more new failure event objects from the one or more failure criterion data associated with the template data and add the one or more new failure event objects to the evaluation queue.

The orchestration server may include an auxiliary session data routine that includes computer readable instructions that when executed on the processor of the orchestration server determine a third failure event object is associated with a project failure of an account profile and extract a failure criterion data of the third failure event object. Optionally, a probability data of the third failure event object, an impact data of the third failure event object, and a risk value of the third failure event object may be extracted. The auxiliary session data routine when executed may also generate a fourth failure event object that includes the failure criterion data of the third failure event object and associate the fourth failure event object with the session, and add the fourth failure event object to the evaluation queue.

The orchestration server may include a risk threshold routine that includes computer readable instructions that when executed determine a subset of a fifth plurality of failure event objects that are above a risk threshold value calculated by a risk threshold function. A visualization module may include computer readable instructions that when executed on the processor of the orchestration server generate a visualization of one or more UI elements each representing one or more failure event objects relative to the risk threshold value.

Further on the orchestration server may be included a report subroutine that includes computer readable instructions that when executed on the processor of the orchestration server generate a report including a name of the first user profile and one or more failure event objects assigned to the first user profile. An event evaluation engine of the orchestration server may include computer readable instructions that when executed on the processor of the orchestration server store a failure condition data specifying a failure condition and/or a failure detection script that when executed on a computer processor evaluates an input to the failure detection script to determine the failure condition as an output of the failure detection script. The event evaluation engine when executing may then determine occurrence of the failure condition.

The orchestration server further includes computer readable instructions that when executed on the processor of the orchestration server: (i) store a session file comprising the session UID and unique identifiers of a sixth plurality of failure event objects, (ii) restore the session from the session file, (iii) re-initiate the realtime communication channel, (iv) update an attribute of the failure event object, (v) re-generate the risk value of the failure event object, and/or (vi) re-evaluate the subset of the sixth plurality of the failure event objects above the risk threshold value of the risk threshold function.

The orchestration server may include a status tracking engine including computer readable instructions that when executed on the processor of the orchestration server store an object check condition of the failure event object, generate a status check request of the failure event object upon occurrence of the object check condition, and store a status check value received from a client device associated with a user profile associated with the failure event object. A user assignment routine of the orchestration server may further include computer readable instructions that when executed on the processor of the orchestration server overwrite the unique identifier of the first user profile of the first user assigned responsibility for preventing the failure event with a second unique identifier of the second user profile of a second user newly assigned responsibility for preventing the failure.

In another embodiment, a system for reducing failure through generation, structuring, and analysis of critical event objects in computer memory includes an orchestration server, an object sever, and a network communicatively coupling the orchestration server and the object server. The orchestration server includes a processor of the orchestration server and a memory of the orchestration server, and the object server includes a processor of the object server and a memory of the object server.

The orchestration server includes a session initiation routine that includes computer readable instructions that when executed on the processor of the orchestration server initiate a session comprising generating a session UID and provisioning computing resources comprising a computing memory and a processing power. The session initiation routine further includes computer readable instructions that when executed generate a user addition request to associate a unique identifier of a first user profile with the session UID. An object generation engine of the orchestration server includes computer readable instructions that when executed on the processor of the orchestration server receive a critical event criterion data that includes an alphanumeric string specifying a critical event.

The orchestration server may also include an object initiation routine that includes computer readable instructions that when executed on the processor of the orchestration server generate a critical event object in the computing memory comprising the critical event criterion data (and optionally a unique identifier of the critical event object) and store the critical event object in an evaluation queue. The orchestration server further includes a risk assessment routine that includes computer readable instructions that when executed on the processor of the orchestration server generate a risk value and store the risk value in association with the critical event object.

A dependency routine of the orchestration server includes computer readable instructions that when executed on the processor of the orchestration server store in a referential attribute of the critical event object a unique identifier of a second critical event object to define a critical event dependency of a critical event hierarchy.

The object server includes a critical hierarchy generation engine that includes computer readable instructions that when executed on the processor of the orchestration server: query the session UID as a root of the critical event hierarchy, determine a set of critical event objects at least one of directly and indirectly connected to the root through one or more critical event dependency references of a data structure, and assemble a critical event hierarchy data in the computer memory.

In yet another embodiment, a device for reducing probability of failure based on storage and structuring of critical event objects includes a processor and a memory. An object generation engine of the device includes computer readable instructions that when executed on the processor receive a critical event criterion data that includes an alphanumeric string specifying a critical event. An object initiation routine includes computer readable instructions that when executed on the processor generate a critical event object in computing memory including the critical event criterion data and optionally a unique identifier of the critical event object, and store the critical event object in an evaluation queue.

The device includes a dependency routine that includes computer readable instructions that when executed on the processor store in a referential attribute of the critical event object a unique identifier of a second critical event object to define a critical event dependency of a critical event hierarchy. A critical hierarchy generation engine of the device includes computer readable instructions that when executed on the processor query a session UID as a root of the critical event hierarchy and determine a set of critical event objects directly and/or indirectly connected to the root through one or more critical event dependency references of a data structure. The computer readable instructions of the critical hierarchy generation engine when executing assemble a critical event hierarchy data in computer memory.

The device also includes a hierarchy analysis routine comprising computer readable instructions that when executed on the processor determine that each of a subset of the set of critical event objects within the critical event hierarchy data include a data value in common. The computer readable instructions of the hierarchy analysis routine when executing then return to a client device a set of session unique identifiers of the subset of the set of critical event objects.

BRIEF DESCRIPTION OF THE DRAWINGS

The embodiments of this disclosure are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, a device, and/or system of reducing project failure probability through generation, evaluation, and/or dependency structuring of a critical event object. Although the present embodiments have been described with reference to specific example embodiments, it will be evident that various modifications and changes may be made to these embodiments without departing from the broader spirit and scope of the various embodiments.

Figure 1:
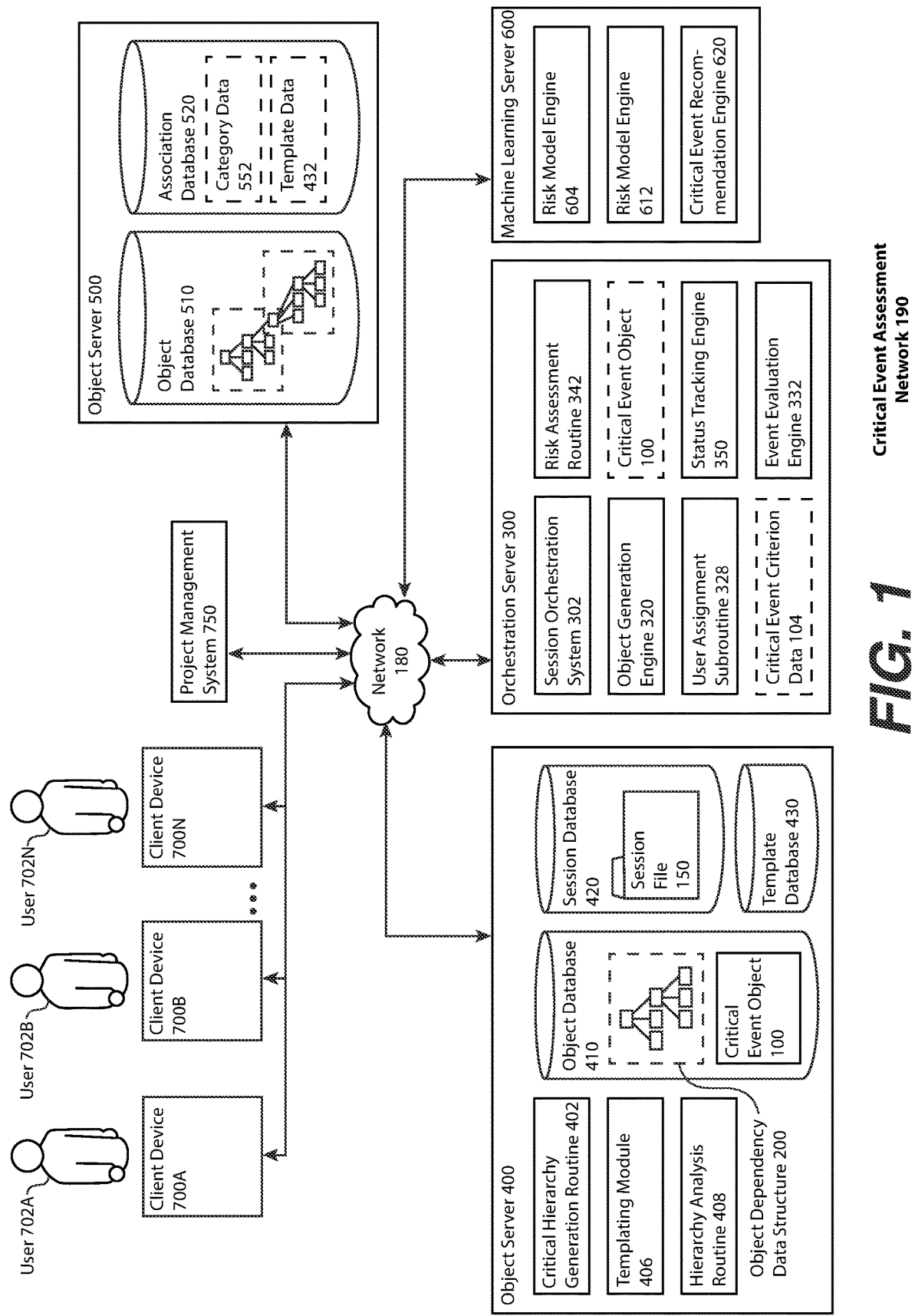
FIG. 1 is a critical event assessment network comprising an orchestration server, one or more object servers, a machine learning server, and one or more client devices, the orchestration server initiating and orchestrating sessions in which one or more users communicating over a network through the one or more client devices evaluate critical event criteria and the orchestration server then generates critical event objects for organization, evaluation, communication, and/or analysis, including for example in a data structure comprising a failure dependency hierarchy, according to one or more embodiments.

FIG. 1 illustrates a critical event assessment network 190, according to one or more embodiments. The critical event assessment network 190 includes one or more computing devices in communication over a network 180, including an orchestration server 300, an object server 400, an object server 500, a machine learning server 600, and one or more client devices 700 (e.g., client device 700A through client device 700N) each associated with a user 702 (e.g., user 702A through user 702N). The network 180 may be, for example, a local area network (LAN), wide area network (WAN), and/or the internet.

In the embodiment of FIG. 1, a session for evaluating a critical event with respect to a project is initiated by one or more users 702. A session orchestration system may initiate and stores a session file 150 in a session database 420 of the object server 400. Additional aspects of the session file 150 may be defined by one or more of the users 702, for example a user 702 having an administrative privilege with respect to the session. The session may be given a name, title, and/or description that may provide an identifier that informs, and/or defines a project, its scope, and/or its goal. As just a few examples, the session may be titled as "how do we succeed at getting our treatment FDA approved," or "how do we prevent our app launch from failing." A templating module 406 may extract data from a template database 430 to automatically assign and/or add data to the session, for example category values and/or critical event criterion data 104 with which an organization associated with the session has repeatedly failed, as further described through the present embodiments. For example, the template may include useful data for projects including "SaaS marketing campaign", "iOS app development," and "bridge engineering."

Following session setup, one or more critical event criterion data 104 may be submitted to the orchestration server 300 as inputs to an object generation engine 320. The critical event criterion data 104 may specify a potential critical event that if it occurred would impact the project. For example, a critical event may be a positive event that has a positive impact on the project and/or that must necessarily occur for project success. A critical event may also be a negative event that has a negative impact on the project and/or that must not occur to avoid project failure. In one or more embodiments, the critical event criterion data 104 may be data in an alphanumeric string specifying: "achieving HIPAA compliance," "unavailability of key materials including neodymium," "failure to achieve corporate partner culture fit", or "failure to understand the motivation of our customers." In one or more embodiments, each of the users 702 may generate the critical event criterion data 104 through the client device 700 and/or received from additional locations, remote procedure calls, and/or databases. In one or more embodiments, the submission process may be subject to constraint. For example, user input may be timed.

Following one or more operations of basic setup, the critical event assessment network 190 may build, structure, and/or store data to enhance the evaluation, communication, and/or analysis of the team, its project, and a related organization. The object generation engine 320 may generate an instance of the critical event object 100 for each of the critical event criterion data 104 and store the critical event criterion data 104 in association with the critical event object 100. One or more processes of the object generation engine 320 may then continue to build the data and/or data structure of the critical event object 100, through automatic addition of data through one or more processes, including machine learning processes, as shown and described throughout the present embodiments. In one or more embodiments, the critical event objects 100 may be placed into an evaluation queue (e.g., the evaluation queue 310 of FIG. 3) and then withdrawn and evaluated by one or more of the users 702 associated with the session. One or more of the users 702 may then discuss the critical event criterion data 104, categorize it, describe it, quantify it, define one or more qualities of it, and define dependencies.

In just one example, a failure event object 102 may have an attribute for storing a value of a factor data 108 associated with probability and/or impact of the critical event criterion data 104. The factor data 108 may be usable as an input to generate an occurrence value 112 (e.g., as shown and described in conjunction with FIG. 2A). For instance, a first factor data 108A may be a probability data 109 and a second factor data 108B may be an impact data 110. In what may be a basic example, a probability data 109 representing a probability that the critical event occurs and an impact data 110 representing an impact of the occurrence of the critical event on the project, may be defined. A risk value 113 (e.g., an instance of the occurrence value 112) may be generated based on the probability data 109 and the impact data 110. The resulting data and/or value may provide a quantitative value for evaluating, ranking, and/or analyzing the critical event object 100, including with respect to other critical event objects 100 within the session file 150 and/or the object database 410.

Figure 3:
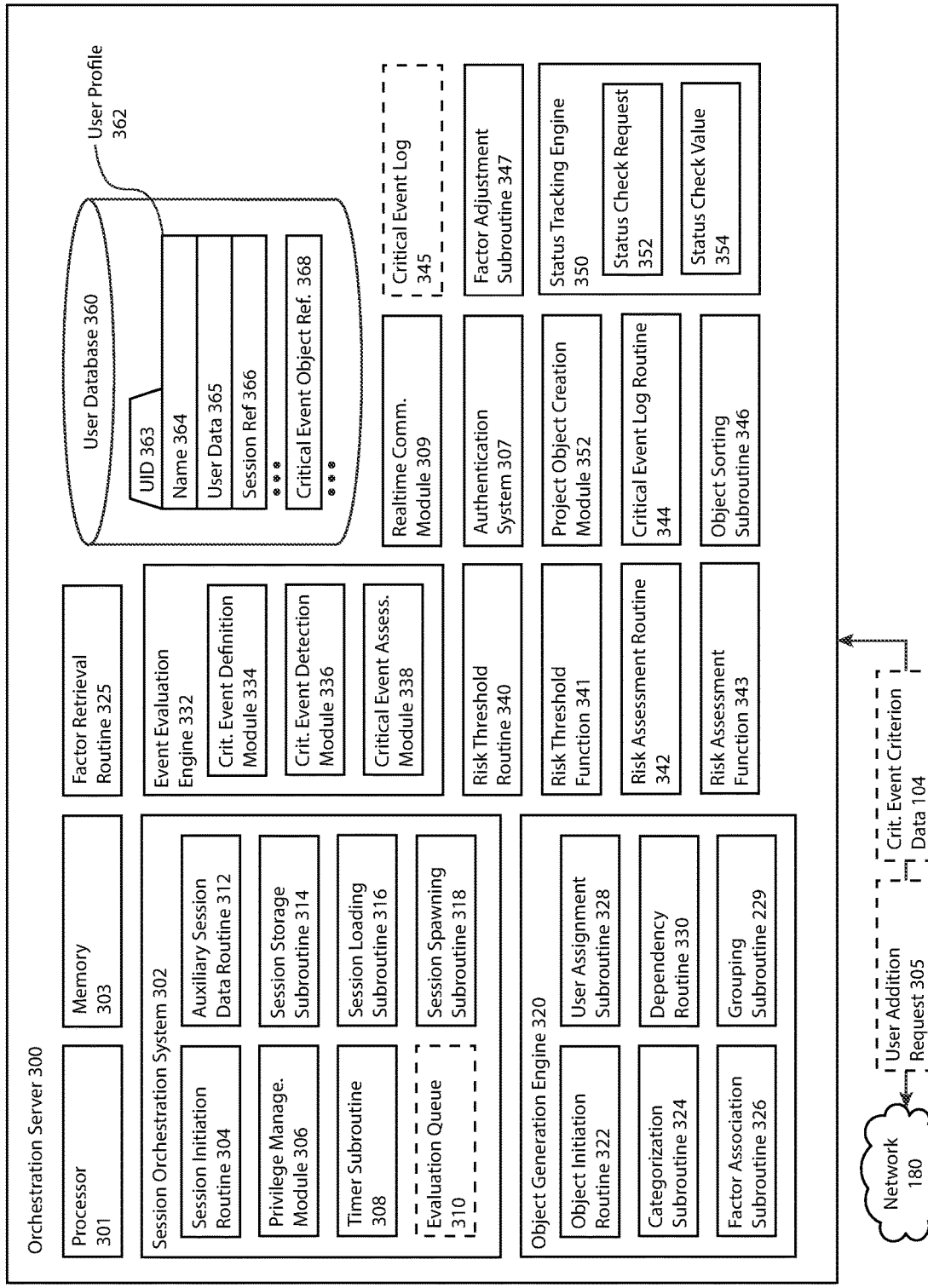
FIG. 3 illustrates the orchestration server of FIG. 1, including a session orchestration system for managing and/or controlling sessions, an object generation engine for assembling critical event objects, a risk assessment function for generating an occurrence value of the critical event objects, a risk threshold function for sorting and/or analyzing critical event objects within the session, a status tracking engine checking on a status of each critical event object, and a user database including a user profile of a user participating in the session, according to one or more embodiments.

Each of the critical event objects 100 may be associated with one or more user profiles (e.g., the user profile 362 of FIG. 3, which may each be associated with a user 702). The association may assign responsibility for ensuring occurrence and/or preventing occurrence of the critical event specified in the critical event criterion data 104 of the critical event object 100. Additional parameters may be defined that relate to an assignment of responsibility. For example, a timeframe for automatic status checks requested from automated systems and/or status checks sent to a client device 700 of a user 702 to receive feedback on progress toward causing success and/or preventing failure with respect to the critical event object 100. In another example, conditions or scripts for detection and/or determination of the occurrence of critical events may be specified for execution by an event evaluation engine 332, as further shown and described in conjunction with the embodiment of FIG. 3. Following any user profile 362 associations (e.g., assignment of responsibility), the users 702 may add additional data to the critical event objects 100 of the session, including an action data 140 comprising qualitative text data such as knowns, unknowns, questions, and/or next actions. The addition of the action data 140 to the stored and structured critical event objects 100 may be useful not only to the team working on the project, but also to other persons within the organization seeking to understand failure dependencies between or among projects, gauge likelihood of success, and most efficiently distribute resources. Many other aspects of generation and building of the session file 150 and critical event objects 100 are described throughout the present embodiments.

Each of the critical event objects 100 of the session may be communicated to the object server 400 and stored in the object database 410. In one or more embodiments, the critical event objects 100 are stored such that one or more are related through dependency references to define a critical event hierarchy (e.g., a failure dependency hierarchy). As shown and described herein and in the embodiment of FIG. 2C, the object dependency data structure 200 and/or the failure dependency hierarchy data 202 may enable the determination of key insights such as commonalities between critical event criteria (including across sessions and/or organizations), critical event dependencies (including across sessions and/or organizations), misaligned priorities, under-resourced sessions and/or failure event objects, over-assigned and under-assigned critical event criteria, and business intelligence and/or insight. For example, a critical hierarchy generation routine 402 may be used to assemble a failure dependency hierarchy data 202 from the object database 410 and/or object database 510. A hierarchy analysis routine 408 may filter, reduce, and/or analyze the failure dependency hierarchy, for example by quantifying a value in common (e.g., critical event objects 100 assigned to an instance of the user 702) or a value in common falling within a range (e.g., a risk value 113 above "80" on a 1 to 100 scale). The results may be visualized in a human readable form, for example in a user assignment report for critical event objects across one or more sessions and/or an object report visualizing dependencies across one or more sessions. The object dependency data structure 200 and/or the failure dependency hierarchy data 202 may therefore provide a useful analysis and communication data source and tool for the users 702 of a session, other users 702 of different sessions within the organization, or users 702 who are executives, directors, or managers of the organization. The object dependency data structure 200 and/or failure dependency hierarchy data 202 may also enable inter-organization communication and analysis.

The object server 500 may be an instance of the object server 400 enabling inter-organization communication and analysis. The object database 510 may include critical event objects 100 from multiple organizations, and may even draw dependencies between critical event objects 100 from different organizations (e.g., one organization generating a failure event object 102 that may be passed to another organization for the spawning of a new session, as further described herein). The object server 500 may also illustrate an association database 520 in which some key data and relationships may be stored for utilization by one or more organizations. The association database 520 may include a category data 552 associating one or more categories (e.g., "monetary resources") with critical event criterion data 104 ("financial hedges become unavailable due to low organization credit rating"). A template data 432 may provide the templating module 406 with one or more templates (e.g., a template for "iOS development" may be associated with a critical event criterion "Just prior to hard launch date the App Store rejects our app").

In one or more embodiments, a machine learning server 600 may assist in the initiation, framing, generation, evaluation and/or analysis of the session, the critical event objects 100, the critical event objects 100 and/or the object dependency data structure 200. In one or more embodiments, a risk model engine 604 may generate a predictive model (e.g., the predictive model 608 of FIG. 6) from training data, the predictive model receiving an input data from a failure event object 10 and outputting a probability of success, a probability of failure, or other data. In one or more embodiments, a risk model engine 612 may generate a predictive model (e.g., the predictive model 616 of FIG. 6) which may be generated from training data, the different predictive model receiving an input data from a session file 150 and outputting a probability of session success (e.g., project success), a probability of session failure (e.g., project failure), or other data. A critical criteria recommendation engine 620 may receive critical event criterion data 104 as an input and output a related critical event criterion data 104 to be considered and/or added to the evaluation queue 310. The machine learning server 600 and associated machine learning processes are further shown and described in conjunction with the embodiments of FIG. 6, FIG. 14, FIG. 15, and throughout the present embodiments.

Figure 2A:
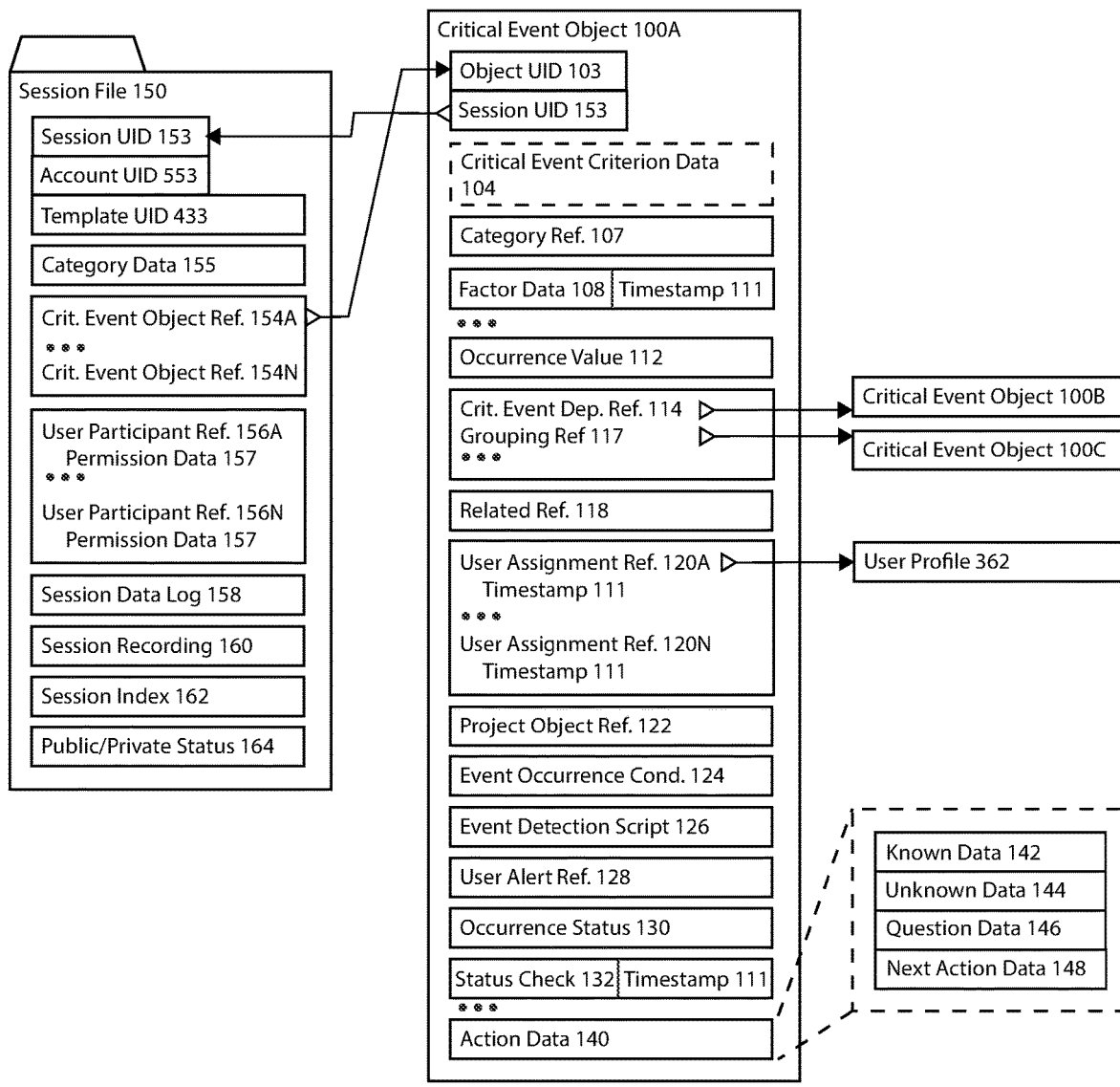
FIG. 2A illustrates critical event object of FIG. 1 and a session file, the critical event object comprising a number of attributes including a critical event criterion data that specifies a critical event related to success or failure of the project and a user assignment reference specifying a user profile of a user responsible for bringing about or preventing the critical event, the session file comprising a number of attributes that may include one or more critical event object references pointing to the critical event object and one or more user participant references that may have permission to participate in the session, according to one or more embodiments.

A number of data structures will now be described. FIG. 2A illustrates a session file 150 and a critical event object 100, according to one or more embodiments. The session file 150 may be stored on one or more servers in a file system and/or database in computer memory and/or on a data storage medium. For clarity in the present embodiments, sometimes the attribute is referred to and labeled, and sometimes the value is referred to and labeled. The session file 150 comprises a set of attributes and/or associated values, including for example: a session UID 153 (value), an account UID 553 (value), a template UID 433 (value), one or more critical event object references 154 (attribute, abbreviated "crit. event. object ref. 154"), a category data 155 (value and/or data stored or referenced by the session file 150), one or more user participant references 156 (attribute, abbreviated "user participant ref 156") each of which may have an associated permission data 157 (value), a session data log 158 (value and/or data stored or referenced by the session file 150), a session recording 160 (value and/or data stored or referenced by the session file 150), a session index 162 (value and/or data referenced by the session file 150), and/or a public/private status 164 (attribute).

The account UID 533 may specify an account profile 532 which owns, controls, or is otherwise associated with the session file 150. The account profile 532 may represent an organization, as further described in conjunction with the embodiment of FIG. 5. The template UID 433 may reference a template data 432 utilized to generate the session file 150 and/or define one or more of the attributes or values of the session file 150. The category data 155 specifies one or more categories to which critical event objects 100 may be assigned within the session file 150. For example, for iOS application development, the category data 155 may include "Backend Engineering", "Frontend UI/UX", "Service Provider", "Legal", etc.

A set of one or more critical event object references 154 may each reference one or more critical event objects 100. Specifically, in the example of FIG. 1B, the session file 150 is illustrated referencing the critical event object 100A through the critical event object reference 154A, where the critical event object reference 154A may be stored as a value the unique identifier 103 of the critical event object 100A. The session file 150 may also include one or more user participant references 156 which each may reference a user profile 362 of a user 702 who may participate in, or is otherwise associated with, the session file 150. The user participant reference 156 may store a value that is the unique identifier 363 as shown and described in the embodiment of FIG. 3. In addition, there may be a permission data 157 associated with each user participant reference 156. The permission data 157 may specify one or more actions the user 702 may make with respect to the session, e.g., their ability to manipulate data of the critical event objects 100 and/or the session file 150, their primary role in certain session functions (e.g., determining categorization of critical event objects 100, determining the factor data 108 assigned to critical event objects 100 assigned to a certain category, etc.), and/or other basic create, write, read, update and/or delete (CRUD) functions.

The session data log 158 may record data and/or metadata related to the session file 150, for example a time that certain data storage actions were taken, certain write, update, and/or delete operations performed, and data and events related to the event occurrence condition 124, the event detection script 126, the user alert reference 128, the occurrence status 130, and/or the status check 132, as further described below. In one or more embodiments, the session may be stored and then restored, as described below, in which case the session data log 158 may span multiple meetings and/or sub-sessions with respect to the session. A session recording 160 may be data and/or a reference to data that comprises a recording of voice, video, and/or other realtime communication with respect to the session file 150. The session index 162 may be data that, following indexing and/or speech recognition, relates the session recording 160 to one or more points in the session data log 158. This may, for example, help recall and evaluate the decision process and/or discussion around a given failure event. The public/private status 164 may store a value and/or data related to the availability of the session file 150 or any of its data to other account profiles 532. The public/private status 164 may, for example, be used as data designating the session as confidential and/or sharable, as further shown and described in conjunction with the embodiment of FIG. 5.

The critical event object 100 (instantiated in FIG. 2A as the critical event object 100A) may be stored on one or more servers in a file system and/or database in computer memory and/or on a data storage medium. For clarity in the present embodiments, sometimes the attribute is referred to and labeled and sometimes the value is referred to and labeled. The session file 150 comprises a set of attributes and/or an associated value, including for example: a unique identifier 103 (a value, shown as the "object UID 103"), a session UID 153 (a value), critical event criterion data 104 (value and/or data stored or referenced by the critical event object 100), a factor data 108 (value and/or data stored or referenced by the critical event object 100) and a timestamp 111 of the factor data 108 (value, data, or a reference to data), an occurrence value 112 (a value), one or more critical event dependency references 114 (attributes, abbreviated "crit. event dep. ref 114"), one or more grouping references 117 (attributes), a related reference 118 (attribute), one or more user assignment references 120 (attribute, abbreviated "user assignment ref 120") and a timestamp 111 of the user assignment reference 120, project object reference 122 (attribute, abbreviated "project object ref 122"), event occurrence condition 124 (attribute, abbreviated "event occurrence cond. 124"), event detection script 126 (attribute, value, and/or data stored or referenced by the critical event object 100), user alert reference 128 (attribute, abbreviated "user alert ref. 128"), an occurrence status 130 (attribute), status check 132 (attribute) and a timestamp 111 of the status check 132, and an action data 140 (comprising a set of known data 142 (attribute), unknown data 144 (attribute), question data 146 (attribute), and/or next action data 148 (attribute)).

The critical event criterion data 104 is data specifying a critical event with respect to the session and/or a project or organization related to the session. In one or more embodiments, the critical event criterion data 104 may be further instantiated as a success criterion data (e.g., a success criterion data 105, not shown, but numbered for illustrative purposes) and a failure criterion data (e.g., the failure criterion data 106 of FIG. 1C). The unique identifier 103 is a unique identifier and/or a globally unique identifier (GUID) by which the critical event object 100 can be individually addressed within a database. The critical event object 100 may also include a reference to one or more session files 150 to which it is associated, for example by storing the session UID 153.

In one or more embodiments, the critical event criterion data 104 may be an alphanumeric string specifying a critical event contributing to failure and/or success of a project. In one or more embodiments, the critical event criterion data 104 may be voice data, video data, image or graphical data, or other data that can specify the critical event. In one or more other embodiments, each of the users 702 may enter or otherwise specify and submit one or more critical event criterion data 104 through the client device 700. In one or more other embodiments, the critical event criterion data 104 may also be recommended (e.g., by the output of the critical criteria recommendation engine 620 and/or other machine learning outputs), extracted and pulled into the session (including as a result of selecting one or more templates and/or identification of recurring failures of the organization or its users 702), and/or through other automatic processes.

The category reference 107 may store a value specifying one or more categories to which the critical event object 100 is assigned, e.g., category values available to the session file 150. In one or more embodiments, however, the category of each critical event object 100 associated with a session file 150 may also be tracked within the session file 150.

The factor data 108 may be a value and/or data specifying a factor related to the success and/or failure of a critical event specified in the critical event object 100. In one or more embodiments, the factor data 108 may include a probability data 109 and an impact data 110, as further shown and described in conjunction with the embodiment of FIG. 1C. The factor data 108 may have a timestamp 111 storing a time at which time the factor data 108 was assigned. Any of the timestamps in the present embodiments may also be specified in the session data log 158 of the session file 150. The occurrence value 112 is a value specifying a consequence and/or risk with respect to the project and/or the session. For example, where the occurrence value 112 is high on a numerical or other scale, an actual occurrence of the critical event specified in the critical event criterion data 104 may have a high probability of contributing to success or failure of the overall project. In a specific example, where a failure criterion data 106 may have a risk value 113 greater than 70 on a scale of 0 to 100, the critical event object 100 may be determined to be of high priority, as further shown and described below.

One or more critical event dependency references 114 may reference one or more critical event objects 100 on which the critical event object 100 depends. In the embodiment of FIG. 2A, for example, the critical event object 100A is shown referencing a critical event object 100B. The critical event object 100B may be an instance of the critical event object 100 associated with a different session file 150B (not shown), may be a new session "spun off" and/or initiated from the present session, or may be a critical event object 100 defined by a different account profile 532 (e.g., controlled by a different organization). As just one example, where the session file 150 represents "what would cause our product recall to fail," the critical event object 100A may include a critical event criterion data 104 such as "rushed the reengineering causing another product recall," which may be used to initiate a new session (e.g., for an engineering team) where the session (e.g., a session file 150B, not shown) could be "what would cause the reengineered product to fail." The session file 150B may then include the critical event object 100B, which may include, for example, a critical event criterion data 104 specifying "failure to update specs to track intervening safety standards put in place since the original product launch." A related reference 118 may be a reference from the critical event object 100 to one or more other critical event objects 100, within or without the session and/or the organization, to which the critical event object 100 may relate in one or more additional ways. For example, a dependency outside of the hierarchical structure may be defined, e.g., manually by the users 702 of the session, manually by users 702 of a different session, or through automatic processes such as identified groupings in supervised and/or unsupervised machine learning techniques.

One or more user assignment reference 120 may reference one or more user profiles 362 responsible for or otherwise associated with the critical event object 100. In one or more embodiments, the user assignment reference 120 may store the unique identifier 363 of the first user profile 362 of a first user 702 assigned responsibility for preventing a failure event. A timestamp 111 of the user assignment reference 120 may specify a time at which the user 702 was assigned responsibility.

A project object reference 122 may store one or more data references to a project data object (e.g., the project data object 204), for example an object, database entry, or data entity storing project management software jobs, tasks, projects, and/or other items. In one or more embodiments, the project object reference 122 may reference a project data object 204 generated based on the critical event object 100 and communicated to a project management software application through an application programing interface (API).

An event occurrence condition 124 may specify a condition the occurrence of which will indicate that the critical event has occurred or may be imminent. The event occurrence condition 124 may be specified in a machine-readable format. For example, the condition could be a stock price (e.g., a stock of the organization) falling below a certain value as detected through an external API. The event occurrence condition 124 may be usable by one or more set of computer readable instructions (e.g., the event evaluation engine 332 of FIG. 3) to determine occurrence of the critical event. Alternatively, or in addition, the critical event object 100 may include an event detection script 126 which may specify one or more inputs in order to determine occurrence of an critical event. The event detection script 126 may be similarly executed by one or more systems (e.g., the event evaluation engine 332), for example according to a schedule or upon receipt of relevant input by a software agent. A user alert reference 128 may specify a user profile 362 to generate an alert upon determination of occurrence of the critical event or its imminent occurrence, for example for transmission to an administrative user of the session, the user 702 assigned to the critical event object 100, and/or a user 702 not associated with the session such as a manager and/or executive of the organization. The occurrence status 130 may specify whether the critical event has occurred (and/or, based on the event occurrence condition 124 and/or the event detection script 126, is believed to have occurred within a certainty). For example, the occurrence status 130 may be equal to null, "failed," "succeeded," "averted," or another value. The value stored in association with the occurrence status 130 in each case may be referred to as a failure value, a success value, and/or an averted value, as applicable.

A status check 132 may represent another source of data in which the progress of success or aversion of failure may be tracked for the critical event object 100. In one or more embodiment, the status check 132 may be focused on feedback from users 702 to which the critical event object 100 is assigned and/or from other users 702 associated with the session file 150. Periodically, randomly, and/or upon set conditions, a request may be generated and sent to the user 702 on the client device 700 to provide feedback as a current disposition of the critical event associated with the critical event object 100. For example, the user 702 may be asked to provide a subjective value representing their feeling toward progress and/or may be asked to modify or update the action data 140 (as described below). The status check 132 may have an associated timestamp 111 (and/or timestamps may be logged in the session data log 158 of the session file 150). The user 702 may also be asked to update other data of the critical event object 100 and/or restructure the object dependency data structure 200. The status check 132 may provide a rich data source for analyzing a failure dependency hierarchy data 202, as further described below.

The critical event object 100 may also include an action data 140, which may be a set of data manually and/or automatically added to the critical event object 100. A known data 142 may be information known about the critical event, including information needed to cause it to succeed, prevent it from occurring (if needed to prevent failing), increase or decrease the probability of occurrence (if needed to succeed), increase or decrease impact upon occurrence, and/or other similar information. The unknown data 144 may include information which is generally thought to be relevant or a factor but the exact nature of which may be currently unknown. The question data 146 may be, for example, one or more unanswered questions with respect to the critical event object 100, the critical event criterion data 104, and/or the critical event. The next action data 148 may include information specifying a next action for the users 702 of the session to take to increase probability of success or decrease probability of failure, as the case may be, for example gathering additional information, seeking additional resources, completing one or more tasks, etc. In one or more embodiments, the known data 142, the unknown data 144, the question data 146, and the next action data 148 may be each be stored as an alphanumeric string specified by the users 702 during the session. The time at which any of the action data 140 was added to and/or modified in the critical event object 100 may be recorded and/or tracked in the session data log 158 or in one or more timestamps stored within the critical event object 100 (not shown). The action data 140 may also provide a rich data source for analyzing a failure dependency hierarchy data 202, as shown and described below.

FIG. 1C illustrates a failure event object 102 that is an instantiation of the critical event object 100 of FIG. 1 and an associated session file 150, according to one or more embodiments. The failure event object 102 may be negatively framed and/or be associated with a negatively framed session. Such framing may provide some organizational and data modeling advantages in some cases, for example by encouraging the team working on the project (e.g., the users 702) to confront difficult possibilities, store explicit failure-related data and/or choices, and/or store information such that it is actionable, analyzable, and/or subject to machine learning techniques. Additional examples and discussion of the failure event object 102 and/or the failure criterion data 106 are shown and described throughout the present embodiments.

In the example of FIG. 1C, the session file 150 comprise a session UID 153, a category data 155, and a set of critical event dependency references 114 instantiated as the failure dependency reference 116A through the failure event reference 116N. The session file 150 also may associate one or more user profiles 362 (e.g., a user profile 362A through a user profile 362N, not shown) through a corresponding number of user participant references 156 (e.g., the user participant reference 156A through the user participant reference 156N), each of which may be associated with a permission data 157. The failure dependency reference 116A may store an associated value that is the unique identifier 103 of the failure event object 102.

The failure event object 102 may include a unique identifier 103 and a reference to the session file 150 through an attribute storing the session UID 153. In one or more embodiments, the failure criterion data 106 may include an alphanumeric string specifying a failure event. The category reference 107 may specify a category to which the failure event object 102 is associated (e.g., within the session file 150).

In the present embodiment of FIG. 1C, an instantiation of the factor data 108 and occurrence value 112 are demonstrated. The probability data 109 may be a data specifying the estimated probability of the failure event occurring. For example, the probability data 109 may be a probability function that depends on one or more variables (including changing probabilities over time according to a function based on external inputs from an API), and/or may be a value specified by the users 702 that may be a perceived probability based on research and/or personal experience. The impact data 110 may be a data specifying the estimated impact, severity, and/or consequence of the failure event occurring. For example, the impact data 110 may be an impact function that depends on one or more variables (including changing over time according to a function based on external inputs from an API), and/or may be a value specified by the users 702 that may be a perceived impact based on research and/or personal experience. For example, as goodwill accrues in a brand name, an impact of rebranding and/or costs associated with rebranding may increase over time.

The risk value 113 may be a value generated based on the probability data 109, the impact data 110, and/or other instances of the factor data 108. In one or more embodiments, the risk value 113 may be calculated continuously and/or periodically based on the output of one or more functions of the probability data 109 and/or the impact data 110. In one or more other embodiments, the risk value 113 may be based on a direct calculation based on a value of the probability data 109 and a value of the impact data 110. For example, where the probability data 109 is a probability value of "6" on a scale of one to ten, and the impact data 110 is an impact value of "8" on a scale of one to ten, a function may multiple the probability value and the impact value to result in a risk value of "48" out of one hundred. In one or more embodiments, a higher value of the risk value 113 may correlate with increased need for attention, resources, timeline, and/or further evaluation. For example, where application of a statistical and/or simulation model requiring high performance computing (e.g., HPC, or "supercomputing") may be part of a project, a high risk value 113 may directly correlate with the amount of supercomputing time or parallel processing allotted to the modeling to increase accuracy.

The failure event object 102 of the embodiment of FIG. 1C further includes a user assignment reference 120, for example assigning responsibility for averting a failure event specified by the failure criterion data 106 to a user 702 associated with the user profile 362 referenced by the user assignment reference 120. Although one instance of the user assignment reference 120 is shown, multiple users 702 may be assigned to each failure event object 102, user assignment may change at various times during the project associated with the session (e.g., a new employee joining the organization, additional human resources being attached to avert a potential failure event, etc.). In other instances, no users 702 may be assigned to the failure event object 102. Although certain attributes and values are shown for the failure event object 102 of FIG. 1C, the failure event object 102 may have additional or fewer attributes and values, and/or may include any of the attributes, values, and/or other elements of the critical event object 100 of FIG. 2A.

Figure 2B:
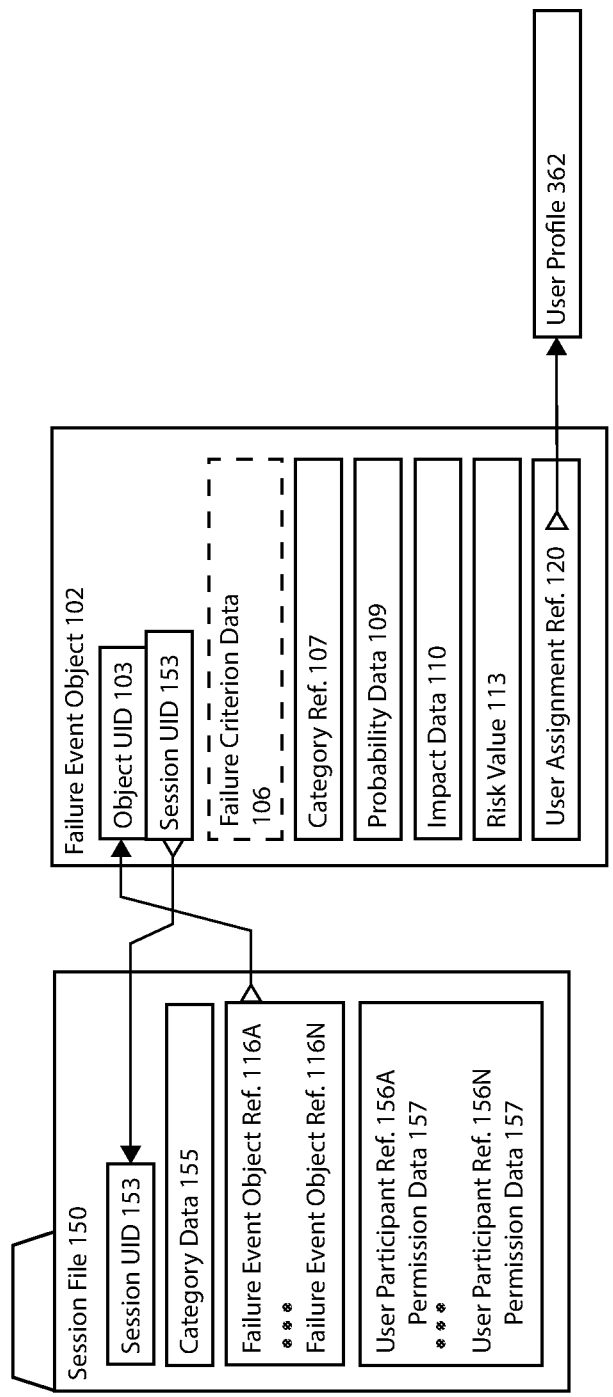
FIG. 2B illustrates an instantiation of the session file and the critical event object of FIG. 2A that is a failure event object, the failure event object including a failure criteria data, a category reference to a category for consideration, a probability data that the failure will occur, an impact data of an impact should the failure occur, a risk value generated based on the probability data and the impact data, and the user assignment reference, according to one or more embodiments.
Figure 2C:
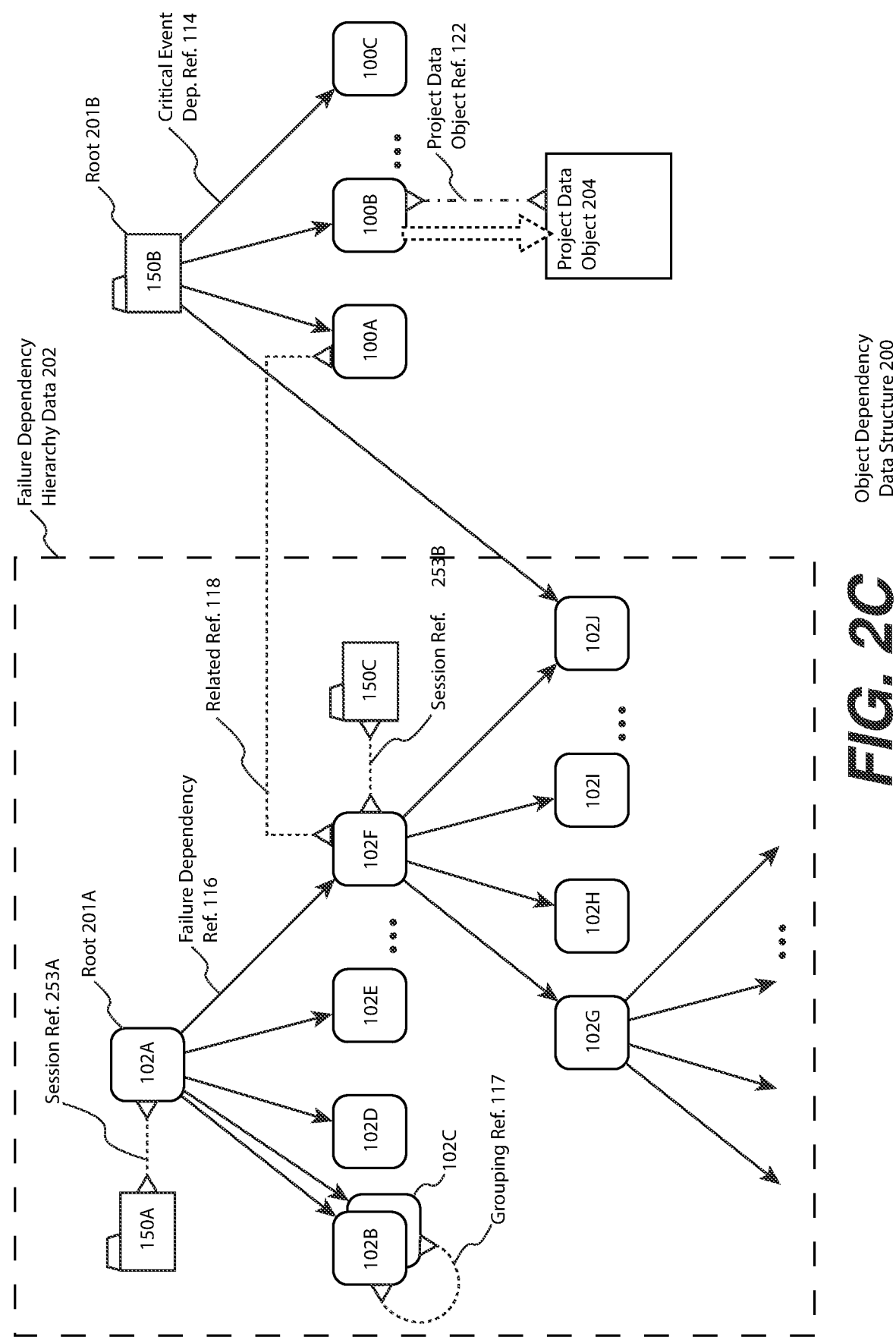
FIG. 2C illustrates an object dependency data structure in which instances of the critical event objects reference one another through critical dependency references, and further illustrates a root of a failure event object able to be queried assemble a failure dependency hierarchy usable for analysis of projects and/or project failure dependencies, according to one or more embodiments.

FIG. 2C illustrates an object dependency data structure 200 that may organize and relate a set of two or more critical event objects 100, according to one or more embodiments. In the embodiment of FIG. 2C, an organization (e.g., represented by an account profile 532) may have initiated, may be actively working on, and/or may have completed one or more sessions. Each of the sessions may be modeled through a session file 150 used for storing data of each session. For example, the session file 150A may relate to a first project, and a session file 150B may relate to a second project. Following one or more processes shown and described throughout the present embodiments, a session file 150 may have associated one or more critical event objects 100 associated (e.g., through the critical event object reference 154 shown and described in conjunction with FIG. 2A). In one or more embodiments, the session may itself be represented by a critical event object 100. For example, the session file 150A may include a session reference 253A to the failure event object 102A, where the failure event object 102A then references the failure event objects 102B through the failure event objects 102F associated with the session as dependencies. Alternatively, or in addition, a session file 150B may directly reference the set of critical event objects 100 associated with the session. Each of the double open-ended arrows in the embodiment of FIG. 2C may represent a one-way and/or two-way reference that is possible to define between data objects. For example, the session reference 252 may be a reference from the session file 150 to a failure event object 102 and/or a reference from the failure event object 102 to the session file 150, as shown and described in conjunction with the critical event object reference 154 and the session UID 153 in the embodiment of FIG. 2A and FIG. 2B.

In the embodiment of FIG. 2C, the session file 150A may have associated, directly and/or by way of the failure event objects 102A and through one or more failure dependency reference 116 (for simplicity, one is labeled): the failure event object 102B, the failure event object 102C, the failure event object 102D, the failure event object 102E, and the failure event object 102F. The failure event object 102B is shown grouped with the failure event object 102C through the grouping reference 117. The failure event object 102F includes a related reference 118 to the critical event object 100A. The failure event object 102F may also have an associated session file 150C through the session reference 253B, as may occur, for example, if a session is created from and/or "spun off" from the failure event object 102F. The failure event object 102F is in turn illustrated as referencing, each through a failure dependency reference 116 (unlabeled), the failure event object 102G through the failure event object 102J. The failure event object 102G is further shown establishing four references to another set of failure event objects 102 (not shown). The failure event object 102G illustrates that the failure dependency reference 116 may be defined even when a new session is not initiated, for example where one or more failure event objects within the session file 150C are defined by the users 702 to explicitly depend on one another.

The session file 150B is shown drawing references, through a set of critical event dependency references 114 (one is labeled): to the failure event object 102J, the critical event object 100A, the critical event object 100B, and the critical event object 100C. The session file 150B illustrates the possibility for mixing of various types of critical event objects 100 within the object dependency data structure 200. Specifically, in the embodiment of FIG. 2C, the inclusion of both the failure event objects 102 (e.g., the failure event object 102J) and the critical event objects 100 (e.g., the critical event object 100A) is illustrated. The session file 150A and the session file 150B also illustrate that the object dependency data structure 200 may have multiple top-level objects, or roots (e.g., the root 201A, the root 201B), as further described below. For example, sessions that begin independently may be eventually connected through one or more references, either explicitly defined by a user 702 or as may be automatically inferred and/or recorded, for example through machine learning technology and techniques to recognize associations. The session file 150A and the session file 150B may even be owned and/or controlled by different account profiles 532 (e.g., each of which may represent an organization), with commonly referred to objects (e.g., the failure event object 102J) and possibly any dependencies copied and/or provided with read and/or write access to one or both of the organizations.

When evaluating and/or analyzing a project, a critical event object hierarchy may be assembled from the object dependency data structure 200. A root 201A may be selected, which may be an arbitrary session file 150 and/or failure event object 102. A critical event object dependency hierarchy may then be assembled and analyzed. The root 201 does not need to be a top-level object, but may be selected anywhere in the data structure. In the example embodiment of FIG. 2C, selection of the session file 150A will result in a query on the failure event object 102 and traversal along each of the failure dependency references 116 (one is labeled) to each of the failure event objects 102B through 102F. Upon detecting additional dependencies, failure dependencies references 116 from the failure event object 102F, each will be traversed to the failure event object 102G through the failure event object 102J. Failure dependency references 116 may continue to be traversed until end points are reached, e.g., a failure event object 102 lacking a failure dependency reference 116. Upon assembly, the failure dependency hierarchy data 202 may be stored data that includes the unique identifier 103 of each failure event object 102, their dependency relationship, and/or additional data extracted from each failure event object 102 within the failure dependency hierarchy data 202. Similarly, a critical event object hierarchy may be stored data that includes the unique identifier 103 of each critical event object 100, their dependency relationship, and/or additional data extracted from each critical event object 100 within the critical event dependency hierarchy. Assembly and analysis of the failure dependency hierarchy data 202 is further shown and described in FIG. 4, FIG. 13, and throughout the present embodiments. FIG. 2C further illustrates a one-way or two-way reference between the critical event object 100B and the project data object 204, e.g., effected through the project object reference 122. For example, the project data object 204 may be an entity of an open or proprietary data model such as Jira, Glip, Smartseet, Wrike, Asana, Monday.com, Proofhub, and similar software and systems.

FIG. 3 illustrates an orchestration server 300, according to one or more embodiments. The orchestration server 300 may perform one or more functions alone or in combination with other servers, including orchestrating and/or managing sessions, initiating and/or building critical event objects 100, gathering factor data 108, determining and/or evaluating the occurrence of critical events, according to one or more embodiments. The orchestration server 300 may also, along or in combination with other servers, assess risk and/or risk thresholds of critical event objects 100, initiate and/or coordinate realtime communication, store and manage user profiles 362 of users 702, authenticate users 702 and/or client devices 700, and/or generate project data objects 204 for use in or in combination with a project management software, according to one or more embodiments. The orchestration server 300 includes a processor 301 that is a computer processor and a memory 303 that is a computer memory (e.g., random access memory, solid state memory, virtual memory). The orchestration server 300 may be connected to the network 180.

The orchestration server 300 may include a session orchestration system 302, which may comprise a session initiation routine 304, a timer subroutine 308, a privilege management module 306 (abbreviated "privilege mange. module 306"), one or more evaluation queues 310, an auxiliary session data routine 312, a session storage subroutine 314, a session loading subroutine 316, and/or a session spawning subroutine 318.

The session initiation routine 304 may be software code that creates a session for one or more of the users 702 to create, build up, and evaluate data objects representing events related to success and failure, and interdependencies of those events. In one or more embodiments, the session initiation routine 304 includes computer readable instructions that when executed on a processor (e.g., the processor 301) initiates a session comprising a session UID 153 and provisioning computing resources including a computing memory (e.g., assigned registers within the memory 303) and a processing power (e.g., processing time on the processor 301, including without limitation through virtualization and/or containerization). In one or more embodiments, the session initiation routine 304 includes computer readable instructions that when executed on a processor generate a user addition request 305 to associate a unique identifier 363 of a user profile 362 with the session UID 153 (e.g., through the user participant reference 156). The session initiation routine 304 may initiate upon receiving an instruction from a user 702 with administrative privilege. The session initiation routine may also carry out additional operations of session setup, for example: setting a session name, selecting a template (as described below and throughout the present embodiments), defining a critical event object 100 associated with the overall session, storing a session file 150 associated with the session, and/or reserving other resources required for the session (e.g., bandwidth on a network to ensure good performance of realtime communication of the session).

A privilege management module 306 may be a stored set of software that registers one or more users profiles 362 with privileges with respect to the session, and/or sets one or more permissions of user profiles 362 associated with the session (e.g., defines parameters of the permission data 157). The privileges may be set up by a user 702 associated with a user profile 362 initiating the session setup by an outside admin user (e.g., a manager not directly participating in the session), or through other means.

One or more users 702 may join the session, including through invitations through one or more communication channels such as email, text message, messaging application, project management software messaging functions, and/or other channel of communication. In one or more embodiments, a realtime communication module 309 (abbreviated "realtime comm. module 309") may initiate or establish realtime communication, either acting as a server and/or coordinating external services. Alternatively, or in addition, the session may be conducted asynchronously such that users may log in together or work independently.

The sessions may be secured, including to protect confidential information of the team and/or organization. In one or more embodiments, each of the users 702 participating in the session must be registered with a user profile 362 requiring the user 702 to log into the orchestration server 300 and/or a different server. An authentication system 307 may be a software application that verifies an identity of the user 702 and/or the client device 700 of the user 702 through one or more authentication factors. The authentication factors may be, for example, something the user is (e.g., a biometric), something the user has (e.g., a fob, a phone), and/or something the user knows (e.g., a password, a passphrase). Other security features may be the encryption of the session file 150 and/or the critical event objects 100 (or any of their constituent data) in transit or at rest (e.g., as stored in one or more databases).

Following joining of one or more users 702, the session may begin. One of the first actions may be to define and/or submit initial data for building one or more critical event objects 100. The session orchestration system 302 may include software code that calls for, assists in creating, and/or receives critical event criterion data 104 (e.g., failure criterion data 106). In one or more embodiments, the session orchestration system 302 receives a critical event criterion data 104 (e.g., a failure criterion data 106) that includes an alphanumeric string specifying a critical event (e.g., a failure event). The critical event criterion data 104 may be manually received from one or more users 702, and/or through additional means shown and described throughout the present embodiments. The session orchestration system 302 may call the object generation engine 320 with the critical event criterion data 104, as described below.

In one or more embodiments, a timer subroutine 308 may time one or more aspects of the session, for example to promote efficiency. In one or more embodiments, the timer subroutine 308 includes computer readable instructions that when executed on the processor 301 of the orchestration server 300 initiates a timer for receipt of a critical event criterion data 104 (e.g., a success criterion data 105, a failure criterion data 106), and then determines expiration of the timer. Expiration of the timer may be a guideline, or may change a user interface or otherwise disallow submissions to encourage and/or require a next step in a critical event object 100 building process.

An evaluation queue 310 may store (e.g., in the memory 303) one or more critical event criterion data 104 and/or partially completed critical event objects 100. For example, each of the critical event criterion data 104 submitted, defined, and/or otherwise included in the session may be initially stored in the evaluation queue 310 for further consideration as data is associated with each one, e.g., as the critical event object 100 associated with each critical event criterion data 104 continues to develop.

In one or more embodiments, the users 702 may act as a primary source of the failure criterion data 106. Alternatively, or in addition, an auxiliary session data routine 312 may include software code that retrieves additional critical event criterion data 104. In one or more embodiments, the auxiliary session data routine 312 includes computer readable instructions that when executed on a processor determines a critical event object 100 (e.g., a failure event object 102) is associated with an occurrence of the organization (e.g., a project failure of the account profile 532). The auxiliary session data routine 312 may also include computer readable instructions that when executed on a processor extract a failure criterion data 106 of a first failure event object 102 (and optionally a probability data 109 of the failure event object 102, an impact data 110 of the failure event object 102, and/or a risk value 113 of the failure event object 102) and generate a second failure event object 100 that includes the failure criterion data 106 of the first failure event object 102. The auxiliary session data routine 312 may also include computer readable instructions that when executed associate the second failure event object 102 with the session (e.g., defining the critical event object reference 154 within the session file 150). The second critical event object 100 may be added to the evaluation queue 310.

According to one or more embodiments, the activity of the session may be saved and/or continued. A session storage subroutine 314 may save the session (e.g., in a session file 150) and/or shut down the session. Conversely, the session loading subroutine 316 may reopen the session. The session may be reopened in order to, for example: finish the session that was ended early, update information, change aspects of the data structure of one or more critical event objects 100, add data, or effect other purposes. In one or more embodiments, the session storage subroutine 314 includes computer readable instructions that when executed on a processor stores a session file 150 that includes the session UID 153 and unique identifiers 103 of a plurality of critical event objects 100 (e.g., failure event objects 102). In one or more embodiments, the session loading subroutine 316 includes computer readable instructions that when executed on a processor restore the session from the session file 150, including possibly re-initiating the realtime communication channel (e.g., through a call to the realtime communication module 309).

One or more additional sessions may be created and/or spawned based on data within the present session. For example, in one or more embodiments, a user 702 may have the option to create a session by selecting a graphical icon representing a critical event object 100 (e.g., click a button such as "create new session"). As a result, a new session may be initiated by the session initiation routine 304 (possibly with the user 702 as an initiator with administrative privilege by default). In one or more embodiments, the session spawning subroutine 318 includes computer readable instructions that when executed on a processor generate a new session based on a first critical event object 100 (e.g., a first failure event object 102). The session spawning subroutine 318 may also include computer readable instructions that when executed determine that a first user profile 362 is associated with the first critical event object 100 (e.g., specified through a user assignment reference 120), and may generate a call to register the first user profile 362 associated with the first critical event object with administrative privileges with respect to the new session (e.g., as may be defined in the permission data 157).

Initiation, generation, and/or building of the critical event objects 100, and possible storage and placement within the object dependency data structure 200, will now be described. The object generation engine 320 may be a software application and/or components of a software application that create, store, modify, and define relations between critical event objects 100 within a computer memory, including defining any of the attributes and/or associated values illustrated in the embodiments of FIG. 2A and FIG. 2B. In one or more embodiments, each critical event object 100 is initially generated for each received instance of the critical event criterion data 104. In one or more embodiments, the object generation engine 320 includes computer readable instructions that when executed on a processor receive a critical event criterion data 104 (e.g., a failure criterion data 106) that includes an alphanumeric string specifying a critical event (e.g., a failure event). The critical event criterion data 104 may be received from a call from the session orchestration system 302. In one or more embodiments, one or more critical event objects 100 may be assembled completely or to a defined stopping point before a next critical event object 100 is assembled or brought to the defined stopping point (e.g., withdrawn from the evaluation queue 310 and completely considered by the team and data added before proceeding to the next). Alternatively, or in addition, many or all of the critical event objects 100 may be considered for one or a set of attributes at a time (e.g., define a category for each, then assign users 702 to each, etc.).

An object initiation routine 322 may include software code that initiates and/or creates the critical event object 100 in computer memory. In one or more embodiments, the object initiation routine 322 includes computer readable instructions that when executed on a processor generate a critical event object 100 (e.g., a failure event object 102) in the computing memory (e.g., the memory 303), including the failure criterion data 106 and optionally a unique identifier 103 of the failure event object. In one or more embodiments, and if the failure criterion data 106 is determined to be unique (e.g., a unique string), the failure criterion data 106 may also act as the unique identifier 103. In one or more other embodiments, a random alphanumeric string may be generated and assigned for the unique identifier 103, including through use of hash functions or other functions known in the art for generating GUIDs. The object initiation routine 322 may further include computer readable instructions that when executed store the critical event objects 100 (e.g., the failure event object 102) in the evaluation queue 310.

Each of the critical event objects 100 may be associated with a category. The categorization may assist both for intra-session efficiency of organizing, discussing, and assigning data to the critical event objects 100, and/or for later analysis purposes (e.g., a query of the failure dependency hierarchy for all failure event objects 102 categorized as "funding", "money", or "monetary resources"). In one or more embodiments, the categorization subroutine 324 includes computer readable instructions that when executed associate a category value (e.g., through a category reference 107) with the critical event object 100 (e.g., the failure event object 102). In one or more embodiments, categories available for selection may be freely assigned by the users 702 of the session (e.g., as stored in the category data 155 of the session file 150). Alternatively, or in addition, categories may be preassigned through a template, automatically detected and/or recommended, or may be initially pulled by default setting from a given account profile 532 (e.g., an organizational policy that all projects must consider the effect of the disclosure of confidential information leading to destruction of trade secrets).

The critical event objects 100 may be optionally grouped within categories. For example, two or more critical event objects 100 each having similar, related, or subsumed critical event criterion data 104 may be associated (e.g., through the grouping reference 117 as shown in FIG. 2A and FIG. 2C) or merged (e.g., the users 702 may select one instance of the critical event criterion data 104 to survive, while the other is deleted or deprecated). In one or more embodiments, a grouping subroutine 229 includes computer readable instructions that when executed associate a first critical event object 100 with a second critical event object 100 through a grouping reference 117.

Each of the critical event objects 100 may be associated with a factor data 108. A factor retrieval routine 325 includes software code that retrieves and/or receives the factor data 108. In one or more embodiments, the factor retrieval routine 325 includes computer readable instructions that when executed on a processor receive a probability data 109 and/or receive an impact data 110, as each are described, above. The factor retrieval routine 325 may receive the factor data 108 from each of the users manually (e.g., a user 702 inputting the factor data 108 into the client device 700), semi-automatically (e.g., recommending a probability data 109 to the user 702 for confirmation), and/or automatically (e.g., retrieving a probability data 109 from a database, including, for example, in association with templated critical event objects 100 automatically added to the session for evaluation).

In one or more embodiments, the factor retrieval routine 325 includes computer readable instructions that when executed queries a probability data source, receives the probability data 109, queries an impact data source, and receives the impact data 110. The probability data source may include a first database including a plurality of critical event objects 100 from a plurality of sessions generated by one or more accounts, e.g., the object database 510 of FIG. 5. Similarly, the impact data source may include a second database that includes critical event objects 100 from the plurality of sessions generated by the one or more accounts, e.g., also the object database 510 of FIG. 5.

The factor data 108 may be utilized during and/or after the session to calculate an occurrence value 112. In one or more embodiments, the occurrence value 112 is generated during the session and may be used as a primary metric to help guide discussion, strategy, action items, and the allocation of resources (including without limitation the assignment of human resources through assignment of responsibility of one or more of the users 702). A risk assessment routine 342 includes software code that can receive as input one or more pieces of data, such as the factor data 108, and generate as an output a score usable to assess risk assignable to the critical event object 100. As just one example, where a failure event object 102 stores a failure criterion data 106 that includes "inclement weather decreases turnout," the factor data 108 may include one or more historical weather data or predicted weather metrics, such as humidity and atmospheric pressure. In another example, where the failure event object 102 stores a failure criterion data 106 that includes "our advertising network contract is terminated for failure to meet quality controls during ad serving" (or simply, "failure to meet contractual quality controls"), the factor data 108 may be a request for the user 702 to provide an approximation of the percentage of contract breaches for similar agreements over a period of time and/or an estimate of ad quality over time (e.g., which may require research or speaking to others within the organization).

In one or more embodiments, the factor data 108 may be a function with external inputs that changes over time. For example, a probability data 109 may be a probability function that depends on one or more inputs automatically received and/or provided by the users 702 during the session and/or periodically thereafter. Similarly, an impact data 110 may be a function that accepts inputs automatically received and/or provided by the users 702 during the session and/or periodically thereafter.

In one or more embodiments, a first factor data 108 may a probability value, and a second factor data 108 may be an impact value. The probability value and the impact value may be provided by the user 702 during the session. As one example, the users 702 participating in the session may discuss and define the probability value and impact value for each critical event object 100 withdrawn from the evaluation queue. In one or more other embodiments, the users 702 may each enter their own factor data 108, with the results averaged or weighted (e.g., the impact value being set to the average impact value selected by all users 702, which may be referred to as an averaged impact value).

In one or more embodiments, a factor adjustment subroutine 347 may include software code that adjusts one or more of the factor data 108, for example based on a rule and/or function. For example, weighting may occur based on the relevance of background knowledge recorded in a user profile 362 with respect to the critical event object 100, for example natural language matches between the data of the user profile 362 and an alphanumeric string of the critical event criterion data 104. In one or more embodiments, the factor adjustment subroutine 347 includes computer readable instructions that when executed generate an adjusted probability data 109C from a first probability data 109A and a second probability data 109B. The adjusted probability data 109A may be an average and/or a weighted average. The factor adjustment subroutine 347 may also include computer readable instructions that when executed generate an adjusted impact data 110C from the first impact data 110A and the second impact data 110B. The first probability data 109A and the first impact data 110A may be received from and/or defined by a first user 702A and the second probability data 109B and the second impact data 110B received from and/or defined by a second user 702B. The adjusted impact data 110A may be an average and/or a weighted average. The adjusted impact data 110C and/or the adjusted probability data 109C may be determined based on a first weight factor associated with the user profile 362A of the first user 702A and a second weight factor associated with the user profile 362B of the second user 702B. The risk value 113 may then be determined by inputting the adjusted probability data 109A and/or the adjusted impact data 110C into the risk assessment function 343.

In one or more embodiments, the risk assessment routine 342 includes computer readable instructions that when executed generate a risk value 113 by inputting the probability data 109 and the impact data 110 into a risk assessment function 343. In one or more embodiments, the risk assessment function 343 may be a multiplication between an output of the probability data 109 and the output of the impact data 110. The risk assessment routine 342 may also include computer readable instructions that when executed store the probability data 109, the impact data 110, and/or the risk value 113 in association with the failure event object 102.

At some point in the generation of a set of critical event objects 100, there may be a large number for further consideration. Through the process of building each critical event object 100, threats, opportunities, and/or risks may be increasingly apparent to the set of users 702 engaging in the session and/or to the organization. The group of users 702 may determine, through subjective and/or objective analysis and the process of building each critical event object 100, that some of the critical event objects 100 are more relevant, important, and/or in need of resources than others. In one or more embodiments, additional automatic assistance and/or analysis may be utilized to reduce and/or filter the total number of critical event objects 100 to help assign resources. The risk threshold routine 340 may include software code that determines a most relevant and/or important set of critical event objects 100 to be addressed by the users 702. In one or more embodiments, the risk threshold routine 340 may call an object sorting subroutine 346 that may sort the set of critical event objects 100 associated with the session based on a value such as the occurrence value 112 (e.g., the risk value 113). In one or more embodiments, the risk threshold routine 340 includes computer readable instructions that when executed determine a subset of the plurality of instances of the critical event objects 100 that are above the risk threshold value calculated by a risk threshold function 341. For example, the risk threshold function 341 may select the top half of the sorted critical event objects 100 and/or may select any critical event object 100 with an occurrence value 112 above a threshold value. In one or more embodiments, a visualization module 350 includes computer readable instructions that when executed generate a visualization of one or more UI elements each representing the one or more critical event objects 100 relative to the risk threshold value. For example, each of the critical event objects 100 may be represented by a small UI "card" with the critical event criterion data 104 as text inside the top of the box, the risk value 113 in the bottom of the box, and a dividing line separating those instances of the critical event objects 100 above the threshold value versus those below. The UI may be rendered on the display 704 of the client device 700 on which the user 702 may primarily interact with the backend processes (e.g., running on the orchestration server 300, the object server 400, the object server 500, the machine learning server 600, etc.).

A dependency routine 330 may include software code that defines one or more dependency references (e.g., the critical event dependency reference 114, the failure dependency reference 116) within the object dependency data structure 200. In one or more embodiments, the dependency routine 330 includes computer readable instructions that when executed on a processor store within a referential attribute of a critical event object 100A (e.g., the critical event dependency reference 114, the failure dependency reference 116) a unique identifier 103 of a second critical event object 100B to define a critical dependency (e.g., a success dependency, a failure dependency), including for example to form a failure dependency hierarchy data 202. Dependencies may also be automatically recommended and/or confirmed by one or more of the users 702.

In one or more embodiments, the factor association subroutine 326 comprises computer readable instructions that when executed associate at least one of the factor data 108 (e.g., the probability data 109, the impact data 110) and the occurrence value 112 (e.g., the risk value 113) with the critical event object 100. For example, an attribute-value pair may be stored for each of the factor data 108 and the occurrence value 112, as shown and described in conjunction with the embodiments of FIG. 2A and FIG. 2B.

To this point in the explanation of the present embodiment, and depending on the order of operations defined in the orchestration server 300 and/or procedure of the session, there may be a set of critical event objects 100, each with an associated critical event criterion data 104. Each of the critical event objects 100 may store and/or reference a unique identifier 103, a category, one or more factor data 108, an occurrence value 112, and have one or more critical event dependency references 114 assigned. The set of critical event objects 100 for further consideration may have been sorted (e.g., prioritized), and/or filtered, and/or reduced to limit further time expended on those falling below a certain threshold.

Resources may then be assigned to each of the critical event objects 100, including monetary, material, temporal, and/or human resources. The user assignment routine 328 may include software code that associates one or more user 702 with one or more critical event objects 100, for example for responsibility, reporting, alerts, or to take other further action with respect to the critical event objects. In one or more embodiments, a user assignment routine 328 includes computer readable instructions that when executed receive a selection of the unique identifier 363 of a user profile 362 (e.g., which may be selected by one or more users 702 in the session) and associate the unique identifier 363 of the user profile 362 with the unique identifier 103 of the critical event object 100 to assign responsibility to the user 702 of the user profile 362 for preventing the failure event.

Users 702 may also be reassigned, including in a later sub-session or follow-up meeting of the session. In one or more embodiments, the user assignment routine 328 further includes computer readable instructions that when executed overwrite a first unique identifier 363 of a first user profile 362A of a first user 702A assigned responsibility for preventing the failure event. The first unique identifier 363 may be overwritten with a second unique identifier 103B of a second user profile 362B of a second user 702B newly assigned responsibility for preventing the failure. In one or more embodiments, user profiles 362 may be automatically recommended and/or assigned to critical event objects 100 based on past performance of the users, predicated synergy based on data of the user profile 362, and other data sources.

The users 702 may then take additional actions. The users 702 associated with the session and/or users 702 assigned to critical event objects 100 may add additional data, for example that action data 140 shown and described in conjunction with the embodiment of FIG. 2A. The users 702 (and/or other users 702 or automated process of the organization) may run a report on each of the sessions and its resulting data. In one or more embodiments, a report subroutine 348 includes computer readable instructions that when executed generate a report that may include a name of the user profile 362 (e.g., the name 364) and one or more critical event objects 100 assigned to the user profile 362.

A project data object 204 may also be generated from and/or based on one or more of the critical event objects 100. The project object creation module 353 may include software code that integrates one or more sets of computer readable instructions and/or software code with project management software, for example: Jira, Glip, Smartseet, Wrike, Asana, Monday.com, Proofhub, and similar software and systems. In one or more embodiments, the project object creation module 353 may involve a workflow for setting up a project within a project management software, while piping data through integration API calls to the project management software. In one or more embodiments, the project object creation module 353 includes computer readable instructions that when executed generate a project data object from the critical event object 100.

An event evaluation engine 332 may include software code to define critical events in machine-readable code, detect potential occurrences of critical events, and/or evaluate the potential occurrences to determine actual occurrences of critical events. A critical event definition module 334 may include software code usable to define objective, code-based logic for detection of a critical event. In one or more embodiments, the logic may be stored as the event occurrence condition 124 and/or as the event detection script 126 within and/or in association with the critical event object 100. For example, a critical event that may be automatically detectable may be a decrease in stock price of the organization, as may be gathered through external APIs. In one or more embodiments, the critical event definition module 334 includes computer readable instructions that when executed on a processor stores a failure condition data (e.g., an instantiation of the event occurrence condition 124) specifying a failure condition and/or a failure detection script (e.g., an instantiation of the event detection script 126) that when executed on a computer processor evaluates an input to determine the failure condition as an output of the failure detection script. The failure detection script 126 may be arbitrarily complex, or may have intentionally limited capabilities. A critical event detection module 336 includes computer readable instructions that when executed on a processor detect a potential occurrence of the critical event (e.g., a failure event, a success event), for example by receiving relevant data as a software agent. The critical event assessment module 338 includes software code that evaluates occurrence of the critical event (e.g., occurrence of a failure event, occurrence of a success event). For example, the input data may be compared to the event occurrence condition 124, and/or the event occurrence script 126 may be executed on the received data to determine an outcome and/or output.

In one or more embodiments, another useful source of data may be feedback from the users 702 as the project associated with the session is ongoing and/or evolves. In one or more embodiments, critical event objects 100 and/or the session file 150 may store additional data designating periodic follow up. The users 702, through the client device 700, may provide feedback periodically, voluntarily, at the request of one or more persons within the organization (e.g., a CEO), and/or upon the occurrence of certain events (e.g., failure of a related critical event object in another session, as may be related through a failure dependency reference 116 and/or a related reference 118). In one or more embodiments, a status tracking engine 350 includes computer readable instructions that when executed store an object check condition (e.g., in association with a critical event object 100 and/or a session file 150), generate a status check request 352 (e.g., upon occurrence of the object check condition), and store a status check value 354 received from a client device 700 associated with a user profile 362. The status check value 354 may be stored in association with the critical event object 100. For example, the status check value 354 may be an objective value (e.g., amount of budget remaining, percentage completed), and/or may be a subjective value (e.g., how close the user 702 believes the critical event object 100 is toward completion (e.g., achieving success or avoiding failure) on a scale of one to five. In one or more embodiments, such check-ins may act as a "pulse check", with the pulse check of each critical event object collectively forming the "vitals" of a session, or even the organization.

In association with each critical event object 100 a designation of its status may also be stored (e.g., in the occurrence status 130 of FIG. 2A), such as "succeeded", "failed", and/or "averted" (e.g., a failure that was avoided and/or prevented). Less definite designations are also possible, such as "likely avoided." The status may be manually added by one or more of the user 702 of the session, may be a response to a check-in, and/or may be automatically changed by one or more set of computer readable instructions of the event evaluation engine 332 following determination of occurrence and/or likely occurrence of a critical event. In one or more embodiments, a critical event log routine 344 includes computer readable instructions that when executed on a processor store an averted value in an occurrence status 130 (e.g., the occurrence status attribute) of the failure event object 102. In one or more embodiments, a critical event log routine 344 includes computer readable instructions that when executed on a processor may also generate a critical event log 345 and designate the critical event log 345 for reporting to a first user profile 362 and/or the second user profile 362 registered with administrative privilege with respect to the session. The critical event log 345 may be stored in, or its data may be otherwise reflected in, the session data log 158.

The orchestration server 300 also may include a user database 360. The user database 360 is shown with an example instance of a user profile 362, including a UID 363, a name 364 of the user 702, a user data 365 that includes data about the user 702, a set of one or more session references 366 that may reference sessions to which the user is a participant, and a set of one or more critical event object references 368 of critical event objects 100 to which the user 702 is assigned. Addition data not shown may be stored, including for example a relation of the user 702 to one or more account profiles 532 as shown and described in conjunction with the embodiment of FIG. 5.

Figure 4:
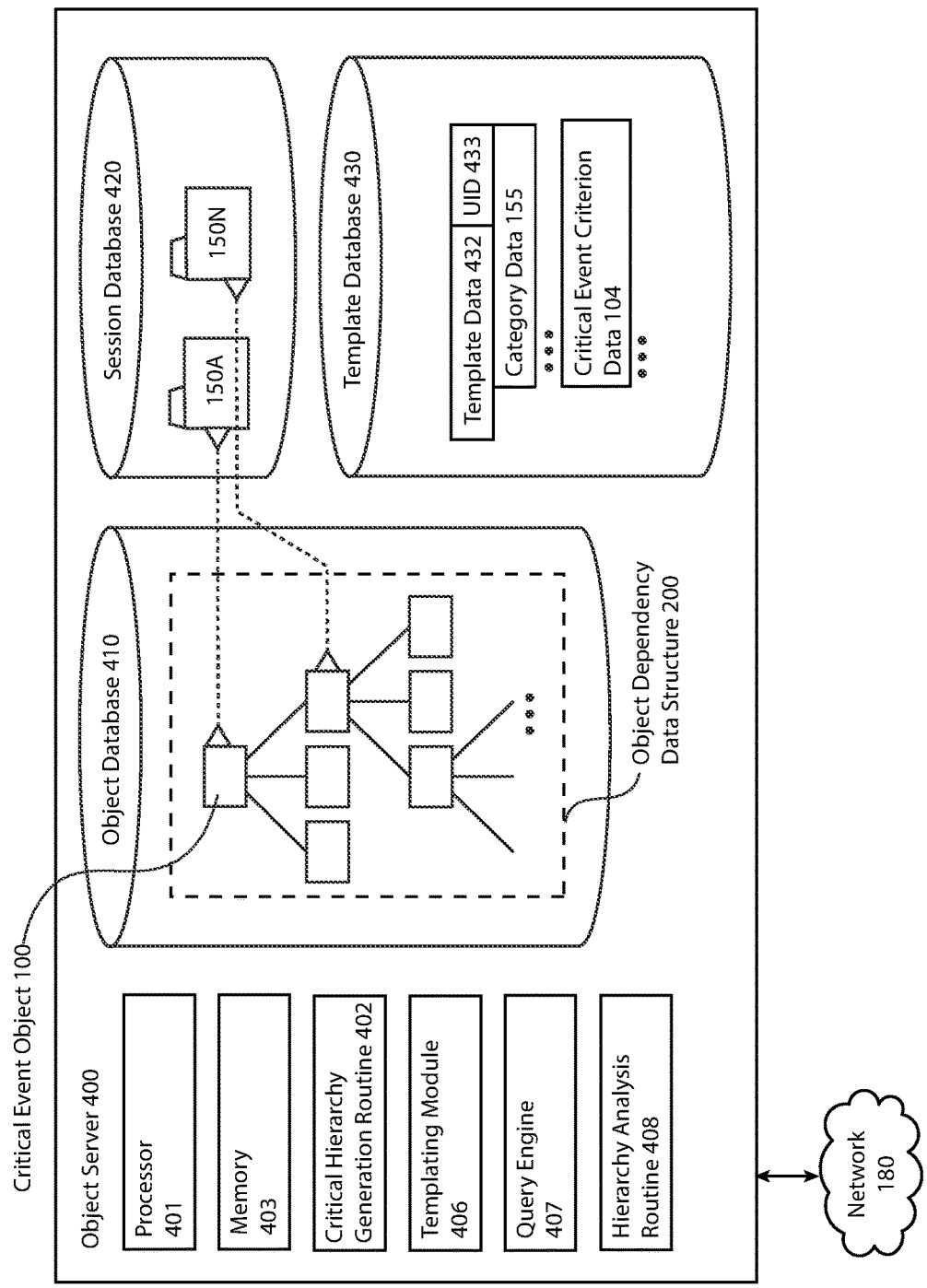
FIG. 4 illustrates an object server storing critical event objects and/or session files, the object server including critical hierarchy generation engine for generating a critical dependency hierarchy such as the failure dependency hierarchy of FIG. 2C, an object database storing the critical event data structure and critical event objects, a session database storing the session file of FIG. 2A, a templating module for applying a template to guide evaluation during the initiated session, and a template database storing a template data, according to one or more embodiments.

FIG. 4 illustrates an object server 400, according to one or more embodiments. The object server 400 includes a processor 401 and a memory 403, and is connected to the network 180. In one or more embodiments, the object server 400 includes an object database 410 storing one or more critical event objects 100. The object server 400 may store the critical event objects 100 from one or more sessions, including as defined in the object dependency data structure 200. The object database 410 may be implemented in one or more commercial databases in one or more logical and/or physical data models, for example a relational database (e.g., MySQL, Oracle®), a key-value store (e.g., Redis), a graph database (e.g., Neo4j), a columnar database (e.g., Cassandra), and/or other databases and models. A query engine 407 may respond to calls (e.g., from one or more sets of software code, software modules, systems, engines, routines, and/or subroutines of the orchestration server 300), for example by determining a storage location of a critical event object 100 on the storage medium and/or in the memory 403, and returning requested data. The critical event object 100 may be addressed and/or queried through the unique identifier 103, and/or through relative queries.

A critical hierarchy generation routine 402 may include software code that determines and/or generates a data set of critical event objects 100 dependent and/or related to one another. A call may be made to the critical hierarchy generation routine 402 to assemble a critical event hierarchy data starting with a root instance of a session file 150 and/or critical event object 100 (e.g., an instance of the root 201 illustrated in the embodiment of FIG. 2C). In one or more embodiments, the critical hierarchy generation routine 402 includes computer readable instructions that when executed on a processor queries the session UID 153 as a root 201 of a critical event hierarchy (e.g., a failure dependency hierarchy). The critical hierarchy generation routine 402 may also include computer readable instructions that when executed determine a set of critical event objects 100 (e.g., failure event objects 102) that are directly and/or indirectly connected to the root 201 through one or more dependency references (e.g., failure dependency references 116) of a data structure, and then assembles the critical event dependency hierarchy data (e.g., the failure dependency hierarchy data 202) in the computer memory. The critical event dependency hierarchy data may include the unique identifiers 103 of each critical event object 100 within the hierarchy, may include data describing relationships (e.g., JSON bracketing from which hierarchical relationships can be inferred), and/or may include any of the explicit or referenced data from the critical event objects 100.

Data analysis with respect to the hierarchy may be conducted before, during, and/or after assembly of the critical event dependency hierarchy data. Various data from the hierarchy may be determined, recorded, and/or visualized, for example for a set of users 702 and/or the organization to better understand one or more projects, including progress, risk, and/or resource allocation. In one or more embodiments, a hierarchy analysis routine 408 includes computer readable instructions that when executed on a processor determine that a subset of the set of critical event objects 100 (e.g., failure event objects 102) within the critical event hierarchy data (e.g., failure dependency hierarchy data 202) that each comprise a data value in common. For example, the data value in common may include (i) the unique identifier 363 of the user profile 362 of the user 702; (ii) a word of the alphanumeric string (e.g., determining each instance of the critical event criterion data 104 that include the word "manager" or "management"); (iii) the occurrence value 112 (e.g., the risk value 113); (iv) an event occurrence condition 124 (e.g., a failure averted condition 125); (v) a value of an occurrence status 130; and (vi) the unique identifier 103 of a critical event object 100 (e.g., a failure event object 102) specified in a reference attribute (e.g., the related reference 118, the critical event dependency reference 114, a critical event object reference 154, etc.). In one or more embodiments, a hierarchy analysis routine 408 includes computer readable instructions that when executed return to a client device 700 associated with a user profile 362 unique identifiers 103 of the subset of the set of critical event objects 100 (e.g., failure event objects 102) each comprising the data value in common. The returned data may require the user profile 362 is registered with administrative privilege with respect to the session (e.g., in which the root 201 is defined) and/or the organization.

In one or more embodiments, the object server 400 includes the session database 420. The session database 420 may be implemented as one or more commercial databases and/or filesystems (e.g., HSF Plus, NTFS, FAT). In one or more embodiments, the object server 400 may also store additional data for templating of session files 150. A templating module 406 may include software code that responds to a remote procedure call (e.g., the session orchestration system 302) and returns a set of templating data that may assist in populating the session and/or one or more critical event objects 100 with data. The template data 432 may be specified through a unique identifier 433. Templates may be manually defined (e.g., by experts), may be custom defined by the organization, and/or may be programmatically created based on patterns identified within the session database 420 and/or the object database 410. In one or more embodiments, the templating module 406 includes computer readable instructions that when executed select a template data 432 for a session, determine one or more categories associated with the template data 432 (as may be stored as a category data 155), and transmit the categories to be added to the session file 150 (e.g., to be stored as the category data 155 of the session file 150). The category data 155 may include one or more category values to which critical event objects 100 may be associated as the critical event objects 100 are built, including that may be visually represented on a user interface. For example, "cards" representing the critical event objects 100 may be dragged into category columns each labeled with one of the category values to cause the category value to be written to the critical event object 100. In one or more embodiments, the templating module 406 includes computer readable instructions that when executed determine one or more critical event criterion data 104 (e.g., failure criterion data 106) associated with the template data 432. For example, a template related to marketing and advertising campaigns may include a number of failure criterion data 106 that relate to assessing market segment, advertising costs, and advertising channels. A template related to clinical testing may include failure criterion data 106 that includes pitfalls that would prevent FDA advancement to the next round of studies and/or approval. In one or more embodiments, the templating module 406 includes computer readable instructions that when executed generate one or more new critical event objects 100 (e.g., failure event objects 102) from the one or more critical event criterion data 104 (e.g., failure criterion data 106) associated with the template and adds the one or more new critical event objects 100 to the evaluation queue 310.

Figure 5:
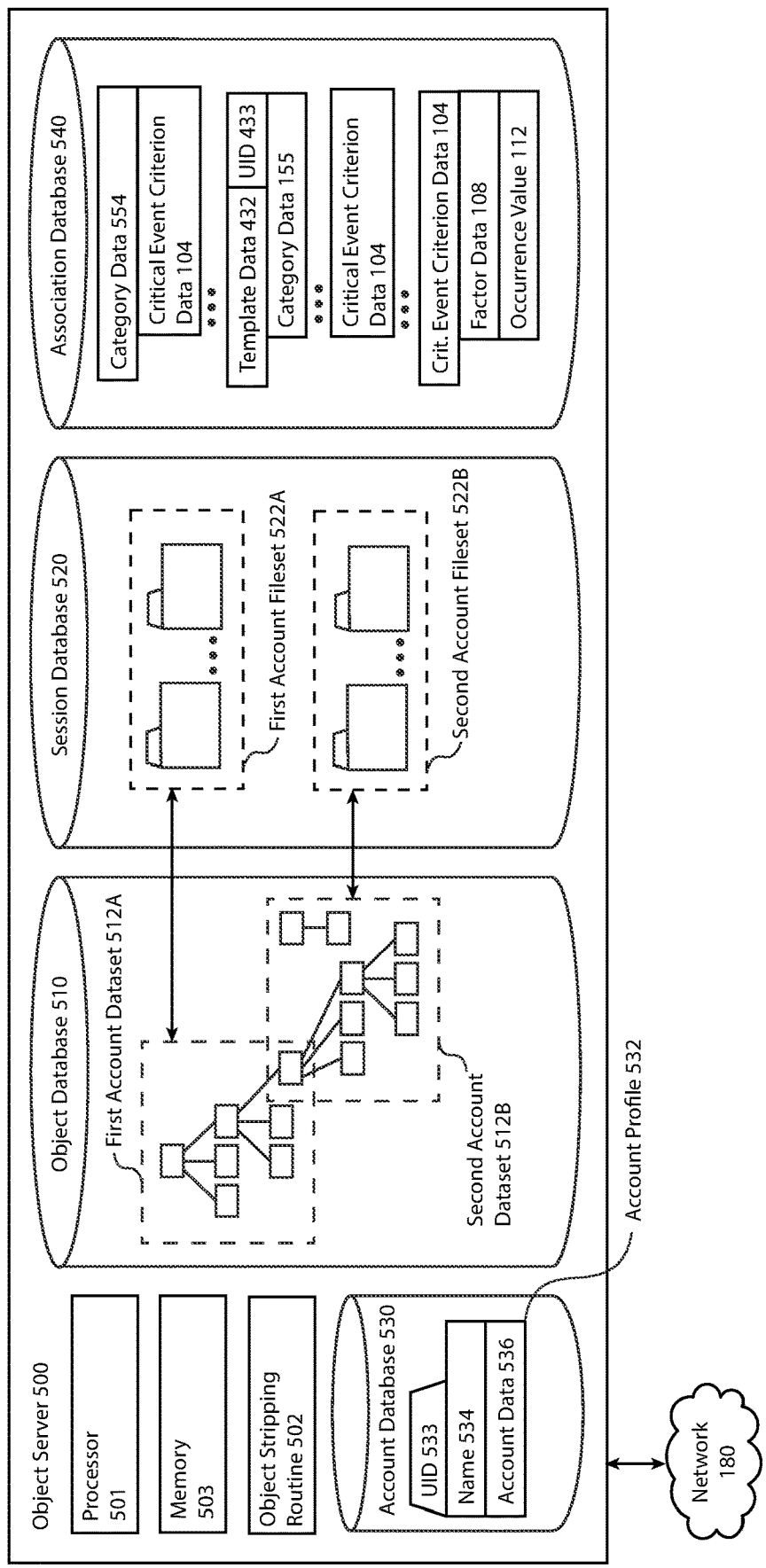
FIG. 5 illustrates a second object server that may be used for inter-organization storage, evaluation, and/or communication, including an account database storing an account profile, a second object database storing a first account dataset of event objects of a first account and a second account dataset of critical event objects of a second account, and an association database combining data that may be developed through cross-account data analysis, according to one or more embodiments.

FIG. 5 is an object server 500, according to one or more embodiments. The object server 500 may store data of multiple account profiles 532, part or all of which may be accessible across and/or between account profiles 532 (e.g., inter-organization). In one or more embodiments, the object server 500 (and/or the object server 400) may be utilized to operate a multi-tenant deployment and/or software-as-a-service offering, including in association with the orchestration server 300. The object server 500 includes a processor 501 and a memory 503.

The object database 510 stores one or more critical event objects 100, as may be related through one or more critical event dependency references 114 and/or other referential attributes as shown and as may be described in FIG. 2A, FIG. 2B, and FIG. 2C. The set of critical event objects 100 owned, controlled, or otherwise associated with an instance of the account profile 532 may be referred to as an account dataset 512. In the embodiment of FIG. 5, two representative account datasets 512 are illustrated, e.g., a first account dataset 512A (e.g., associated with a first account profile 532A) and a second account dataset 512B (e.g., associated with a second account profile 532B). An overlap of the broken lines surrounding the first account dataset 512A and the second account dataset 512B illustrate a potential inclusion of one or more critical event objects 100 in both datasets (or to be controlled and/or otherwise associated with both account profiles 532). For example, a critical event object 100 included in both the first account dataset 512A and the second account dataset 512B may be stored in association with a session file 150 having participants from two organizations. Alternatively, or in addition, user profiles 362 associated with a first account profile 532A may have read-access to one or more critical event objects 100 and/or session files 150 owned or controlled by a second account profile 532B. In one or more embodiments, the object server 500 may similarly include a session database 520 that may store a first account fileset 522A owned, controlled, or otherwise associated with the first account profile 532 and a second account fileset 522B owned, controlled, or otherwise associated with the second account profile 532B.

In one or more embodiments, certain data from the object database 510 and/or the session database 520 may be available to instances of the account profile 532 that do not own or control such data. For example, some data may be designated for inter-account sharing or public availability (e.g., through the public/private status 164), anonymized, and/or stripped of confidential information and made addressable (or replicated into datasets subject to query) by various account profiles 532 otherwise unrelated to that data. In one or more embodiments, an object stripping routine 502 may remove confidential information (e.g., from designated attribute fields of the critical event object 100 and/or the session file 150), according to preferences associated with the account profile 532 controlling the confidential information, and/or through automatic detection algorithms. Collective data from one or more account datasets 512 may also be used to generate insight that further develops and enhances templating and the machine learning embodiments shown and described in conjunction with FIG. 6. For example, the category data 155 of a template data 432, and/or critical event criterion data 104, may be further improved through analysis of two or more account datasets 512. As just one example, across hundreds of instances of the account dataset 512 it may be determined that when an instance of the template data 432 is selected, most sessions that select the template end up also adding category values related to "structural integrity," and therefore modify the category data 155 associated with the template data 432 to include a category value incorporating structural integrity.

In one or more embodiments, an association database 540 may store additional insights and/or datasets derived from the object database 510 and/or the session database 520. For example, the category data 155 may include a set of associated critical event criterion data 104 (e.g., a critical event criterion data 104A through a critical event criterion data 104N). In one or more embodiments, the association database 540 may store the template data 432, including a category data 155 and/or one or more critical event criterion data 104. In one or more embodiments, the association database 540 may store a critical event criterion data 104 in association with one or more factor data 108 (e.g., either attributes for specifying a value, or an attribute and value) and/or one or more occurrence values 112.

The account database 530 may store account profiles 532 each related to and/or representing one or more organizations. The account profile 532 may include a unique identifier 533, a name 432 (e.g., of the organization or business entity), and a set of account data 536 such as contact information, location, industry, etc. Additional data not shown may associate the account profile 532 with each associated instance of the user profile 362 within that organization, and/or the account dataset 512 and/or account fileset 522.

Figure 6:
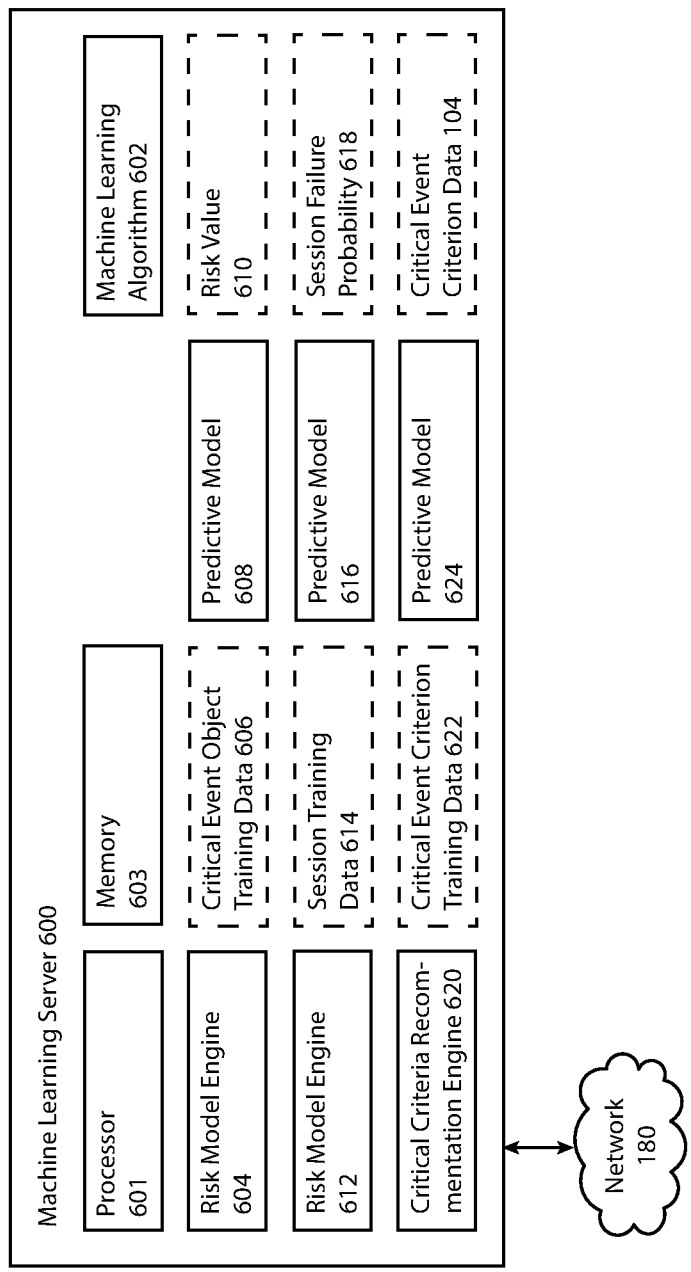
FIG. 6 illustrates a machine learning server usable to generate and/or apply predictive models, the machine learning server including a risk modeling engine for developing a first predictive model outputting a value predicted with respect to a critical event object, a second risk modeling engine for outputting a value predicted with respect to the session, and a critical criteria recommendation engine that may improve identification of relevant critical event criterion the consideration of which may improve the probability of success and/or decrease a probability of failure, according to one or more embodiments.

FIG. 6 illustrates a machine learning server 600, according to one or more embodiments. The machine learning server 600 may include a processor 601 (including optional specialized machine learning algorithm processing hardware) and a memory 603.

In one embodiment, the machine learning server 600 includes a risk model engine 604, which may predict an occurrence value 112 (e.g., a risk value 113) and/or otherwise output a probability for success, failure, and/or failure aversion of a critical event object 100. In one or more embodiments, the risk model engine 604 includes computer readable instructions that when executed on a processor input values of at least two data attributes of each of a plurality of critical event objects into a machine learning algorithm 602 as independent variables of the machine learning algorithm 602, and further may input a value of an occurrence status 130 (e.g., a success value, a failure value, and/or a failure averted value) of each of the plurality of critical event objects 100 into the machine learning algorithm 602 as a dependent variable of the machine learning algorithm 602. As just one example, a set of critical event objects 100 (which may span multiple account datasets 512) may have extracted as independent variables their critical event criterion data 104, their category, data related to one or more users 702 associated with the critical event object 100 (e.g., years of experience, job title, participation in other sessions), and factor data 108 as independent variables, and a value of the occurrence status 130. In one or more embodiments, the risk model engine 604 includes computer readable instructions that when executed generate a predictive model 608 correlating the value of the occurrence status 130 (e.g., a failure averted value, a failure value) with at least the two data attributes of the plurality of critical event objects 100. The predictive model 608 may then be utilized to predict (and optionally display to a user 702) the occurrence status 130 and/or probability for success, failure, and/or averted failure. For example, in the embodiment of FIG. 6, the predictive model 608 is shown outputting a risk value 610. Recommendations may be made to increase the chance of success or determines the chance of failure based on theoretical changes to the critical event object 100 under evaluation. Upon receiving additional data usable as training data (e.g., new instance of the critical event object 100 defined for which an occurrence status becomes available), the risk model engine 604 may continually update the predictive model 608.

In what may have some similarities, the project associated with the session file 150 may be predicted for success, failure, or averted failure. In one or more embodiments, a risk model engine 612 may include computer readable instructions that when executed on a processor input values of at least two data attributes of a plurality of session files 150 into the machine learning algorithm 602 (and/or a different machine learning algorithm as may be selected for the risk model engine 604) as independent variables, and input a session status value of each of the plurality of session files 150 into the machine learning algorithm 602 as a dependent variable. The session status value may be a value describing success, failure, or averted failure, and may be stored in association with the session file 150 (not shown in the embodiment of FIG. 2A). Alternatively, or in addition, where a crucial event object 100A may also represent a project and may have a direct association with a session file 150 (e.g., as shown through the session reference 253A of FIG. 2C), the occurrence status 130 attribute may store the session status value (e.g., a failure averted value, which may mean the potential failure is believed to have been avoided, averted, and/or mitigated). In one or more embodiments, a risk model engine 612 may include computer readable instructions that when executed on a processor generate a predictive model 608 of a probability for success and/or failure of the session associated with a new instance of a session file 150 based on at least the two data attributes of the plurality of session files 150. The predictive model 616 may receive as an input any data of a session file 150, and output a probability for success, failure, and/or averted failure. In the embodiment of FIG. 6, the predictive model 608 is illustrated as generating the session failure probability 618. Upon receiving additional data usable as training data (e.g., a new instance of the session file 150), the risk model engine 612 may continually update the predictive model 616.

The machine learning server 600 may also include a critical criteria recommendation engine 620 that may include software code that, based on data from the session and/or stored in the session file 150, may make recommendations on additional critical event criterion data 104 likely to be relevant. In one or more embodiments, the critical criteria recommendation engine 620 may include computer readable instructions that when executed on a processor parse a critical event criterion data 104A (e.g., a failure criterion data 106) to result in one or more words of the alphanumeric string that may describe the critical event (e.g., the failure event) and input one or more of the one or more words of the plurality into a predictive model 624 trained with the critical event criterion data 104 of each of a plurality of critical event objects 100 generated across two or more sessions. In one or more embodiments, the critical criteria recommendation engine 620 may include computer readable instructions that when executed on a processor output another alphanumeric string usable as a second failure criterion data 104 most likely to be associated with the first failure criterion data 106A across the two or more sessions, to increase the likelihood for consideration of critical events related to the session. A critical event object 100 may be generated from the second failure criterion data 106B and added to the evaluation queue 310 by the execution of computer readable instructions. As just one example, where the predictive model 624 may have grouped a critical event criterion data 104 that included the words "business culture fit" with "team coherence", inclusion within a session of a critical event criterion data 104 with the word "culture" may trigger recommendation of "team coherence" (and/or automatic addition to the evaluation queue 310).

In one or more embodiments, the machine learning algorithm 602 may be, for example, a supervised learning algorithm, an unsupervised learning algorithm, and/or a reinforcement learning algorithm. The machine learning algorithm 602 may include, for example, algorithms for: Linear Regression, Logistic Regression, Decision Trees, SVM, Naive Bayes, k-nearest-neighbor (kNN), K-Means, Random Forest, Dimensionality Reduction Algorithms, and/or Gradient Boosting. In one or more embodiments, the machine learning algorithm 602 may be based on artificial neural networks (ANNs) and/or deep learning techniques.

Figure 7:
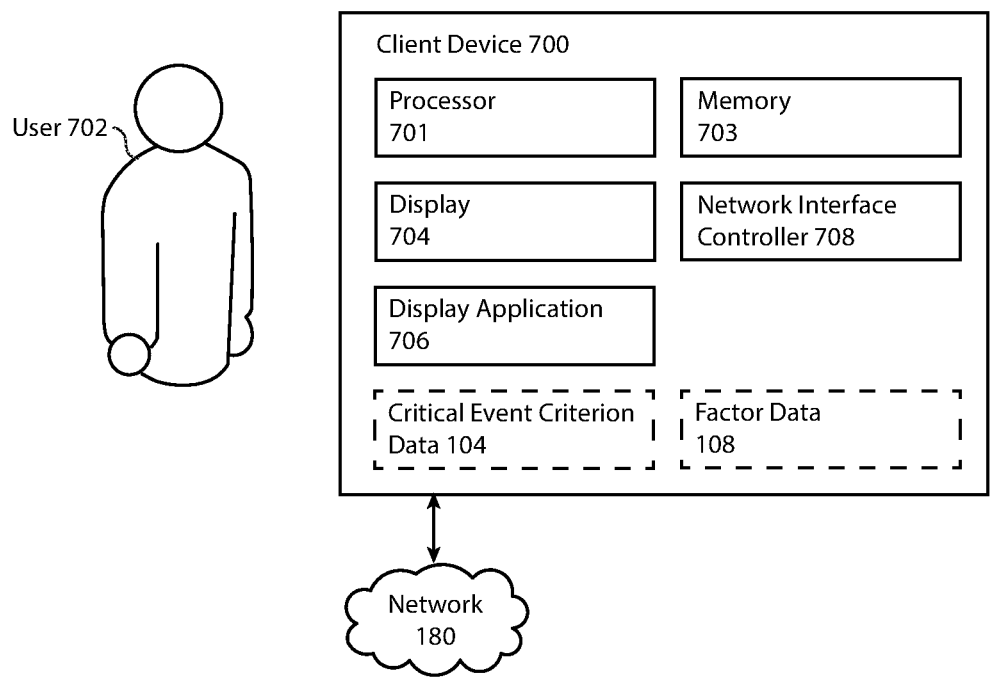
FIG. 7 illustrates the client device and the user of FIG. 1, according to one or more embodiments.

FIG. 7 illustrates a client device 700, according to one or more embodiments. The client device includes a processor 701, a memory 703, and a display 704 (e.g., LED screen, LCD screen, OLED screen). The client device 700 also includes a network interface controller 708 for communication over the network 180. In one or more embodiments, the client device may be a desktop computer, laptop computer, tablet device, and/or smartphone (e.g., iPhone®, Android® phone). The client device 700 includes one or more user pieces of input/output hardware, including for example a keyboard, touchscreen, mouse, and/or other buttons. The client device 700 may execute a display application 706 that includes software code which displays user interface elements and/or provides a graphical user interface for engagement in the session and/or interaction with one or more server of FIG. 1 (e.g., the orchestration server 300, the object server 400). In one or more embodiments, the display application may be a mobile application (e.g., "app"), a desktop application, and/or a browser-based application. The user 702 may interact with the display application 206 to generate, for example, the critical event criterion data 104, the factor data 108, or take other permissible actions with respect to the session, the session file 150, and/or construction of the critical event objects 100 of the session.

Figure 8:
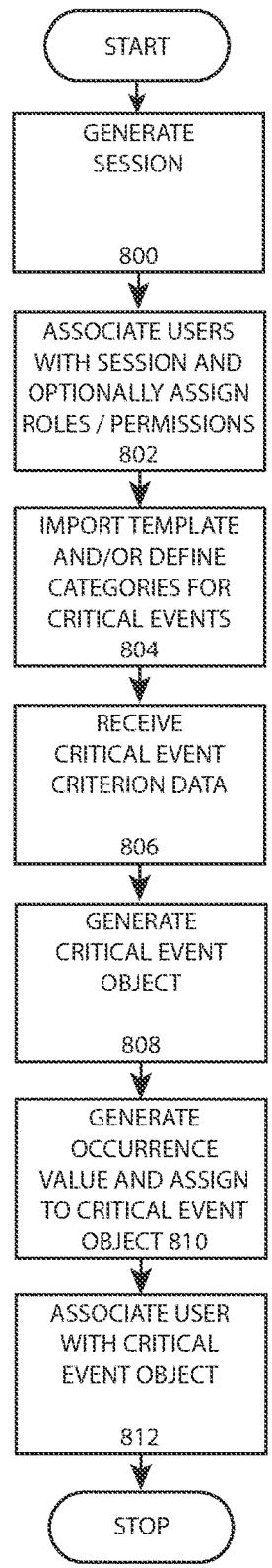
FIG. 8 illustrates critical event evaluation process flow, according to one or more embodiments.

FIG. 8 is a critical event process flow 850, according to one or more embodiments. Operation 800 generates a session. The session may be represented as and/or stored in a file (e.g., the session file 150) and/or a data object (e.g., the critical event object 100). In one or more embodiments, the session may be a collaborative session in which two or more users 702 engage in realtime communication (e.g., through realtime voice, realtime video). Operation 802 associates users 702 with the session, and may optionally assign roles and/or permissions to each of the users. For example, the users 702 may be associated with the session through a one-way or two-way reference from a user profile 362 to a session file 150, or vice versa. A user 702 initiating the session and/or having administrative privilege may access a user interface screen for selecting, inviting, and/or adding users 702. The interface may also permit selection of roles and/or privileges. The role may include, for example, a primary user 702 to work with critical event criteria within a specific category, to be in charge of certain session processes (e.g., moving to another step), and/or as an overall moderator and/or administrator for the session. The permissions may relate to sharing of data, determining the composition of the users 702 within the session, setting a public/private status or otherwise designating confidential information (including individual attributes of the critical event object 100), determining whether a critical event can be "spun out" into a separate session, and other control functions.

Operation 804 imports a template and/or defines categories for which critical events can be categorized. The template may be selected from a menu of available templates, or found via natural language search where many may be available. The template may include a number of categories by default, which the users 702 may be able to edit to further customize the session. The template may be labeled with an organization type, a project type (e.g., app development), a sub-project type (setting up backend services with cloud providers), and similar titles.

Operation 806 receives critical event criterion data 104. In one or more embodiments, the critical event criterion data 104 may specify a critical event which must come to pass for success to occur and/or must not come to pass to prevent failure. In one or more embodiments, the critical event criterion data 104 may be a failure criterion data 106 that specifies an event that must be avoided by the project and its team for the project to be likely to succeed. The critical event criterion data 104 may be text data, but could also be voice recordings, video recordings, graphics, images, and/or other data sufficient to communicate the critical event to other team members. Each of the users 702 may submit the critical event criterion data 104 in real-time during the session, an activity which may be subject to constraints to promote succinctness (e.g., a timer, entry limited to one hundred and forty textual characters, etc.). Some critical event criterion data 104 may also be added by the selected template or other automated processes.

Operation 808 generates a critical event object 100. The critical event object 100 may be a data object stored in a computer memory representing and capable of further enriching the meaning of the critical event criterion data 104. The critical event object 100 may be represented on a user interface as a discrete object, for example a 2-dimensional "card" or 3D object in a virtual and/or augmented reality environment. The critical event object 100 may be given a number of attributes, some of which may be initially populated with values, as further shown and described in conjunction with FIG. 2A, FIG. 2B, and throughout the present embodiments.

Operation 810 may generate an occurrence value 112 (e.g., a risk value 113) and assigns the occurrence value 112 to a critical event object 100. The assignment of the occurrence value 112 may be based on informal discussion of each of the critical event criterion data 104 and/or may be based on a structured activity, such as loading each of the critical event objects 100 into an evaluation queue 310 and withdrawing and considering each in series. For example, on a graphical user interface a "card" representing each critical event object 100 may be dragged out of a sequence of cards and placed in a section of the UI labeled with a category name, and then the occurrence value 112 typed into the card. Other processes for assigning the occurrence value 112 may involve assigning data related to factors of its occurrence, for example a probability data 109 and/or an impact data 110. The factors may be added into a function that outputs the occurrence value 112.

Operation 812 associates a user 702 with the critical event object 100. The user 702 may be associated with the critical event object 100 for a number of reasons, for example to become a project lead for a new session based on the critical event object 100, to be a primary person responsible for causing success and/or averting failure associated with the critical event, or as a user 702 to be notified in the event of updated data associated with the critical event object 100 (e.g., a status change, a new user 702 assigned responsibility, etc.). The graphical user interface, for example, may permit the dragging and dropping of cards representing the critical event objects 100 to sections of the UI labeled with a name of each of the users 702. The critical event evaluation process flow may then end, with each of the users 702 possibly now having a better understanding of the critical event of the project, the participants, the priorities, and who is associated with and/or responsible for each critical event.

Figure 9:
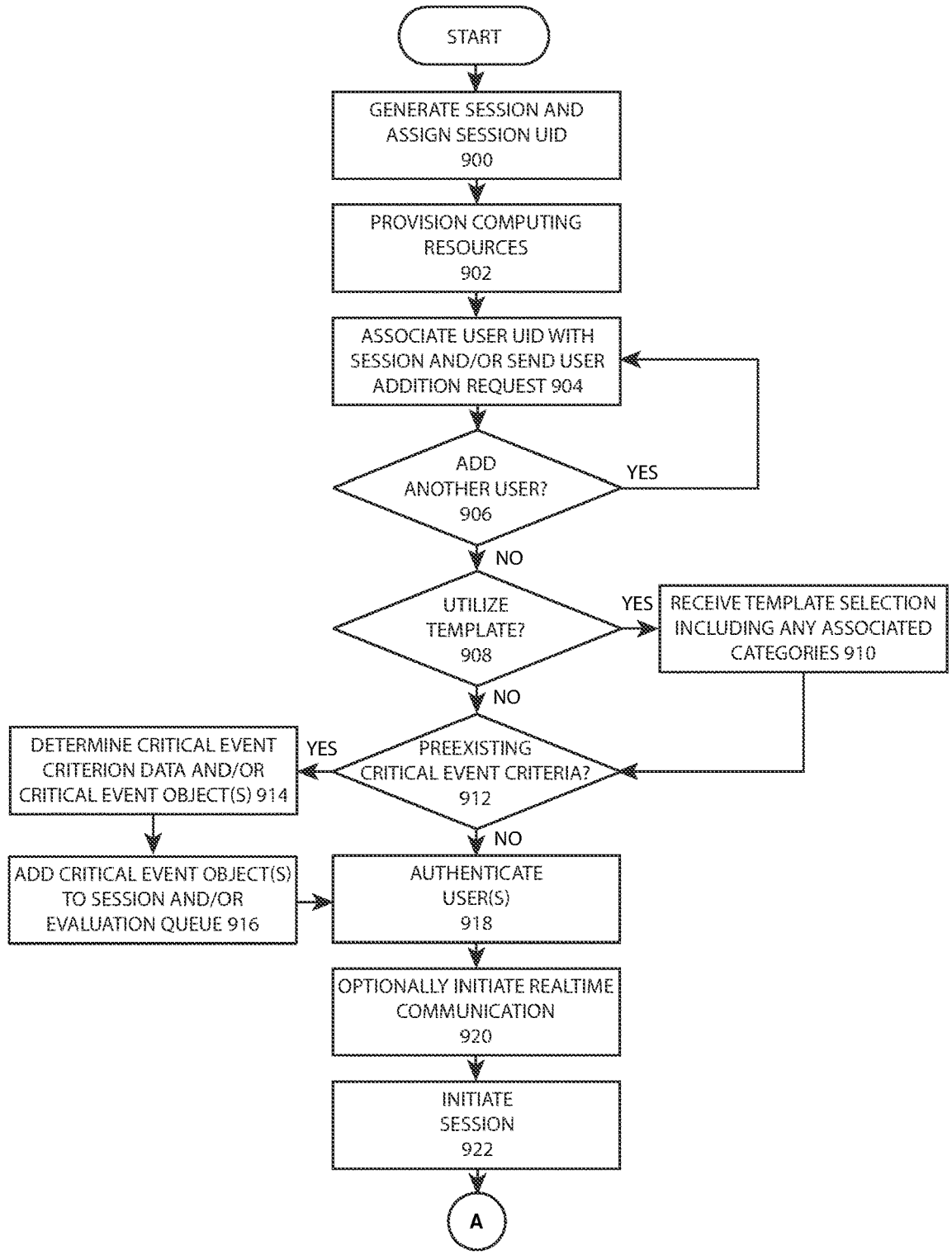
FIG. 9 illustrates session initiation process flow, according to one or more embodiments.

FIG. 9 illustrates a session initiation process flow 950, according to one or more embodiments. Operation 900 generates a session and assigns a session UID 153. The session may be generated by a user 702 through a UI workflow, may be generated by one user 702 for another user 702 (e.g., a director of a company generating a session for a manager and his or her team), and/or may be generated automatically upon occurrence of a detectable event. The session UID 153 may be a unique identifier, for example a string comprising a time and session name and/or a globally unique identifier (GUID) that includes a string of 32 random alphanumeric characters. Initiation of the session may request a naming of the session. Operation 902 provisions computing resources for the session. For example, operation 902 may allocate computer memory, processing power, bandwidth, and/or storage on a server. The session may be initially stored in a computer memory and then saved to storage (e.g., the session file 150). In one or more embodiments, including for instances of the session with large amounts of data and/or a large number of participating users 702, each session may spin up additional servers, containers (e.g., Docker® container), and/or virtual machines (e.g., VMware®). Operation 904 associates a user UID 363 with the session and/or sends a user addition request (e.g., the user addition request 305, as may be communicated to a client device 700 associated with the user 702). Multiple types of association are possible, for example, a session lead, a facilitator, a participant, an observer, a manager, and/or other roles. At the time a user 702 is associated with the session, privileges with respect to the session may also be defined (e.g., setting the permission data 157). The user addition request 305 may be sent through one or more communication channels (e.g., internet, email, app message, SMS/MMS, automated phone call, project management software notification function, etc.) to the user 702, either by entering contact information for the user 702 or through automatic determination of contact information from the user profile 362. The user addition request 305 may include a URL link enabling anyone with the link to join, or may require an authenticated sign-in by a user profile 362. Operation 906 is a decision operation determining whether another user 702 is to be added to the session file 150. If another user 702 is to be added, operation 906 returns to operation 904. Otherwise, operation 906 proceeds to operation 908.

Operation 908 is another decision process determining whether a template should be utilized for the session. If a template is to be utilized, for example as may be selected by the user 702 generating the session and/or if a default template is defined, operation 908 proceeds to operation 910. Operation 910 may then receive a template selection (e.g., selected through a menu, specified through an API), for example by submission of a template UID 433 specifying a template data 432. The template selection may include retrieval of any categories associated with the template (e.g., category data 155 associated with and/or stored within the template data 432). Operation 910 then proceeds to operation 912. Operation 908 also proceeds directly to operation 912 in the event that no template is to be utilized as determined by operation 908.

Operation 912 is another decision operation determining whether the one or more preexisting critical event criteria apply to the session. In one or more embodiments, data of the session file 150 may trigger a recommendation and/or automatic addition for consideration of critical event criteria (e.g., critical event criterion data 104). Addition of critical event criterion data 104 may be, for example, based on the name of the session, failures and/or successes of other sessions within the organization, past activity and/or data about the users 702 associated with the session, the template selected, and/or other specified conditions. Where preexisting critical event criteria apply, operation 912 proceeds to operation 914. Operation 914 may determine critical event criterion data 104 and/or critical event objects 100 that apply. The determination may be made through a lookup predetermined critical event criterion data 104 and/or critical event objects 100 (e.g., as may be stored inside or in association with the template data 432), and/or may be made through ad-hoc calculation or analytics. For example, it may be determined for each instance of the user 702 that any critical event criterion data 104 which they have had difficulty with within the same template and/or project type should be added to the session for consideration. Operation 914 then proceeds to operation 916 which adds critical event objects 100 to the session and/or an evaluation queue 310 of the session. Where critical event criterion data 104 are extracted and added, each may have a critical event object 100 similar to operation 1008 of FIG. 10. The session file 150 may track those preexisting instances of the critical event objects 100 versus any later critical event objects 100 added by the users 702. Although not shown in the present embodiment, rather than being directly added to the critical event objects 100, external critical event objects 100 may also be recommended to the user 702 setting up the session, who may select or reject each. Following completion of operation 916, operation 916 may proceed to operation 918. Additionally, following any determination that there exists no preexisting critical event criteria, operation 912 may proceed to operation 918.

In the embodiment of FIG. 9, following operation 912 and/or operation 916, the session may then have an initial state and allocated computing resources, and may be ready to begin the process of inter-user 702 communication and the creation and construction of a collection of critical event objects 100. Operation 918 may authenticate one or more users 702 and/or client devices 700 of the users 702 associated with the session. Operation 920 may then initiate realtime communication between and/or among the users 702, for example on video conference, teleconference, realtime chat, augmented reality conference, virtual reality conference, and/or through other means. Operation 922 may initiate the session, for example upon arrival of the first user 702, upon arrival of a quorum of users 702, and/or upon arrival of not less than all of the users 702. The process flow of FIG. 9 may proceed to the process flow of FIG. 10 along path 'circle A'.

Figure 10:
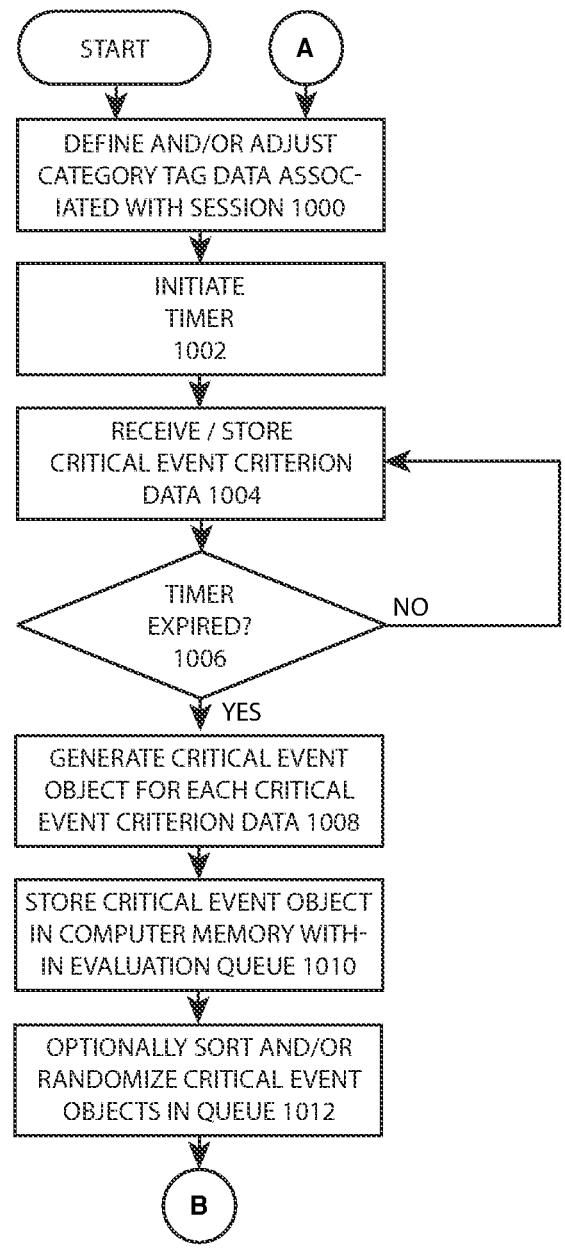
FIG. 10 illustrates an object initiation process flow, according to one or more embodiments.

FIG. 10 illustrates an object initiation process flow, according to one or more embodiments. Operation 1000 defines and/or adjusts the category data 155 associated with the session file 150. For example, one or more of the users 702 may type or otherwise enter category values in one or more areas of the UI or may edit any portion of the category data 155 that may be predefined through any template that was selected during generation of the session file 150. In one or more embodiments, the category data 155 may remain freely editable throughout the session, especially to accommodate any newly determined relevant categories during discussion or data analysis. Next, the team may begin to create critical event objects 100, which may begin by "seeding" each with a critical event that may have a risk association to the project. In one or more embodiments, there may be one or more constraints on the generation of critical event criterion. This may assist in making the process efficient, and, according to one or more embodiments, also may have the additional benefit of reducing inhibition in discussing project failure and/or threats to success. For example, and as shown in the embodiment of FIG. 10, operation 1002 may initiate a timer (e.g., 2 minutes, 10 minutes, 30 minutes, 1 hour). While the timer runs, operation 1004 may receive and/or store critical event criterion data 104 generated and/or selected by one or more of the users 702 participating in the session. The critical event criterion data 104 is described throughout the present embodiments, but may include an alphanumeric string specifying the critical event that is critical to and/or represents a risk with respect to the project. Operation 1006 determines if the timer has expired. If so, operation 1006 proceeds to operation 1008. If not, operation 1004 may continue to collect and store critical event criterion data 104. Even though there may be an initial timer for the creation of an initial set of critical event criterion data 104 for consideration, in one or more embodiments critical event criterion data 104 may be added freely to the session at a later time.

Operation 1008 generates a critical event object 100 for each critical event criterion data 104. Each of the critical event objects 100 may be associated a unique identifier 103, which may in one or more embodiments be the critical event criterion data 104 itself (and an error may be generated for any conflict thereof). However, in one or more preferred embodiments, the object UID 103 may include a GUID. Operation 1010 may store the critical event object in computer memory in an evaluation queue 310. Each of the critical event objects 100 may be provided with a graphical representation to assist the users 702 in manipulation and consideration, for example a "card" that can be moved around on a graphical user interface. The evaluation queue 310 may be a queue (which may or may not be represented on a UI) that includes each of the critical event objects 100 prepared for consideration and building up of additional data and/or data structuring through defined relationships. Operation 1012 may optionally sort and/or randomize critical event objects 100 in the evaluation queue 310. Operation 1012 may then proceed along path 'circle B' to the process flow of FIG. 11.

Figure 11:
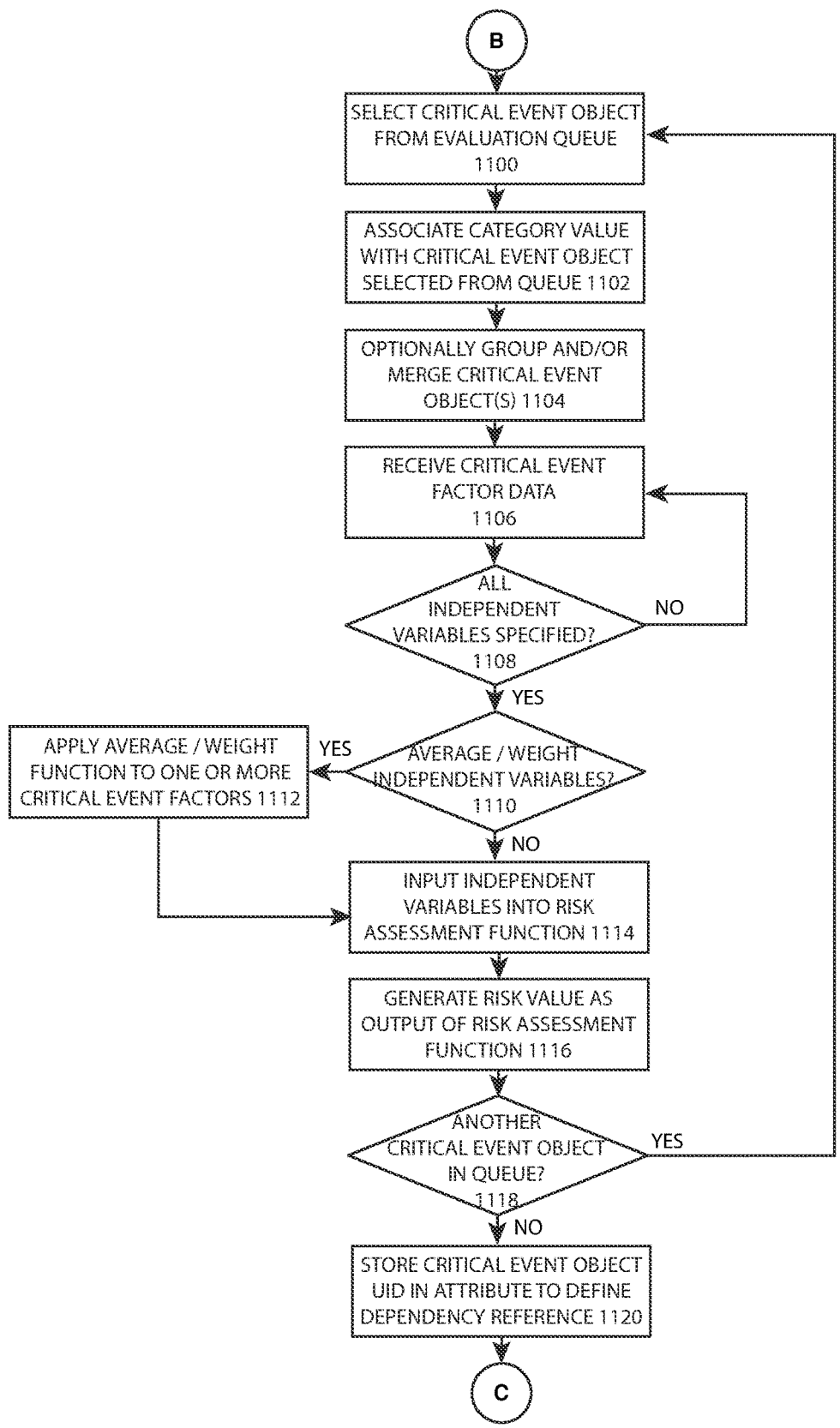
FIG. 11 illustrates a first object assembly process flow for constructing one or more attributes and associated values of a critical event object, according to one or more embodiments.

FIG. 11 illustrates an object assembly process flow 1150, according to one or more embodiments. Operation 1100 selects a critical event object 100 associated with the session file 150, for example from the evaluation queue 310. The selection may be made by a user 702 (e.g., dragging the card of the critical event object 100 out of the UI element for the evaluation queue 310) or otherwise addressing the critical event objects 100 for the addition and/or modification of its data in the computer memory. Operation 1102 associates a category value with the critical event object 100 selected. For example, the user 702 may add a UI element similarly to a "tag", choose one of several categories from a menu populated from the category data 155, and/or drag the "card" to a column on the UI labeled with the category value. Operation 1104 optionally groups and/or merges failure event objects 102. For example, a first user 702A may have submitted a first critical event object 100 storing a critical event criterion for "not enough funds," and a second user 702B may have submitted a second critical event object 100 with a critical event criterion for "run out of money." The users 702 in the session, including the user 702A and the user 702B, may decide that such similar terms are duplicative and merge both. For grouping, the representative cards of the critical event objects 100 may be stacked or visually grouped on the UI. For merging, one may be deleted and one may survive in the computer memory, including providing the option to edit the critical event criterion data 104 to accommodate both, if needed. Although not shown, other critical event objects 100 may be divided and/or replicated and each modified along different tracks, according to one or more embodiments. Such division may occur when during discussion or evaluation the users 702 may realize or receive data indicating that the critical event is more complex, for example representing two or more distinct critical events that may need to be evaluated independently.

Operation 1106 receives a critical event factor data 108. In one or more embodiments, the users 702 may openly discuss and decide which factor data 108 to add to critical event objects 100 and/or which value of the factor data 108 to assign. In one or more embodiments, the critical event factor data 108 may be entered on the "card" representing the critical event object 100 and then stored in the computer memory in association with that critical event object 100. The factor data 108 may be received from one or more of the users 702. In one or more embodiments, the factor data 108 may be a probability data 109 that is an intuitive estimate and/or an exact probability based on data of the probability of occurrence of similar critical events. The factor data 108 may also be an impact data 110 that is an intuitive estimate and/or an exact impact on the project based on data of occurrence of similar critical events. In one or more embodiments, and the embodiment of FIG. 11, the factor data 108 may be inputs into independent variables of a function (e.g., a risk assessment function). Operation 1108 is a decision process determining whether additional factor data 108 should be specified, for example to provide inputs of all independent variables of the function. If more independent variables are to be specified, and/or any errors in the factor data 108 are determined during error input validation, operation 1108 returns to operation 1106. Otherwise, operation 1108 proceeds to operation 1110.

Operation 1110 determines whether to weigh and/or average independent variables for the risk assessment function (e.g., the risk assessment function 343). For example, where each of the users 702 have submitted a probability data 109, a probability value of each instance of the probability data 109 may be averaged (e.g., to result in an averaged probability data). Alternatively, or in addition, the probability value of each instance of the probability data may be modified using a weighted average, e.g., weighted by any number of factors associated with each of the users 702, such as background, position, specialty, seniority, etc. (e.g., to result in a weighted probability data). Similar averaging and/or weighting may be utilized with an impact data 110, to result in an averaged impact data and/or weighted impact data, respectively. The weighting may even be set up and decided by the users 702 following session initiation and stored as a parameter of the session file 150. Operation 1112 may then apply the average and/or weight function to one or more of the critical event factor data 108 submitted in operation 1106. Operation 1112 may then proceed to operation 1114.

Operation 1114 inputs the independent variables into a risk assessment function 343 (e.g., including one or more instances of the factor data 108, including any weighted impact data, weighted probability data, averaged impact data, and/or averaged probability data). The risk assessment function 343 may be a function determining an overall risk with respect to the project based on the factor. For example, the risk assessment function 343 may generate a single value score or a different function outputting a risk value dependent on time (e.g., a risk curve). In one or more embodiments, and the embodiment of FIG. 11, the risk assessment function 343 may generate a single value. Operation 1116 generates the risk value (e.g., the risk value 113) as an output of the risk assessment function 343. In one or more embodiments, the risk value 113 may be visible on and/or prominently displayed in association with each of the "cards" representing critical event objects 100. Operation 1118 is a decision process determining if another critical event object 100 remains in the evaluation queue 310, in which case operation 1118 returns to operation 1100. Otherwise, operation 1118 may proceed to operation 1120.

Operation 1120 may define a dependency between the critical event object 100 and one or more other critical event objects 100, either from the current session or a different session. Specifically, in the embodiment of FIG. 11, operation 1120 stores a unique identifier 103 of a critical event object 100 in an attribute to define a dependency reference (e.g., the critical event dependency reference 114). Other types of reference may also be formed, for example a related reference 118. The critical event object 100 may be dependent on multiple other critical event objects 100, within or without the present session. Similarly, one or more critical event objects 100 associated with one or more session files 150 may depend on the critical event objects 100. Operation 1120 may then proceed along path 'circle C' to the process flow of FIG. 12.

Figure 12:
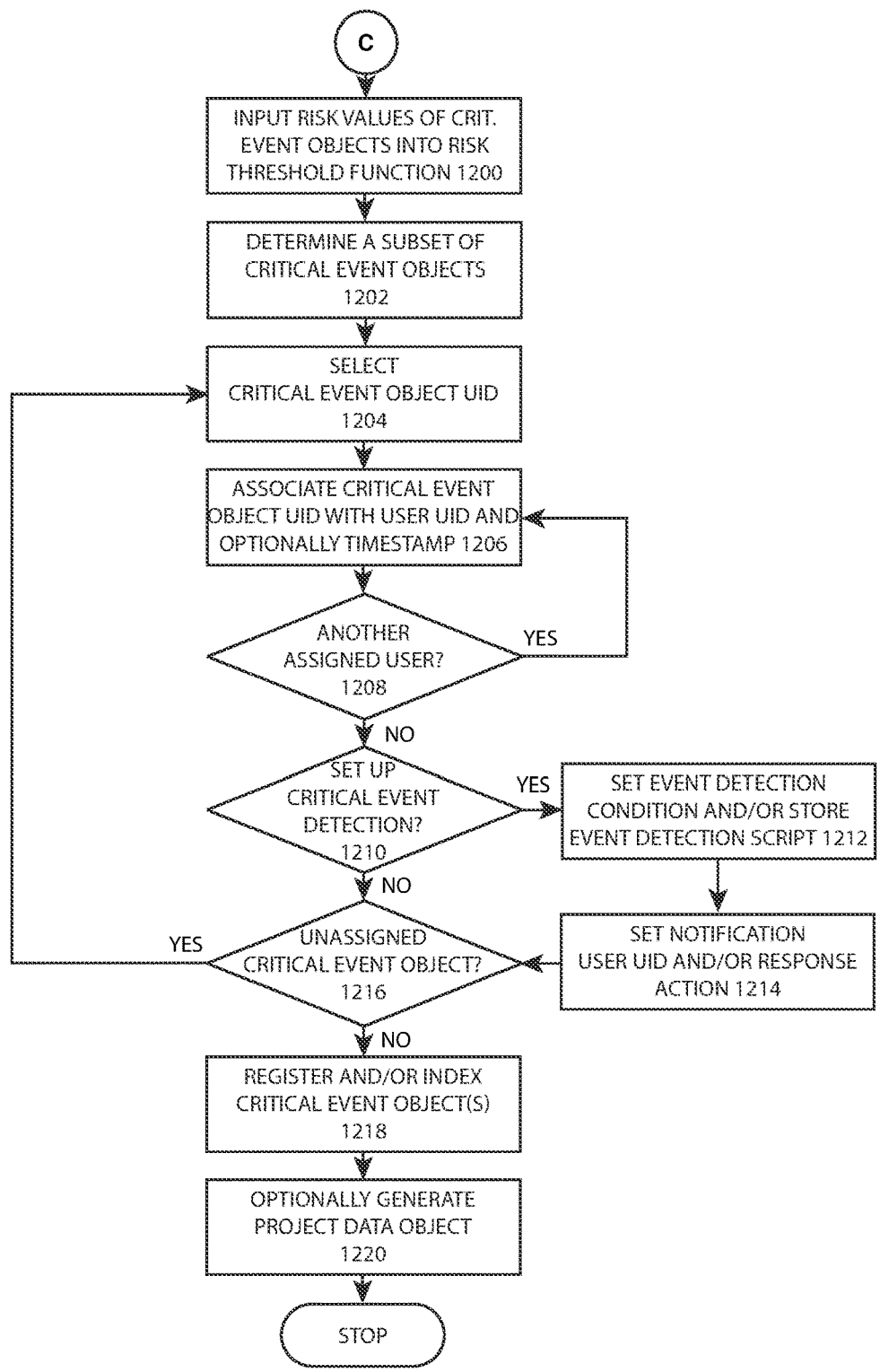
FIG. 12 illustrates a second object assembly process flow which may continue the process flow of FIG. 11 to continue constructing one or more attributes and associated values of a critical event object, according to one or more embodiments.

FIG. 12 illustrates a project assembly process flow 1250, according to one or more embodiments. Operation 1200 may input a risk value 113 of each of the critical event objects 100 associated with the session into a risk threshold function 341. Operation 1202 may then determine a subject of the critical event objects 100 above a threshold. For example, the top quartile of the critical event objects 100 may be selected based on the risk value 113, and/or any number of critical event objects 100 having a value above a certain number (e.g., seventy on a scale of one to one hundred). In one or more embodiments, a visual representation of the grouping and/or separation of the subset may be displayed on a user interface. The subset displayed and/or visually separated cards for the users 702 of the session may be those instances of the critical event object and corresponding critical event criterion data 104 that may be of most importance to discuss, address, plan around, and assign human, monetary, and/or material resources.

Operation 1203 selects a unique identifier 103 of a critical event object 100, for example within the subset. Operation 1206 associates the unique identifier 103 of the critical event objects 100 with a unique identifier 363 of user profile 362 of a user 702. Operation 1206 may also optionally timestamp the association of the unique identifier 363, for example in order to establish a time at which a user 702 became responsible for, become no longer responsible for, or otherwise had what may be an important association change with respect to the critical event object 100. Operation 1208 may determine whether another instance of the user 702 should be assigned to the critical event object 100, in which case operation 1208 may return to operation 1206. In the event another user 702 is not to be assigned to the critical event object 100, operation 1208 may proceed to operation 1210.

Operation 1210 is a decision operation that may determine whether to set up a critical event detection. The critical event detection may detect and/or evaluate occurrence of the critical event and/or indicia of its occurrence. If critical event detection is to be set up, operation 1210 proceeds to operation 1212, which sets an event occurrence condition 124 and/or stores an event detection script 126 within or in association with the critical event objects 100. For example, if one failure event is "mid-project corporate merger or takeover," an indicia increasing the likelihood of such occurrence may be stock price received through an API. Other detection and/or evaluation methods may include the use of smart contract outcomes and/or blockchain algorithm outputs. In operation 1214, a notification (e.g., an alert) may be set such that the detected and/or evaluated occurrence is communicated to a user 702 associated with the session file 150 or a different user 702 associated with the organization owning or controlling the session file 150. Operation 1214 may also set a response action, for example automatically scheduling a meeting for all users 702 depending on an impact value of the impact data 110, generating a form letter requesting assistance, etc. Operation 1214 may then proceed to operation 1216. Operation 1216 may also be proceeded to from operation 1210 in the event no critical event detection is to be set up.

Operation 1216 is a decision process determining whether any unassigned critical event objects 100 remain. Operation 1216 may be limited to the subset above the risk threshold value. If additional unassigned critical event objects 100 remain, operation 1216 may return to operation 1204. Otherwise, operation 1216 may proceed to operation 1218. Operation 1218 registers and/or indexes critical event objects 100 associated with the session in one or more databases (e.g., the objects database 410, the objects database 510). The index may assist with search and/or queries, including for example natural language search and/or analysis conducted to determine like characteristics within the object dependency data structure 200 and/or the account dataset 512. In the event that the session, the session file 150, and/or one or more critical event objects 100 are set to be sharable with one or more other organizations, each of the critical event objects 100 of the session may have their content indexed for search and/or analysis, or may be registered for permitted read and/or write access by a different set of user profiles 362 and/or account profiles 532. Operation 1220 may then optionally generate a project data object 204 from the critical event object. Data of the critical event object 100 may be extracted and copied into the project data object 204. A workflow may also be presented to fill in any data required for the project data object 204 not already included in the critical event object 100. Where multiple platforms, project management software, or other software applications are available to create and/or work with the project data object 204, a menu may be used to make one or more selections. The critical event object 100 and/or the project data object 204 may have defined the project object reference 122, for example by storing the unique identifier of the project data object 204 in the project object reference 122 and/or by storing the unique identifier of the critical event object 100 in an attribute of the project data object 204. Operation 1220 may then terminate.

Figure 13:
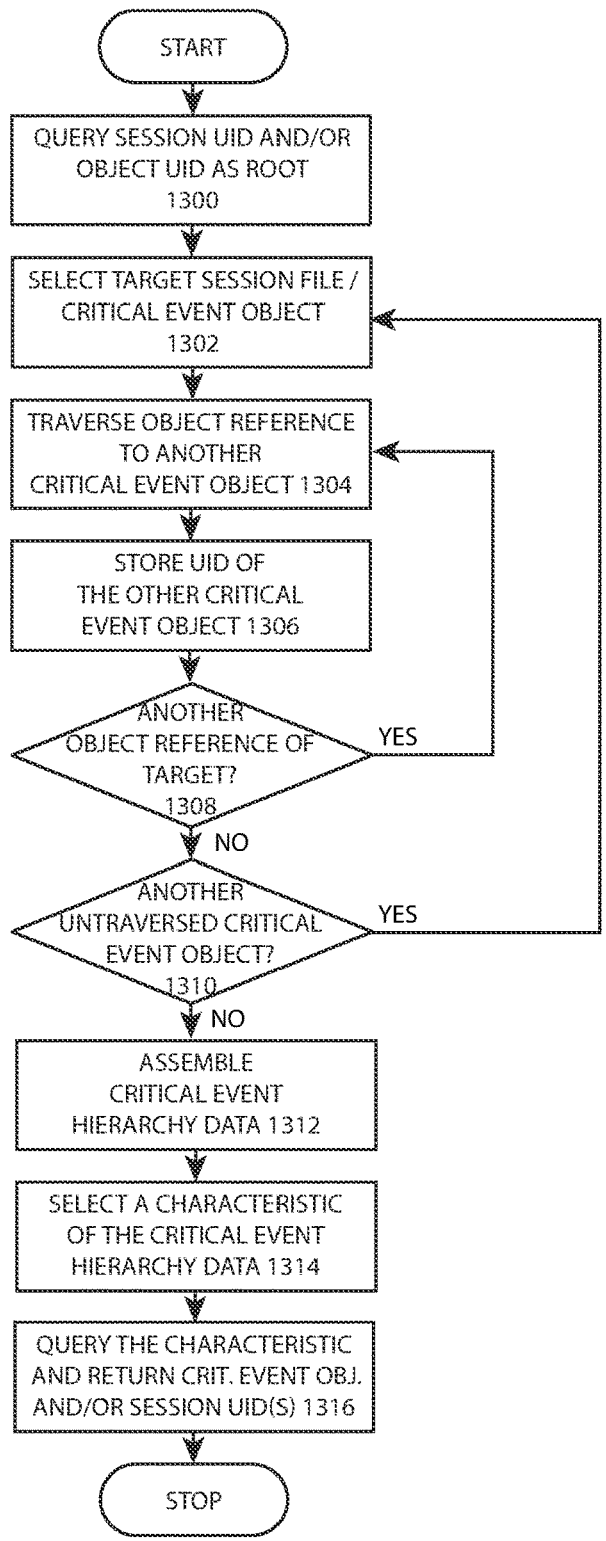
FIG. 13 illustrates a hierarchy assembly and analysis process flow for generating data usable in analysis, according to one or more embodiments.

FIG. 13 illustrates a hierarchy assembly process flow 1350, according to one or more embodiments. Operation 1300 queries a session UID 153 and/or an object UID 103 as a root of a hierarchy (e.g., the root 201). The session UID 153 and/or the object UID 103 may be generated by selection of a project name, a session name, and/or a directory of open projects and/or session files 150. Operation 1302 selects a target session file 150 and/or target critical event object 100. On a first iteration, the target will be the root 201 addressed in operation 1300. Referring to the embodiment of FIG. 2C as an example, the root 201A may select the failure event objects 102A. It should be noted that the root 201 need not be at the top of the data structure. For example, in the embodiment of FIG. 2C, the failure event object 102F could be elected as an instance of the root 201, with subsequent traversal moving "down" the data structure (e.g., to the failure event object 102G, the failure event object 102H, etc.).

Operation 1304 may then traverse each object reference (e.g., the critical event object reference 154 for a session file 150, or a critical event dependency reference 114 for a critical event object 100), the traversal to another critical event object 100B. Referring to the embodiment of FIG. 2C as an example, a failure dependency reference 116 may be traversed to the failure event object 102B.

Operation 1306 stores the unique identifier 103 of the other critical event object 100B. Referring to the example embodiment of FIG. 2C, the unique identifier 103 of the failure event object 102F may be stored. Operation 1308 is a decision operation that may determine whether another object reference of the target is defined. For example, each of the critical event object references 154 of the session file 150 may be tracked in computer memory to determine which have been traversed (e.g., in operation 1304). If there are any untraversed references, operation 1308 may return to operation 1304 to traverse another reference (e.g., traverse a critical event dependency reference 114 to a critical event object 100C). Referring to the example embodiment of FIG. 2C, a next failure dependency reference 116 may be traversed to the critical event object 100C. Eventually, each failure dependency reference 116 drawn from the failure event objects 102A may be followed to each of the failure event objects 102B, the failure event object 102C, the failure event object 102D, the failure event object 102E, and the failure event object 102F.

If all relevant references of the target have been traversed, operation 1308 may proceed to operation 1310. Operation 1310 is a decision operation that may determine whether there is another untraversed critical event object 100 which has had its unique identifier 103 stored in operation 1306. For example, each of the critical event objects 100 may be tracked in computer memory to determine which have been a target and subject to operation 1302 through operation 1308. If there exists another untraversed critical event object 100, operation 1310 may return to operation 1302 which may then select the untraversed critical event object 100 as a new target. Referring to the example embodiment of FIG. 2C, the failure event object 102B may be selected as the new target. Following determination that the failure event object 102B, the failure event object 102C, the failure event object 102D, and the failure event object 102E may have no defined dependencies, the failure event object 102F may be inspected as the target to determine dependencies. The failure event object 102G may then eventually have its dependencies traversed in turn. When all critical event objects 100 have had their references traversed, the hierarchy may have reached termination points and operation 1310 may proceed to operation 1312. Although not shown, operation 1304 may also traverse other reference types, for example the related reference 118, the project object reference 122, and/or others.

Operation 1312 may assemble the critical event hierarchy data in computer memory. In one or more embodiments, the critical event hierarchy data may be data from each of the critical event objects 100 that refers directly or indirectly back to the root 201, such data, for example, including: a name of each critical event object 100, the unique identifier 103 of each critical event object 100, the critical event criterion data 104 of each critical event object 100, the dependency references (e.g., the critical event dependency referenced 114 of FIG. 2A), and any other data that may be usable for consumption and/or to make calls to other software or systems. In one or more embodiments, where the critical event hierarchy data includes the unique identifier 103 of each of the included critical event objects 100, additional data not stored in the critical event hierarchy data may be retrieved and/or queried from each individual critical event object 100 without re-building the tree (although, in one or more alternative embodiments, rebuilding the critical event hierarchy data may be preferable to ensure structure of the tree remains correct and/or updated with any changes in the object database 410 and/or the object database 510).

Operation 1314 may select a characteristic of the critical event hierarchy data. For example, any of the attributes, associated values (e.g., data values, including null fields), and/or data value ranges may be selected as characteristic(s). The data value may be a user 702 associated with one or more of the critical event objects 100, a word, phrase, or synonym of the critical event criterion data 104, a risk value 113 within certain ranges, an occurrence value 112, and/or other values. Multiple attributes, associated values, and/or data value ranges may be selected through Boolean operators.

Operation 1316 may query the characteristic (e.g., the data value) and return a subset of the critical event hierarchy data, e.g., a set of unique identifiers 103 having the characteristic in common among the set of unique identifiers 103. One or more session files 150 referenced by the critical event hierarchy data may also be queried and the unique identifier 153 of the session file 150 returned. The data value and/or range of data values may also be returned. For example, where operation 1314 receives a selection of the risk value 113 greater than eighty, operation 1316 may return the unique identifiers 103 of the subset of critical event objects 100 within the critical event hierarchy that each have a risk value 113 greater than eighty, along with the risk value 113 of each of the critical event objects 100 within the subset. Through this process, and/or additional processes, insights or data for further analysis may be derived from an account dataset 512, from a critical event hierarchy data, and then from a subset of the critical event hierarchy data.

Figure 14:
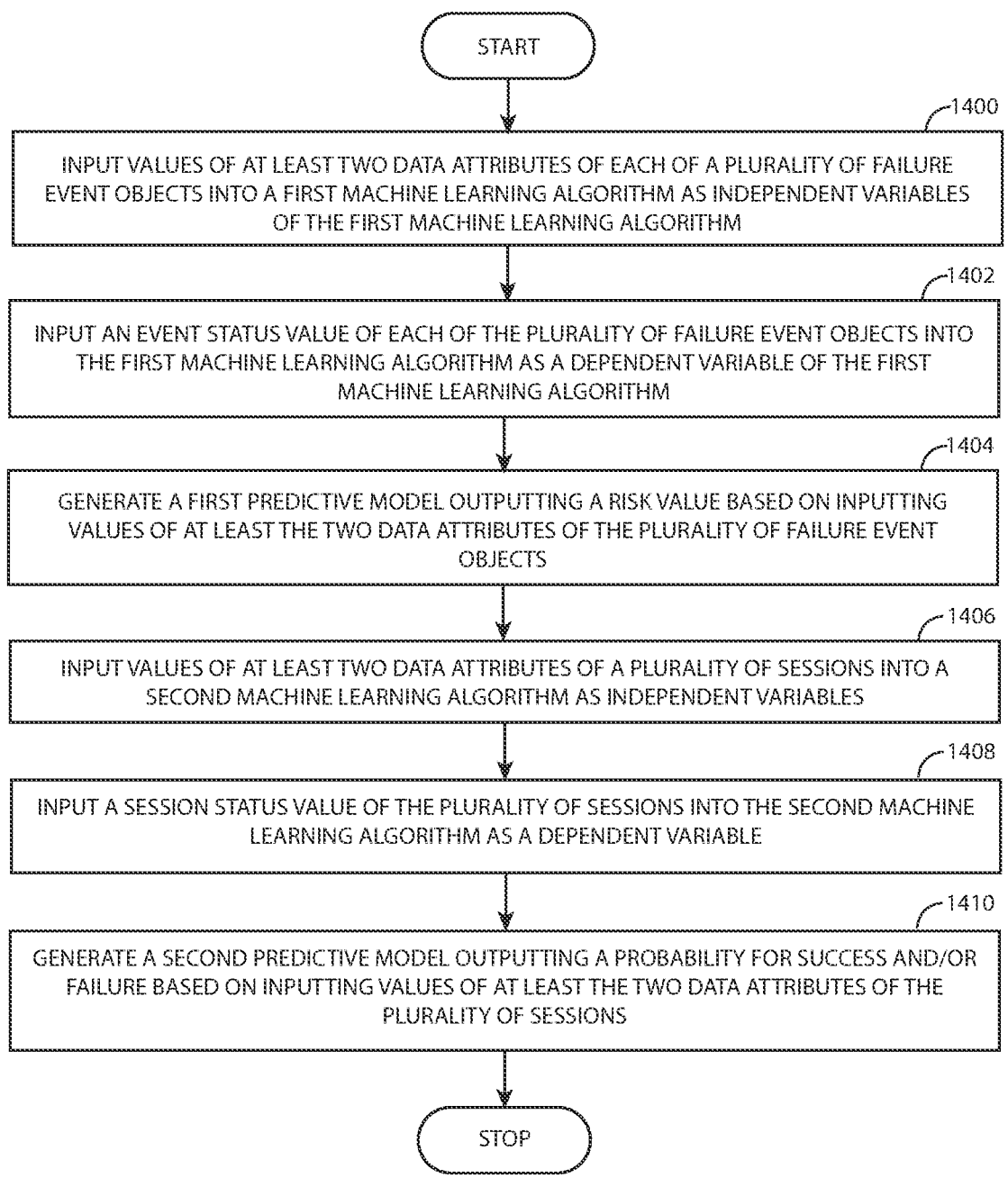
FIG. 14 illustrates a machine learning predictive model process flow for improving prediction of success and/or failure related to a critical event object and/or a session file, according to one or more embodiments.

FIG. 14 illustrates a machine learning predictive model process flow 1450, according to one or more embodiments. Operation 1400 inputs values of at least two data attributes of each of a plurality of failure event objects 100 into a first machine learning algorithm (e.g., the machine learning algorithm 602) as independent variables of the first machine learning algorithm. For example, almost any of the attributes and/or values of FIG. 2A and/or FIG. 2B may be selected. Operation 1402 inputs an event status value (e.g., a value associated with the occurrence status 130 attribute) of each of the plurality of failure event objects 100 into the first machine learning algorithm as a dependent variable of the first machine learning algorithm. Operation 1404 generates a first predictive model (e.g., the predictive model 608) correlating with the risk value 113 based on at least the two data attributes of the plurality of failure event objects 100. The predictive model 613 may be adjusted as additional training data is updated (e.g., to effect a machine learning process).

Operation 1406 may similarly input values of at least two data attributes across a plurality of sessions (e.g., across multiple session files 150) into a second machine learning algorithm as independent variables. Operation 1408 may input a session status value (e.g., a value of the occurrence status 130) of the plurality of sessions into the second machine learning algorithm as a dependent variable. Operation 1410 may then generate a second predictive model (e.g., the predictive model 616) of a probability success and/or failure based on at least the two data attributes of the plurality of sessions.

Figure 15:
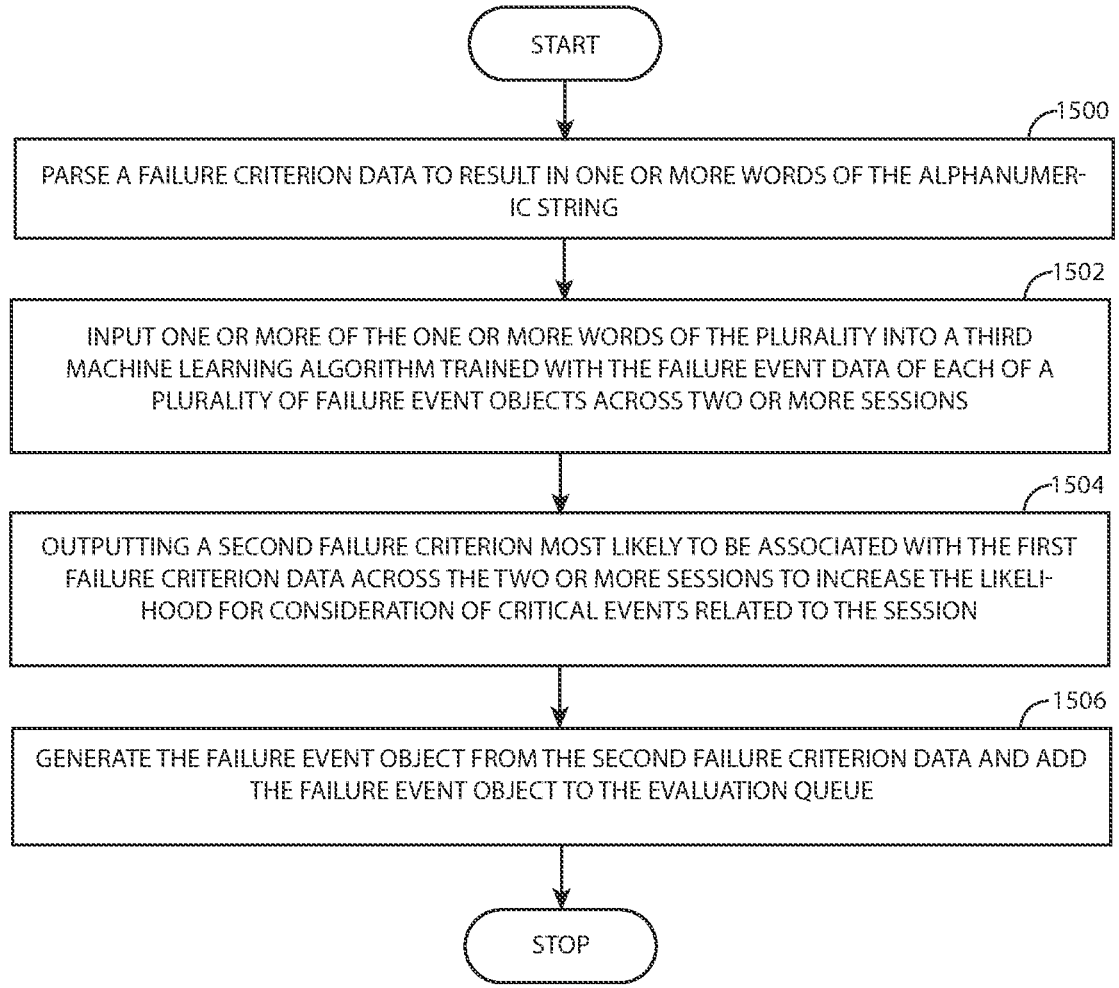
FIG. 15 illustrates a machine learning criteria recommendation process flow for automatically defining critical event objects and/or recommending critical event criterion for consideration during the session, according to one or more embodiments.

FIG. 15 illustrates a machine learning criteria recommendation process flow 1550, according to one or more embodiments. Operation 1500 parses a failure criterion data 106 to result in one or more words of an alphanumeric string. For example, operation 1500 may extract one or more words with project meaning, for instance: "resources", "talent", "skill", "influence", "market", "business culture", "competitive advantage", etc. Operation 1502 inputs one or more of the one or more words of the plurality into a third machine learning algorithm trained with the failure criterion data 106 of each of a plurality of critical event objects 100 (e.g., failure event objects 102) across two or more sessions. Operation 1504 outputs a second critical event criterion data 104 (e.g., a second failure event criterion data 106) most likely to be associated with the first critical event criterion data 104 across the two or more sessions to increase the likelihood for consideration of critical events related to a present session. Operation 1506 may then generate the critical event object 100 from the second critical event criterion data 104 and add the critical event object 100 to an evaluation queue (e.g., the evaluation queue 310).

Figure 16:
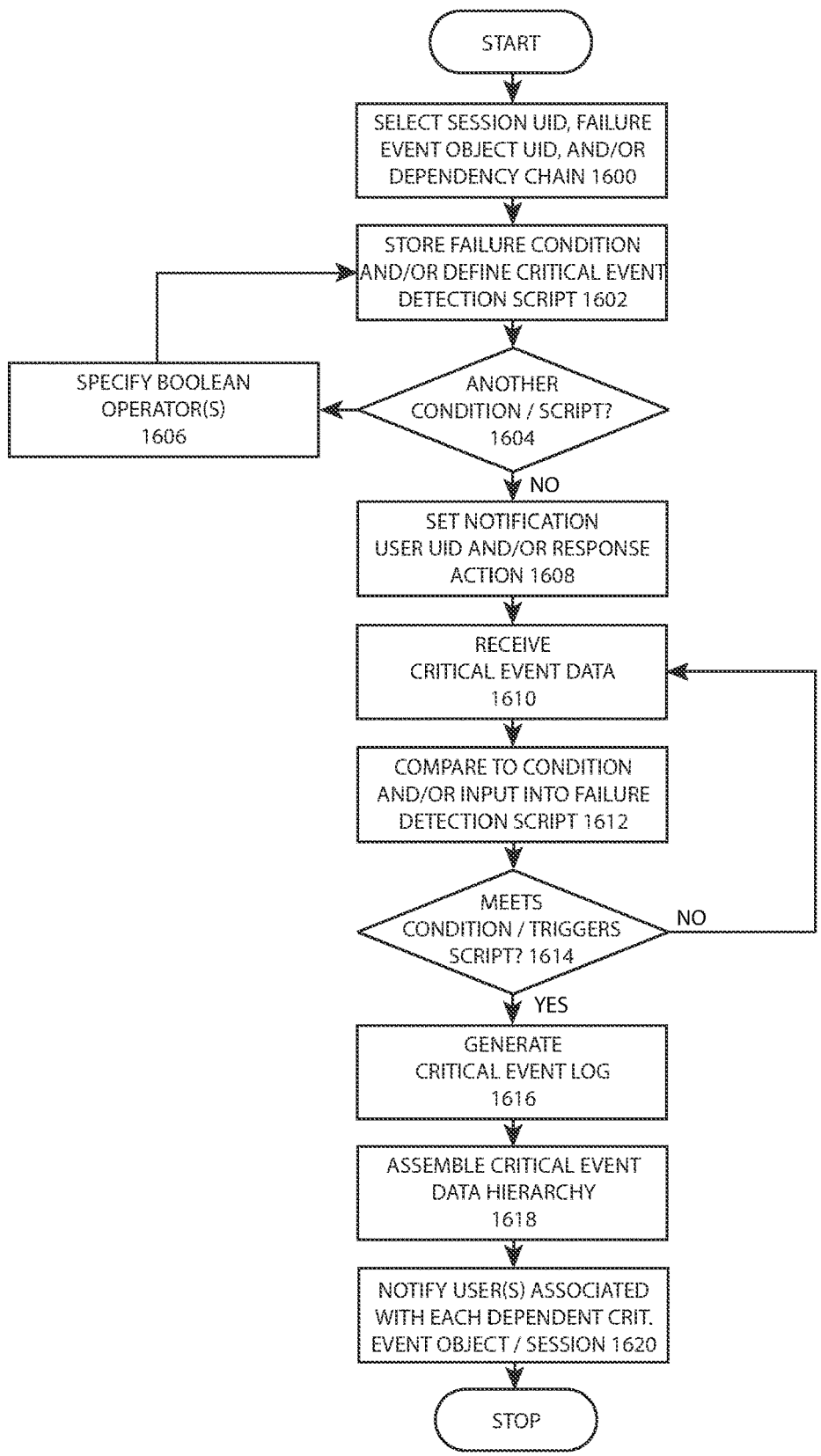
FIG. 16 illustrates a critical event detection process flow, according to one or more embodiments.

FIG. 16 illustrates a critical event detection process flow 1650, according to one or more embodiments. Operation 1600 selects a session UID 153, a unique identifier 103 of a failure event object 102, and/or a dependency chain beginning a given critical event object 100 (e.g., the dependency chain of a root 201). Operation 1602 stores a failure condition (e.g., an instance of the event occurrence condition 124) and/or defines an event detection script 126. Operation 1604 is a decision operation that may determine whether additional instances of the event occurrence condition 124 and/or the event detection script 126 should be defined. If an additional event occurrence condition 124 and/or the event detection script 126 is to be defined, operation 1604 may proceed to operation 1606 which may specify a relationship (e.g., through a Boolean operator) between the condition and/or script. Operation 1606 may then return to operation 1602. If no additional event occurrence condition 124 and/or the event detection script 126 is to be defined, operation 1604 may proceed to operation 1608. Operation 1608 may set a notification user (e.g., by designating a unique identifier 363 of a user profile 362 to which to send a notification) and/or set a response action. The response action, for example, may be to create a new task and/or deadline in a project management software, to send out a general warning to one or more emails, to secure additional material resources by ordering goods or services, etc.

Operation 1610 receives a critical event data. The critical event data may be data that can be assessed against the condition and/or input into the event detection script 126. The critical event data may be received through an internal or external API, and may be detected by a software agent. Operation 1612 compares the condition (e.g., the event occurrence condition 124) and/or the event detection script 126 to the critical event data. Operation 1614 is a decision operation that may determine if all independent variables have been specified. If not, operation 1614 may return to operation 1610, which may listen for additional data (including, in one or more embodiments, that data received for multiple independent variables may be checked for temporal connection sufficient to use both independent variables as inputs simultaneously.

Operation 1616 may generate a critical event log. The critical event log may be stored in association with the critical event objects 100 and/or in association with the session file 150 (e.g., in the session data log 158). Although not shown, an intermediate operation 1617 may notify any user 702 specified in operation 1608. Operation 1618 may assemble a critical event hierarchy data, for example as shown and described in the embodiment of FIG. 2C and FIG. 13. Operation 1620 may then notify one or more users 702 associated with each dependent critical event object 100 and/or session file 150 (e.g., each critical event object 100 drawing references, directly and/or indirectly, to the critical event object 100). In one or more embodiments, operation 1620 may be used to notify other users 702 that a first session and/or associated second session with dependencies drawn to the first session may be at risk based on occurrence of the critical event.

Figure 17:
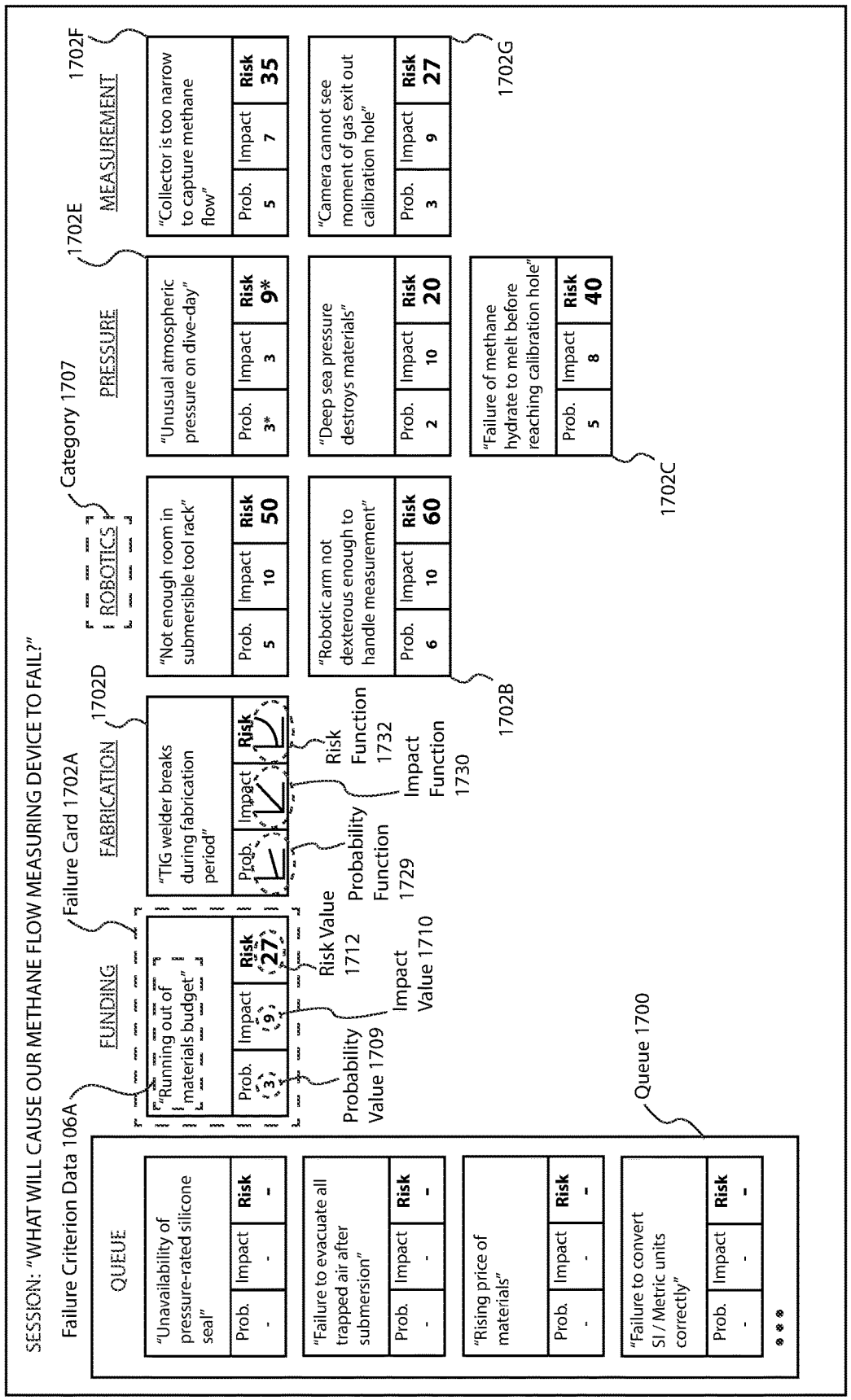
FIG. 17 is an example embodiment illustrating use of various aspects of the present embodiment to help prevent failure of a scientific research study, according to one or more embodiments.

FIG. 17 is an example embodiment illustrating use of various aspects of the present embodiment to help prevent failure of a scientific research study, according to one or more embodiments. In the example embodiment of FIG. 17, a university laboratory (e.g., a set of users 702) is trying to increase likelihood of success on a research project through use of the orchestration server 300, the object server 400, and a set of client devices 700. The laboratory studies oceanic science, and more specifically deep-sea microbial communities which are linked to production of methane gas. The laboratory has received a valuable lab time submersible (e.g., similar to a submarine) to study the communities and their environment. As part of the "dive" expedition, the laboratory wishes to measure methane flow rates deep under the ocean, including at a number of specific "vents" observed during a previous dive. The laboratory must therefore allocate resources to build a methane flow rate measuring device (e.g., a flowmeter) usable by the submersible's robotic arms to measure the flow rate of each of the vents. Although an important objective, it seems to be one of the less difficult problems the lab must solve, and a small team of three users 702 along with a modest budget is allocated for the project.

After initial deliberation, the team decides on a basic strategy. They will build a collector that the methane can flow up into, similar to a big upside-down bucket. The collector will have one or more calibrated marks, like a measuring cup. A camera on the submersible can watch as the methane flows into the collector. A video camera on the submersible will record how long it takes the bubbles to fill the collector to the calibration mark. The team will use the depth of the submersible at the location to determine pressure, and therefore be able to calculate the volume at sea level. By dividing the sea-level volume by the time it took to collect the sample, the team determines the flow rate. This design seems relatively straightforward, at first.

However, the team runs into a complication. The vents are over 800 meters under the ocean, and at this pressure and temperature the cold sea-water instantly forms a hard shell of methane hydrate around each bubble. Each bubble stacks into the collector like a cup of marbles, with sea water in-between. The hard-shell bubbles only will melt at significantly higher temperature and/or lower pressure, that is, when the submersible is closer to the surface. The team tries to get additional resources from the laboratory, but the personnel and funding have already been allocated and are no longer available.

Now with their limited resources, the team must change the design. The team will collect methane hydrate, but will now leave significant room inside the collector. Then, as the submersible rises back to the ocean's surface, the bubbles will melt and the gas will expand until it reaches a small "calibration hole" drilled through the side wall of the collector. When bubbles are observed exiting the hole, the gas will have a known volume. The operator of the submersible will record the current depth so the team can calculate the volume at sea level. This design now appears to have significantly more complexity and risk.

Each of the three team members (e.g., the users 702) log into the orchestration server 300 through a client device 700, including two laptops and a tablet. The team begins by naming the session, "What will cause our methane flow measuring device to fail?" The negative framing may assist the team in explicitly addressing their constraints and evaluating threats. The session is stored into a session file 150Y, e.g., on the object server 400. Although some templates for certain research-related projects exist (e.g., "how do I prevent my grant application from failing?"), the team selects a general template, "construction projects".

Each of the team members spend ten minutes entering every example of failure criteria they can think of, each of which is submitted over the network 180 to the orchestration server 300 and stored as the failure criterion data 106. For example, a failure criterion data 106A is "run out of materials budget," a failure criterion data 106B is "robotic arm not dexterous enough to handle measurement device," and a failure criterion data 106C is "failure of methane hydrate to melt before reaching calibration hole." Numerous other examples of the failure criterion data 106 are also illustrated in the embodiment of FIG. 17, some of which are labeled for further discussion, below. For each of the failure criterion data 106 may be generated a failure event object 102 on a backend database (e.g., the object database 410) including generating an object UID 103 for each. From the perspective of the users 702, each of the critical event objects 100 may be represented as "cards" on a UI, e.g., shown as the "failure card 1702" in the embodiment of FIG. 17. In the embodiment of FIG. 17, the failure card 1702A, for example, corresponds with the failure event object 102A (not shown) and the failure criterion data 106A.

The failure event objects 102 may be recorded as in an initial state (e.g., "queued") in the session file 150X such that they are stored within an evaluation queue 310. The queue 1700 illustrates a UI element communicating to the users 702 that each of the failure cards 1702 in queue 1700 are awaiting additional information (e.g., each of the failure event objects 102 may be awaiting further construction through the addition of data). The users 702 may also set up a number of categories. By default, the construction project template may include a number of categories 1707, for example including "fabrication" and "funding". The team ends up changing most of the others to result in five categories: "funding," "fabrication", "robotics", "pressure", and "measurement". Each category 1707 is recorded as a category value in a category data 155 of the session file 150.

Two additional failure event objects 102 not defined by the team may be added to the session. First, the selected template may include a failure event object 102 that represents a common issue that causes failure in construction projects generally: the rising price of materials from beginning to end of the project. The second failure event object 102 may be automatically added due to each of the users 702 association with an account of the research lab (e.g., the account profile 532). Specifically, the second failure event object 102 may include a failure criterion data 106 "failure to convert SI/metric units correctly," which may have been added by the laboratory to all projects after a serious miscalculation by a different research team in the prior year.

The team may then withdraw each of the failure cards 1702 from the queue 1710 and begin using various UI interactions and other automatic processes to define the data of each failure event object 102. As shown in the embodiment of FIG. 17, the users 702 may assign each of the failure cards 1702 to a category 1707, which may set a category value in the failure event object 102.

The team may then discuss and assign one or more factors that relate to the chance of failure. In the example embodiment of FIG. 17, there may be a probability data 109, an impact data 110, and a risk value 113. With regards to the failure card 1702A, the probability data 109 may be a probability value 1709 ("3"), the impact data 110 may be an impact value 1711 ("9"). Upon defining both inputs, the risk value 1713 may be calculated, for example by a risk assessment function 343 of the orchestration server 300. In the example embodiment of FIG. 17, the probability value 1709 may be multiplied by the impact value 1711 to result in a risk value 1713 of "27", which may give an approximation of the importance of the risk to the project. In contrast, the failure card 1702D may have a curve defined for both the probability data 109 and the impact data 1711. For example, the team may know that a certain welding equipment they need has been breaking often in the fabrication shop they are authorized to use. The closer they get toward the end of the project, the more impact there would be if the welder broke. The welder was also just fixed, meaning its probability of breaking is low but will increase over time. The team defines a probability function 1729 and an impact function 1730, both a function of time. A resulting risk function 1732 may be calculated by multiplication of the probability function 1729 and the impact function 1730. Yet another risk may be "unusual atmospheric pressure on dive-day," which could throw off the measurement. The team selects a probability value 1709 (unlabeled, but shown with a "3*") that will change depending on weather inputs from a weather service as they approach the date of the experiment. The probability value 1709 of the failure criterion object 106 may continue to update, possibly with increasing accuracy, as the day approaches. The risk value 1713 of the failure card 1702 is also shown with a "9*" illustrating its variability.

Before additional data or structure is added to one or more of the failure event objects 102, the team may narrow the set of failure event objects 102 (e.g., as viewed by them, the failure cards 1702) needing further information. For example, the risk threshold routine 340 may sort each critical event object 100 by its risk value 1713, and a risk threshold function 341 may divide those critical event objects 100 which represent enough risk for further definition and data structuring versus those which do not. In one or more embodiments, this narrowing may further focus the time and resources of the team to improve the probability of project success. In the present embodiment, for example, the team may determine that anything above risk value of "25" is worth further consideration. The present example continues in the example embodiment of FIG. 18.

Figure 18:
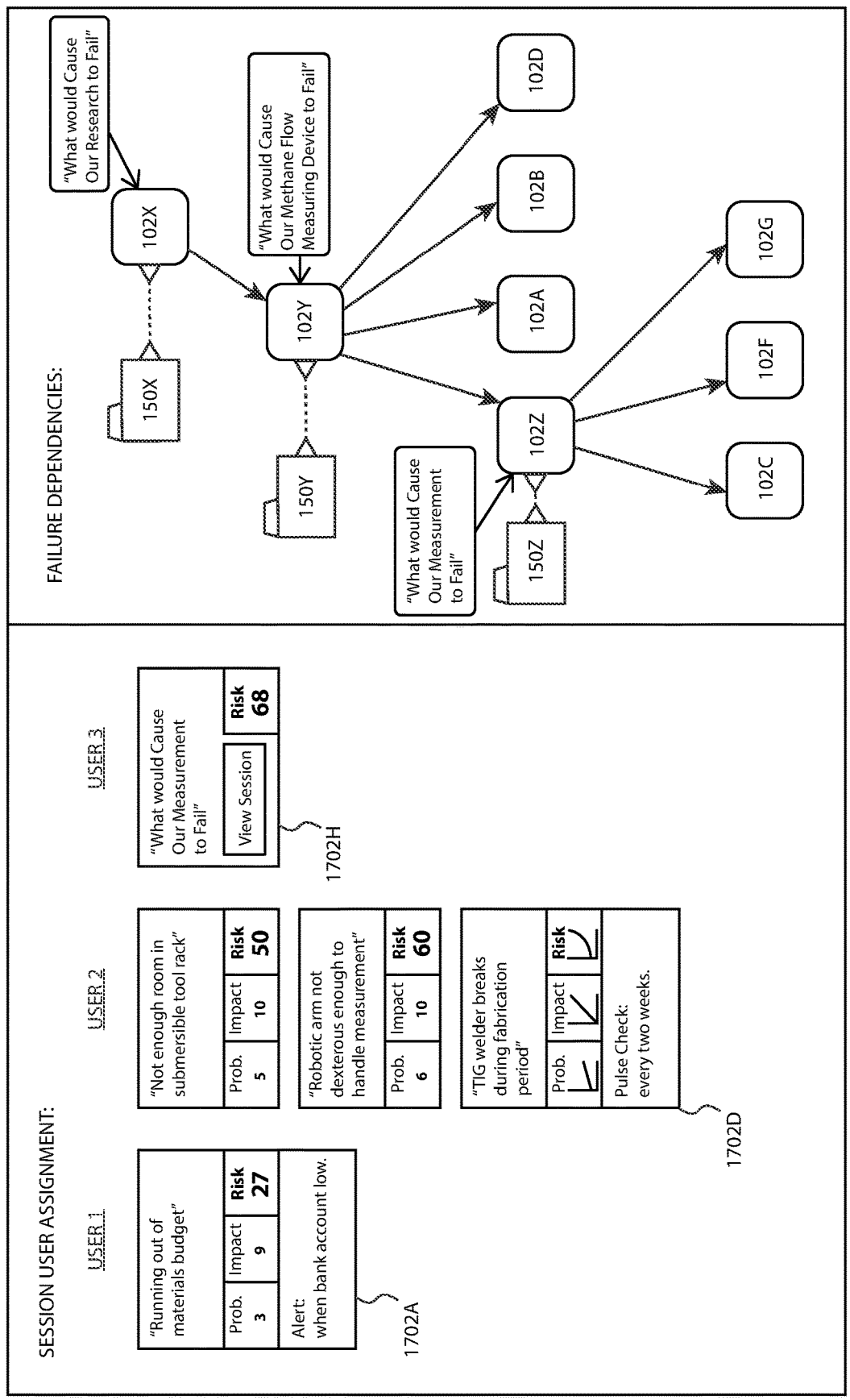
FIG. 18 is a continuation of the example embodiment of FIG. 17, according to one or more embodiments.

FIG. 18 is a continuation of the example embodiment of FIG. 17, according to one or more embodiments. The team may have thus far defined a set of failure event objects 102, added category values, added data sufficient for calculation of a risk value 1713, and determined a threshold number of failure event objects 102 warranting additional data and data structuring. Following these operations, for example, a user 702 may be assigned to each of the remaining subset of critical event objects 100 determined most relevant. For example, the failure event object 102A may be assigned to a user 702A (e.g., through a user assignment reference 120). In the present example, the team may assign similar problem types to one specific team member, for example all materials and fabrication issues to "user 2".

The team may continue adding data and structure. The team may add to one or more of the critical event objects 100 action data 140 that lists the team's knowns, unknowns, questions, and next actions (not shown). As just one example of additional data that can be added, an event occurrence condition 124 may be set, for example a notification from a bank account that the funding allocated to the team has fallen below a threshold balance. In another example, a status check condition may be set such that every two weeks a team member is reminded to check on the status of the TIG welder. If the welder breaks and is fixed, the risk function 1732 may be reset to t=0. Numerous other data shown and described throughout the present embodiments may be added to the failure event objects 102.

Upon inspection, the team may realize that a large number of high-risk items fall into measurement of methane flow. This may be a surprise to the team, which previously may have been more focused on fabrication than the use of their apparatus. The team may decide that the measurement process requires its own session. The team selects several of the critical event objects 100 (e.g., the critical event objects 100 associated with the failure card 1702C, the failure card 1702F, and the failure card 1702G as shown in FIG. 17). The users may select a button in the UI for "generate new session," and a new session file 150Z may be defined. The session file 150Z may have three default critical event objects 102 imported from the first session file 150Y. The team may then spend additional time to think through the challenges and risks of the measurement.

As a result, the team may generate a failure event hierarchy with at least three levels: the laboratory research project of which they are a part (the failure event object 102X), the methane flow rate measuring device (e.g., the failure event object 102Y), and the measurement function (e.g., the failure event object 102Z). In the embodiment of FIG. 18, a root 201 of the failure dependency hierarchy may be queried (e.g., the failure event object 102Y) and a failure dependency hierarchy data 202 assembled. A graphical representation displayed to the users 702, including an immediate parent project (e.g., the critical event object 102X). This may assist the team and all lab scientists in visualizing its projects an dependencies.

Should the principal scientists of the laboratory wish to determine the status of all projects and/or commonalities between and among them, an administrative user 702 may, for example, query the object database 410 to assemble a failure dependency hierarchy data 202, where the failure event object 102X is selected as a root 201. The principal scientists may be able to see an entire failure hierarchy and dependencies, including, for example, a risk value 1713 for each. They may be able to check the additional data added by individual team members, or initiate status checks manually.

As a result of utilizing various aspects of the present embodiments, the team is able to efficiently evaluate potential critical failure events, narrow risk factors to allocate limited resources, and determine a path forward. The laboratory may have an increased overall success, as well as visibility and insight into the project status of each of its teams.

Although the present embodiments have been described with reference to specific example embodiments, it will be evident that various modifications and changes may be made to these embodiments without departing from the broader spirit and scope of the various embodiments. For example, the various devices, engines, agent, routines, and modules described herein may be enabled and operated using hardware circuitry (e.g., CMOS based logic circuitry), firmware, software, or any combination of hardware, firmware, and software (e.g., embodied in a non-transitory machine-readable medium). For example, the various electrical structure and methods may be embodied using transistors, logic gates, and electrical circuits (e.g., application specific integrated circuitry (ASIC) and/or Digital Signal Processor (DSP) circuitry).

The functions of various engines, modules, routines, subroutines, systems, and other elements may be converted into a method, which may be claimed. By way of example and not limitation, a method may be defined by taking one or more functions of the session initiation routine 304, the object generation engine 320, the object initiation routine 322, the categorization subroutine 324, the factor retrieval routine 325, the risk assessment routine 342, the dependency routine 330, and the user assignment routine 328. For example the method may include initiating a session comprising generating a session UID 153 and provisioning computing resources that include a computing memory and a processing power. The method generates a user addition request 305 to associate a unique identifier 363 of a first user profile 362 with the session UID 153. The method receives a failure criterion data 104 comprising an alphanumeric string specifying a failure event and generates a failure event object 102 in the computing memory including the failure criterion data 104. A unique identifier 103 of the failure event object 102 may be optionally generated.

The method may store the failure event object 102 in an evaluation queue 130, and may associate a category value (e.g., through a category reference 107) with the failure event object 100. The method may receive a probability data 109 and an impact data 110, and may then generate a risk value 113 by inputting the probability data 109 and the impact data 110 into a risk assessment function 343. The probability data 109, the impact data 110, and/or the risk value 113 may then be stored by the method in association with the failure event object 102. The method may also store, within a referential attribute of the failure event object 102 (e.g., critical event dependency reference 114) a unique identifier 103 of a second failure event object 102 to define a failure dependency of the failure dependency hierarchy. The method may then receive a selection of the unique identifier 363 of the first user profile 362, and associate the unique identifier 363 of the first user profile 326 with the unique identifier 103 of the failure event object 102 to assign responsibility to a first user of the first user profile 363 for preventing the failure event.

In addition, it will be appreciated that the various operations, processes, and methods disclosed herein may be embodied in a non-transitory machine-readable medium and/or a machine-accessible medium compatible with a data processing system (e.g., the orchestration server 300, the object server 400, the object server 500, the machine learning server 600, and the client device 700). Accordingly, the specification and drawings are to be regarded in an illustrative rather than a restrictive sense.

Each of the unique identifiers described herein (including the account UID 553, the template UID 433, object UID 103 of the critical event object 100, the unique identifier 533 of the account profile 532, the unique identifier 363 of the user profile 362, etc.) may be referred to interchangeably without an accompanying number as a "unique identifier" and/or "UID".

Throughout the present embodiment, difference instances of the same or similar elements may be referred to by one or more methods. For example, a client device 700 associated with a first user profile 362 and a client device 700 associated with a second user profile 362 denotes separate instances of the client device 700 (e.g., a client device 700A and a client device 700B). Similarly, where an element is referred to without an association, introduction of an association indicates a different element unless context clearly requires otherwise. For example, after referring to a risk value 113 of a critical event object 100, introduction of a risk value 113 of a second critical event object 100 indicates difference instances of the risk value 113 (e.g., a risk value 113A and a risk value 113B). Where sets or pluralities of an element are discussed (e.g., critical event objects 100), introduction of another set or plurality may have overlapping instances of an element. For example, a first plurality of critical event objects may include a critical event object 100A, a critical event object 100B, and a critical event object 100C; a second plurality of critical event objects may include the critical event object 100B, the critical event object 100C, and a critical event object 100D. Throughout the present embodiments, "first", "second", "third", etc., may be used to refer to different instances of an element, along with terms such as "different" and "another."

The structures in the figures such as the engines, routines, subroutines, agents, and modules may be shown as distinct and communicating with only a few specific structures and not others. In the embodiments of FIG. 3, FIG. 4, FIG. 5, FIG. 6, and FIG. 7, each of the structures are communicating with one another although, for clarity, no arrows are shown. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

Embodiments of the invention are discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems.

Features which are described in the context of separate embodiments may also be provided in combination in a single embodiment. Conversely, various features which are, for brevity, described in the context of a single embodiment, may also be provided separately or in any suitable subcombination. The applicants hereby give notice that new claims may be formulated to such features and/or combinations of such features during the prosecution of the present application or of any further application derived therefrom.

References to "one embodiment," "an embodiment," "example embodiment," "various embodiments," "one or more embodiments," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least one or more embodiments of the invention" includes the stated particular feature, structure, or characteristic.

The enumerated listing of items does not imply that any or all of the items are mutually exclusive, unless expressly specified otherwise.

It is understood that the use of a specific component, device and/or parameter names are for example only and not meant to imply any limitations on the invention. The invention may thus be implemented with different nomenclature and/or terminology utilized to describe the mechanisms, units, structures, components, devices, parameters and/or elements herein, without limitation. Each term utilized herein is to be given its broadest interpretation given the context in which that term is utilized.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

A "computer" or "server" may refer to one or more apparatus and/or one or more systems that are capable of accepting a structured input, processing the structured input according to prescribed rules, and producing results of the processing as output. Examples of a computer or a server may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; an interactive television; a web appliance; a telecommunications device with internet access; a hybrid combination of a computer and an interactive television; a portable computer; a tablet personal computer (PC); a personal digital assistant (PDA); a portable telephone; a smartphone, application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, one or more embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network (e.g., the network 180) is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

It will be appreciated by one in the art that each of the servers described herein (e.g., the orchestration server 300, the object server 400, the object server 500, the machine learning server 600) may be logically and/or physically separate server, and may be implemented across one or more physical computers with various allocations of memory, computing, and/or storage. It will all be appreciated that what may be a small device such as a smartphone, tablet, or personal computer may act as the server for the systems, engines, modules, routines, and subroutines described herein, for example where a first user may use their smartphone to "host" a session for other users 702 operating on their smartphone (e.g., over a Bluetooth® connection). In such case, one of the client devices 700 may act as one or more of the servers shown and described herein.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "processor" may refer to any device or portion of a device that processes electronic data from registers and/or memory to transform that electronic data into other electronic data that may be stored in registers and/or memory. A "computing platform" may comprise one or more processors.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing the critical event assessment network 190 according to the present invention will be apparent to those skilled in the art. Various aspects of the invention have been described above by way of illustration, and the specific embodiments disclosed are not intended to limit the invention to the particular forms disclosed. The particular implementation of the loyalty rewards programs may vary depending upon the particular context or application. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. A system for building a failure dependency hierarchy in a computer memory, the system comprising:
   an orchestration server, comprising:
      a processor of the orchestration server;
      a memory of the orchestration server;
      a session initiation routine comprising computer readable instructions that when executed on the processor of the orchestration server:
         initiate a session comprising generating a session UID and provisioning computing resources comprising a computing memory and a processing power, and
         generate a user addition request to associate a unique identifier of a first user profile with the session UID,
      an object generation engine comprising computer readable instructions that when executed on the processor of the orchestration server:
         receive a failure criterion data comprising an alphanumeric string specifying a failure event;
      an object initiation routine comprising computer readable instructions that when executed on the processor of the orchestration server:
         generate a failure event object in the computing memory comprising the failure criterion data and optionally a unique identifier of the failure event object, and store the failure event object in an evaluation queue;
a categorization subroutine comprising computer readable instructions that when executed on the processor of the orchestration server:
associate a category value with the failure event object;
a factor retrieval routine comprising computer readable instructions that when executed on the processor of the orchestration server:
receive a probability data, and
receive an impact data;
a risk assessment routine comprising computer readable instructions that when executed on the processor of the orchestration server:
generate a risk value by inputting the probability data and the impact data into a risk assessment function, and
store at least one of the probability data, the impact data, and the risk value in association with the failure event object;
a dependency routine comprising computer readable instructions that when executed on the processor of the orchestration server:
store in a referential attribute of the failure event object a unique identifier of a second failure event object to define a failure dependency of the failure dependency hierarchy; and
a user assignment routine comprising computer readable instructions that when executed on the processor of the orchestration server:
receive a selection of the unique identifier of the first user profile, and
associate the unique identifier of the first user profile with the unique identifier of the failure event object to assign responsibility to a first user of the first user profile for preventing the failure event; and
a network communicatively coupled to the orchestration server.

2. The system of claim 1, further comprising:
an object server comprising:
a processor of the object server;
a memory of the object server;
a critical hierarchy generation engine comprising computer readable instructions that when executed on the processor of the orchestration server:
query the session UID as a root of the failure dependency hierarchy,
determine a set of failure event objects at least one of directly and indirectly connected to the root through one or more failure dependency references of a data structure, and
assemble a failure dependency hierarchy data in the computer memory.

3. The system of claim 2, further comprising:
a hierarchy analysis routine comprising computer readable instructions that when executed on the processor of the object server:
determine that each of a subset of the set of failure event objects within the failure dependency hierarchy data comprise a data value in common;
returns to a client device associated with a second user profile registered with the session a set of session unique identifiers of the subset of the set of failure event objects.

4. The system of claim 3, wherein the data value in common comprising at least one of: (i) the unique identifier of the first user profile of the first user; (ii) a word of the alphanumeric string; (iii) the risk value; (iv) a failure averted value; (v) an event status value; and (vi) the unique identifier of the second failure event object specified in the referential attribute.

5. The system of claim 1, further comprising:
a critical event log routine comprising computer readable instructions that when executed on the processor of the orchestration server:
store a failure averted value in an occurrence status attribute of the failure event object,
generate a critical event log, and
designate the critical event log for reporting to at least one of the first user profile and a second user profile registered with administrative privilege with respect to the session.

6. The system of claim 5, wherein
the factor retrieval routine further comprising computer readable instructions that when executed on the processor of the orchestration server:
query a probability data source,
wherein the probability data source comprising a first database comprising a first plurality of failure event objects from a plurality of sessions associated with one or more accounts,
receive the probability data,
query an impact data source,
wherein the impact data source comprising a second database comprising failure event objects from the plurality of sessions associated with one or more accounts, and
receive the impact data.

7. The system of claim 6, wherein the orchestration server further comprising:
a session spawning subroutine comprising computer readable instructions that when executed:
generate a new session based on the failure event object,
determine that the first user profile is associated with the failure event object, and
generate a call to register the first user profile associated with the failure event object with administrative privileges with respect to the new session.

8. The system of claim 7, further comprising:
a machine learning server comprising:
a processor of the machine learning server,
a memory of the machine learning server,
a first risk model engine comprising computer readable instructions that when executed on the processor of the machine learning server:
input values of at least two data attributes of each of a second plurality of failure event objects into a first machine learning algorithm as independent variables of the first machine learning algorithm,
input a value of an occurrence status of each of the second plurality of failure event objects into the first machine learning algorithm as a first dependent variable of the first machine learning algorithm, and
generate a first predictive model outputting a second risk value based on inputting of the at least two data attributes of the second plurality of failure event objects;
a second risk model engine comprising computer readable instructions that when executed on the processor of the machine learning server:
input values of at least two data attributes of a plurality of session files into a second machine learning algorithm as independent variables of the second machine learning algorithm, input a session status value of each of the plurality of session files into the second machine learning algorithm as a second dependent variable of the second machine learning algorithm, and generate a second predictive model outputting at least one of a probability for success and a probability for failure of the session based on inputting the values of at least the at least two data attributes of the plurality of session files;

a critical criteria recommendation engine comprising computer readable instructions that when executed on the processor of the machine learning server:

parse the failure criterion data to result in one or more words of the alphanumeric string, input one or more of the one or more words into a third predictive model built with a third machine learning algorithm and trained with a set of failure criterion data extracted from each of a third plurality of failure event objects across two or more sessions, output a second failure criterion data most likely to be associated with the failure criterion data across the two or more sessions to increase a likelihood for consideration of critical events related to the session, and generate the failure event object from the second failure criterion data and add the failure event object to the evaluation queue.

9. The system of claim 8, further comprising:

an authentication system comprising computer readable instructions that when executed on the processor of the orchestration server:

authenticate at least one of the first user and a device of the first user;

a timer subroutine comprising computer readable instructions that when executed on the processor of the orchestration server:

initiate a timer for receipt of the failure criterion data, and determine expiration of the timer;

a realtime communication module comprising computer readable instructions that when executed on the processor of the orchestration server:

initiate a realtime communication channel;

a grouping subroutine comprising computer readable instructions that when executed on the processor of the orchestration server:

associate a first failure event object with a different failure event object through a grouping reference;

an object sorting subroutine comprising computer readable instructions that when executed on the processor of the orchestration server:

sort a fourth plurality of failure event objects based on a risk value of each failure event object within the fourth plurality of failure event objects, wherein the probability data and the impact data are received from the first user;

a factor adjustment subroutine comprising computer readable instructions that when executed on the processor of the orchestration server:

generate an adjusted probability data that is at least one of an averaged probability data and a weighted probability data generated from a first probability data and a second probability data, and generate at least one of an adjusted impact data that is at least one of an averaged impact data and a weighted impact data from a first impact data and a second impact data, wherein the first probability data and the first impact data from the first user and the second probability data and the second impact data received from a second user, wherein the weighted impact data based on a first weight factor associated with the first user profile of the first user and a further based on a second weight factor associated with the second user profile of the second user, and generate the risk value by inputting at least one of the adjusted probability data and the adjusted impact data into the risk assessment function; and a project object creation module comprising computer readable instructions that when executed on the processor of the orchestration server:

generate a project data object from the failure event object.

10. The system of claim 9, further comprising:

a templating module comprising computer readable instructions that when executed:

select a template data for the session, the template data comprising one or more category values, determine one or more failure criterion data associated with the template data, generate one or more new failure event objects from the one or more failure criterion data associated with the template data, and add the one or more new failure event objects to the evaluation queue;

an auxiliary session data routine comprising computer readable instructions that when executed on the processor of the orchestration server:

determine a third failure event object is associated with a project failure of an account profile, extract a failure criterion data of the third failure event object and optionally a probability data of the third failure event object, an impact data of the third failure event object, and a risk value of the third failure event object, generate a fourth failure event object comprising the failure criterion data of the third failure event object and associate the fourth failure event object with the session, and add the fourth failure event object to the evaluation queue;

a risk threshold routine comprising computer readable instructions that when executed on the processor of the orchestration server:

determine a subset of a fifth plurality the failure event objects that are above of a risk threshold value calculated by a risk threshold function;

a visualization module comprising computer readable instructions that when executed on the processor of the orchestration server:

generate a visualization of one or more UI elements each representing one or more failure event objects relative to the risk threshold value;

a report subroutine comprising computer readable instructions that when executed on the processor of the orchestration server:

generate a report comprising a name of the first user profile and one or more failure event objects assigned to the first user profile;

an event evaluation engine comprising computer readable instructions that when executed on the processor of the orchestration server:
  store at least one of a failure condition data specifying a failure condition and a failure detection script that when executed on a computer processor evaluates an input to the failure detection script to determine the failure condition as an output of the failure detection script, and
  determine occurrence of the failure condition;
the orchestration server further comprising computer readable instructions that when executed on the processor of the orchestration server:
  store a session file comprising the session UID and unique identifiers of a sixth plurality of failure event objects,
  restore the session from the session file,
  re-initiate the realtime communication channel,
  update an attribute of the failure event object,
  re-generate the risk value of the failure event object, and
  re-evaluate the subset of the sixth plurality of the failure event objects above the risk threshold value of the risk threshold function;
a status tracking engine comprising computer readable instructions that when executed on the processor of the orchestration server:
  store an object check condition of the failure event object,
  generate a status check request of the failure event object upon occurrence of the object check condition, and
  store a status check value received from a client device associated with a user profile associated with the failure event object; and
the user assignment routine further comprising computer readable instructions that when executed on the processor of the orchestration server:
  overwrite the unique identifier of the first user profile of the first user assigned responsibility for preventing the failure event with a second unique identifier of the second user profile of a second user newly assigned responsibility for preventing the failure.

11. A system for reducing failure through generation, structuring, and analysis of critical event objects in computer memory, the system comprising:
an orchestration server, comprising:
  a processor of the orchestration server;
  a memory of the orchestration server;
  a session initiation routine comprising computer readable instructions that when executed on the processor of the orchestration server:
    initiate a session comprising generating a session UID and provisioning computing resources comprising a computing memory and a processing power, and
    generate a user addition request to associate a unique identifier of a first user profile with the session UID,
  an object generation engine comprising computer readable instructions that when executed on the processor of the orchestration server:
    receive a critical event criterion data comprising an alphanumeric string specifying a critical event;
  an object initiation routine comprising computer readable instructions that when executed on the processor of the orchestration server:
    generate a critical event object in the computing memory comprising the critical event criterion data and optionally a unique identifier of the critical event object, and
    store the critical event object in an evaluation queue;
  a risk assessment routine comprising computer readable instructions that when executed on the processor of the orchestration server:
    generate a risk value, and
    store the risk value in association with the critical event object;
  a dependency routine comprising computer readable instructions that when executed on the processor of the orchestration server:
    store in a referential attribute of the critical event object a unique identifier of a second critical event object to define a critical event dependency of a critical event hierarchy; and
an object server comprising:
  a processor of the object server;
  a memory of the object server; and
  a critical hierarchy generation engine comprising computer readable instructions that when executed on the processor of the orchestration server:
    query the session UID as a root of the critical event hierarchy,
    determine a set of critical event objects at least one of directly and indirectly connected to the root through one or more critical event dependency references of a data structure, and
    assemble a critical event hierarchy data in the computer memory; and
a network communicatively coupling the orchestration server and the object server.

12. The system of claim 11, further comprising:
a hierarchy analysis routine comprising computer readable instructions that when executed on the processor of the object server:
  determine that each of a subset of the set of critical event objects within the critical event hierarchy data comprise a data value in common, and
  returns to a client device associated with a second user profile registered with an administrative privilege with respect to the session a set of session unique identifiers of the subset of the set of critical event objects.

13. The system of claim 12, wherein the data value in common comprising at least one of: (i) the unique identifier of the first user profile of a first user; (ii) a word of the alphanumeric string; (iii) the risk value; (iv) an occurrence value; (v) an event status value; and (vi) the unique identifier of the second critical event object specified in the referential attribute.

14. The system of claim 13, further comprising:
a user assignment routine comprising computer readable instructions that when executed on the processor of the orchestration server:
  receive a selection of the unique identifier of the first user profile, and
  associate the unique identifier of the first user profile with the unique identifier of the critical event object to assign responsibility to the first user of the first user profile for preventing the critical event;
a categorization subroutine comprising computer readable instructions that when executed on the processor of the orchestration server:

associate a category value with the critical event object; and
a factor retrieval routine comprising computer readable instructions that when executed on the processor of the orchestration server:
receive a probability data, and
receive an impact data,
wherein the risk value is generated by inputting the probability data and the impact data into a risk assessment function.

15. The system of claim 14, further comprising:
a critical event log routine comprising computer readable instructions that when executed on the processor of the orchestration server:
store an occurrence value in an occurrence status attribute of the critical event object,
generate a critical event log, and
designate the critical event log for reporting to at least one of the first user profile and the second user profile registered with the administrative privilege with respect to the session;
the factor retrieval routine further comprising computer readable instructions that when executed on the processor of the orchestration server:
query a probability data source,
wherein the probability data source comprising a first database comprising a first plurality of critical event objects from a plurality of sessions associated with one or more accounts,
receive the probability data,
query an impact data source,
wherein the impact data source comprising a second database comprising critical event objects from the plurality of sessions associated with one or more accounts, and
receives the impact data;
a machine learning server comprising:
a processor of the machine learning server,
a memory of the machine learning server,
a first risk model engine comprising computer readable instructions that when executed on the processor of the machine learning server:
input values of at least two data attributes of each of a second plurality of critical event objects into a first machine learning algorithm as independent variables of the first machine learning algorithm,
input a value of an occurrence status of each of the second plurality of critical event objects into the first machine learning algorithm as a first dependent variable of the first machine learning algorithm, and
generate a first predictive model outputting a second risk value based on inputting of the at least two data attributes of the second plurality of critical event objects;
a second a second risk model engine comprising computer readable instructions that when executed on the processor of the machine learning server:
input values of at least two data attributes of a plurality of session files into a second machine learning algorithm as independent variables of the second machine learning algorithm,
input a session status value of each of the plurality of session files into the second machine learning algorithm as a second dependent variable of the second machine learning algorithm, and
generate a second predictive model outputting at least one of a probability for success and a probability for failure of the session based on inputting the values of at least the at least two data attributes of the plurality of session files;
a critical criteria recommendation engine comprising computer readable instructions that when executed on the processor of the machine learning server:
parse the critical event criterion data to result in one or more words of the alphanumeric string,
input one or more of the one or more words into a third predictive model built with a third machine learning algorithm and trained with a set of critical event criterion data extracted from each of a third plurality of critical event objects across two or more sessions,
output a second critical event criterion data most likely to be associated with the critical event criterion data across the two or more sessions to increase a likelihood for consideration of critical events related to the session, and
generate the critical event object from the second critical event criterion data and add the critical event object to the evaluation queue;
a project object creation module comprising computer readable instructions that when executed on the processor of the orchestration server:
generate a project data object from the critical event object; and
an event evaluation engine comprising computer readable instructions that when executed on the processor of the orchestration server:
store at least one of an event occurrence condition specifying an occurrence condition and an event detection script that when executed on a computer processor evaluates an input to the event detection script to determine the occurrence condition as an output of the event detection script, and
determine occurrence of the occurrence condition;
store an object check condition of the critical event object,
generate a status check request of the critical event object upon occurrence of the object check condition, and
store a status check value received from the client device associated with a user profile associated with the critical event object.

16. A device for reducing probability of failure based on storage and structuring of critical event objects, the device comprising:
a processor;
a memory;
an object generation engine comprising computer readable instructions that when executed on the processor:
receive a critical event criterion data comprising an alphanumeric string specifying a critical event;
an object initiation routine comprising computer readable instructions that when executed on the processor:
generate a critical event object in computing memory comprising the critical event criterion data and optionally a unique identifier of the critical event object, and
store the critical event object in an evaluation queue;
a dependency routine comprising computer readable instructions that when executed on the processor:
store in a referential attribute of the critical event object a unique identifier of a second critical event object to define a critical event dependency of a critical event hierarchy; and a critical hierarchy generation engine comprising computer readable instructions that when executed on the processor:
  query a session UID as a root of the critical event hierarchy,
  determine a set of critical event objects at least one of directly and indirectly connected to the root through one or more critical event dependency references of a data structure, and
  assemble a critical event hierarchy data in computer memory; and
a hierarchy analysis routine comprising computer readable instructions that when executed on the processor:
  determine that each of a subset of the set of critical event objects within the critical event hierarchy data comprise a data value in common, and
  returns to a client device a set of session unique identifiers of the subset of the set of critical event objects.

17. The device of claim 16, further comprising:
a risk assessment routine comprising computer readable instructions that when executed on the processor:
  generate a risk value by inputting a probability data and an impact data into a risk assessment function, and
  store at least one of the probability data, the impact data, and the risk value in association with the critical event object;
a session initiation routine comprising computer readable instructions that when executed on the processor:
  initiate a session comprising generating the session UID and provisioning computing resources comprising the computing memory and a processing power, and
  generate a user addition request to associate a unique identifier of a first user profile with the session UID.

18. The device of claim 17, wherein the data value in common comprising at least one of: (i) the unique identifier of the first user profile of a first user; (ii) a word of the alphanumeric string; (iii) the risk value; (iv) an occurrence value; (v) an event status value; and (vi) the unique identifier of the second critical event object specified in the referential attribute.

19. The device of claim 18, further comprising:
a user assignment routine comprising computer readable instructions that when executed on the processor:
  receive a selection of the unique identifier of the first user profile, and
  associate the unique identifier of the first user profile with the unique identifier of the critical event object to assign responsibility to the first user of the first user profile for preventing the critical event;
a categorization subroutine comprising computer readable instructions that when executed on the processor:
  associate a category value with the critical event object; and
a factor retrieval routine comprising computer readable instructions that when executed on the processor:
  receive the probability data, and
  receive the impact data.

20. The device of claim 19, further comprising:
a critical event log routine comprising computer readable instructions that when executed on the processor:
  store the occurrence value in an occurrence status attribute of the critical event object,
  generate a critical event log, and
  designate the critical event log for reporting to at least one of the first user profile and a second user profile registered with an administrative privilege with respect to the session;
a session spawning subroutine comprising computer readable instructions that when executed:
  generate a new session based on the critical event object,
  determine that the first user profile is associated with the critical event object, and
  generate a call to register the first user profile associated with the critical event object with administrative privileges with respect to the new session;
a first risk model engine comprising computer readable instructions that when executed on the processor:
  input values of at least two data attributes of each of a second plurality of critical event objects into a first machine learning algorithm as independent variables of the first machine learning algorithm,
  input a value of an occurrence status of each of the second plurality of critical event objects into the first machine learning algorithm as a first dependent variable of the first machine learning algorithm, and
  generate a first predictive model outputting a second risk value based on inputting of the at least two data attributes of the second plurality of critical event objects;
a second a second risk model engine comprising computer readable instructions that when executed on the processor:
  input values of at least two data attributes of a plurality of session files into a second machine learning algorithm as independent variables of the second machine learning algorithm,
  input a session status value of each of the plurality of session files into the second machine learning algorithm as a second dependent variable of the second machine learning algorithm, and
  generate a second predictive model outputting at least one of a probability for success and a probability for failure of the session based on inputting the values of at least the at least two data attributes of the plurality of session files;
a critical criteria recommendation engine comprising computer readable instructions that when executed on the processor:
  parse the critical event criterion data to result in one or more words of the alphanumeric string,
  input one or more of the one or more words into a third predictive model built with a third machine learning algorithm and trained with a set of critical event criterion data extracted from each of a third plurality of critical event objects across two or more sessions,
  output a second critical event criterion data most likely to be associated with the critical event criterion data across the two or more sessions to increase a likelihood for consideration of critical events related to the session, and
  generate the critical event object from the second critical event criterion data and add the critical event object to the evaluation queue;
an authentication system comprising computer readable instructions that when executed on the processor:
  authenticate at least one of the first user and a client device of the first user;

a project object creation module comprising computer readable instructions that when executed on the processor:
  generate a project data object from the critical event object;
a templating module comprising computer readable instructions that when executed:
  select a template data for the session, the template data comprising one or more category values,
  determine one or more critical event criterion data associated with the template data,
  generate one or more new critical event objects from the one or more critical event criterion data associated with the template data, and
  add the one or more new critical event objects to the evaluation queue;
an auxiliary session data routine comprising computer readable instructions that when executed on the processor:
  determine a third critical event object is associated with a project failure of an account profile,
  extract a critical event criterion data of the third critical event object and optionally a probability data of the third critical event object, an impact data of the third critical event object, and a risk value of the third critical event object,
  generate a fourth critical event object comprising the critical event criterion data of the third critical event object and associate the fourth critical event object with the session, and
  add the fourth critical event object to the evaluation queue;
a risk threshold routine comprising computer readable instructions that when executed on the processor:
  determine a subset of a fifth plurality the critical event objects that are above of a risk threshold value calculated by a risk threshold function;
a visualization module comprising computer readable instructions that when executed on the processor:
  generate a visualization of one or more UI elements each representing one or more critical event objects relative to the risk threshold value;
a report subroutine comprising computer readable instructions that when executed on the processor:
  generate a report comprising a name of the first user profile and one or more critical event objects assigned to the first user profile;
an event evaluation engine comprising computer readable instructions that when executed on the processor:
  store at least one of an event occurrence condition specifying an occurrence condition and an event detection script that when executed on a computer processor evaluates an input to the event detection script to determine the occurrence condition as an output of the event detection script, and
  determine occurrence of the occurrence condition; and
a status tracking engine comprising computer readable instructions that when executed on the processor:
  store an object check condition of the critical event object,
  generate a status check request of the critical event object upon occurrence of the object check condition, and
  store a status check value received from the client device associated with a user profile associated with the critical event object.

* * * * *